United States Patent
Vermani et al.

(10) Patent No.: US 10,439,773 B2
(45) Date of Patent: Oct. 8, 2019

(54) SYSTEMS AND METHODS FOR BACKWARDS-COMPATIBLE PREAMBLE FORMATS FOR MULTIPLE ACCESS WIRELESS COMMUNICATION

(71) Applicant: QUALCOMM Incorporated, San Diego, CA (US)

(72) Inventors: Sameer Vermani, San Diego, CA (US); Rahul Tandra, San Diego, CA (US); Simone Merlin, Solana Beach, CA (US); Hemanth Sampath, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 44 days.

(21) Appl. No.: 14/250,276

(22) Filed: Apr. 10, 2014

(65) Prior Publication Data

US 2014/0307612 A1    Oct. 16, 2014

Related U.S. Application Data

(60) Provisional application No. 61/898,809, filed on Nov. 1, 2013, provisional application No. 61/871,267, filed
(Continued)

(51) Int. Cl.
*H04W 72/00* (2009.01)
*H04L 5/00* (2006.01)
(Continued)

(52) U.S. Cl.
CPC .......... *H04L 5/0044* (2013.01); *H04L 5/0094* (2013.01); *H04L 27/261* (2013.01); *H04L 27/2613* (2013.01); *H04W 56/0035* (2013.01)

(58) Field of Classification Search
CPC . H04L 5/0044; H04L 5/0094; H04L 27/2613; H04L 27/261; H04W 56/0035
(Continued)

(56) References Cited

U.S. PATENT DOCUMENTS 7,039,412 B2   5/2006 Sandhu et al.
8,446,812 B2   5/2013 Nakao et al.
(Continued)

FOREIGN PATENT DOCUMENTS

CN    1778052 A    5/2006
CN    101483626 A  7/2009
(Continued)

OTHER PUBLICATIONS

IEEE 802.11-09/0992r21; "IEEE P802.11 Wireless LANs; Specification Framework for TGAC"; Jan. 19, 2011.*
(Continued)

*Primary Examiner* — Faisal Choudhury
(74) *Attorney, Agent, or Firm* — Paradice and Li LLP

(57) ABSTRACT

Systems, methods, and devices for wireless communication are disclosed herein. One aspect of the disclosure provides a method of transmitting to two or more wireless communication devices. The method includes transmitting a first section of a preamble according to a first format, the first section of the preamble containing information informing devices compatible with the first format to defer to the transmission, transmitting a second section of the preamble according to a second format, the second section of the preamble containing tone allocation information, the tone allocation information identifying two or more wireless communication devices; and transmitting data to the two or more wireless communication devices simultaneously, the data contained on two or more sub-bands.

22 Claims, 35 Drawing Sheets

Related U.S. Application Data on Aug. 28, 2013, provisional application No. 61/847,525, filed on Jul. 17, 2013, provisional application No. 61/819,028, filed on May 3, 2013, provisional application No. 61/812,136, filed on Apr. 15, 2013.

(51) Int. Cl.
*H04L 27/26* (2006.01)
*H04W 56/00* (2009.01)

(58) Field of Classification Search
USPC .......................................................... 370/312
See application file for complete search history.

(56) References Cited

U.S. PATENT DOCUMENTS

| | | | |
|---|---|---|---|
| 8,867,574 B2 | 10/2014 | Van et al. | |
| 8,989,106 B2 | 3/2015 | Abraham et al. | |
| 2006/0002359 A1 | 1/2006 | Kim et al. | |
| 2009/0285241 A1 | 11/2009 | Zhang et al. | |
| 2010/0220798 A1 | 9/2010 | Trachewsky | |
| 2010/0260159 A1* | 10/2010 | Zhang | H04W 28/06 370/338 |
| 2010/0290449 A1* | 11/2010 | van Nee et al. | 370/338 |
| 2011/0032875 A1 | 2/2011 | Erceg et al. | |
| 2011/0222486 A1 | 9/2011 | Hart et al. | |
| 2011/0255620 A1 | 10/2011 | Jones, IV et al. | |
| 2012/0051454 A1* | 3/2012 | Zheng et al. | 375/295 |
| 2012/0163292 A1* | 6/2012 | Kneckt et al. | 370/328 |
| 2012/0213305 A1* | 8/2012 | Oh et al. | 375/267 |
| 2012/0222486 A1 | 9/2012 | Lai et al. | |
| 2012/0275446 A1 | 11/2012 | Stacey et al. | |
| 2012/0294294 A1* | 11/2012 | Zhang | H04L 1/0025 370/338 |
| 2012/0314673 A1* | 12/2012 | Noh | H04L 5/001 370/329 |
| 2013/0142115 A1* | 6/2013 | Yu et al. | 370/328 |
| 2013/0195092 A1* | 8/2013 | Zhang | H04L 5/0048 370/338 |
| 2013/0286959 A1* | 10/2013 | Lou | H04W 72/04 370/329 |
| 2013/0329620 A1 | 12/2013 | Kim et al. | |
| 2014/0016607 A1 | 1/2014 | Hart | |
| 2014/0307649 A1 | 10/2014 | Vermani et al. | |
| 2014/0307650 A1 | 10/2014 | Vermani et al. | |
| 2014/0369276 A1 | 12/2014 | Porat et al. | |
| 2014/0376474 A1* | 12/2014 | Lee | H04W 16/14 370/329 |
| 2015/0009940 A1* | 1/2015 | Liu | H04L 5/0023 370/329 |
| 2015/0237178 A1 | 8/2015 | Zhang | |
| 2019/0173637 A1 | 6/2019 | Vermani et al. | |

FOREIGN PATENT DOCUMENTS

| | | |
|---|---|---|
| CN | 102223346 A | 10/2011 |
| CN | 102714648 A | 10/2012 |
| EP | 2987288 B1 | 5/2017 |
| JP | 2006020320 A | 1/2006 |
| JP | 2007531384 A | 11/2007 |
| JP | 2012523774 A | 10/2012 |
| KR | 20120023610 A | 3/2012 |
| RU | 2349052 C2 | 3/2009 |
| RU | 2010123088 A | 12/2011 |
| TW | I330969 B | 9/2010 |
| WO | WO-2004075454 A2 | 9/2004 |
| WO | WO-2005107121 A1 | 11/2005 |
| WO | WO-2006132508 A1 | 12/2006 |
| WO | WO-2010099497 | 9/2010 |
| WO | WO-2010118383 A1 | 10/2010 |
| WO | WO-2011112279 A1 | 9/2011 |
| WO | WO-2011115408 A2 | 9/2011 |
| WO | WO-2011153335 A1 | 12/2011 |
| WO | WO-2012040495 A1 | 3/2012 |
| WO | WO-2012096549 A2 | 7/2012 |
| WO | WO-2012121909 A1 | 9/2012 |
| WO | WO-2012158398 A1 | 11/2012 |
| WO | WO-2012158557 A1 | 11/2012 |
| WO | WO-2012158563 A1 | 11/2012 |
| WO | WO-2012162309 A2 | 11/2012 |
| WO | WO-2012173326 A1 | 12/2012 |

OTHER PUBLICATIONS

Draft Standard for Information Technology Telecommunications and information exchange between systems. Local and metropolitan area networks Specific requirements Part 11: Wireless LAN Medium Access Control (MAC) and Physical Layer (PHY) specifications Amendment 5 Enhancements for Higher Throughput IEEE P802.11N/D9.0, Mar. 1, 2009 (Mar. 1, 2009), pp. 1,2,276-297, XP002606795.

Bart B., et al., "DL-OFDMA for Mixed Clients", mentor.ieee.org, Mar. 6, 2010 (Mar. 6, 2010), pp. 1-24, XP002728787, Retrieved from the Internet:URL:https://mentor.ieee.org/802.11/dcn/10/11-10-0317-01-00ac-dl-ofdma-for-mixed-clients.ppt[retrieved on Aug. 21, 2014].

Chun J. et al., "Legacy Support on HEW frame structure", mentor.ieee.org, Sep. 16, 2013 (Sep. 16, 2013), pp. 1-8, XP002728788, Retrieved from the Internet: URL:https://mentor.ieee.org/802.11/dcn/13/11-13-1057-00-0hew-legacy-support-on-hew-frame-structure.pptx [retrieved on Aug. 21, 2014].

International Search Report and Written Opinion—PCT/US2014/033782—ISA/EPO—Sep. 9, 2014.

Ishihara K., et al., "Simultaneous Transmission Technologies for HEW", mentor.ieee.org, Nov. 12, 2013 (Nov. 12, 2013), pp. 1-10, XP002728811, Retrieved from the Internet: URL: https://mentor.ieee.org/802.11/dcn/13/11-13-1395-02-0hew-simultaneous-transmission-technologies-for-hew.pptx [retrieved on Aug. 21, 2014].

Taiwan Search Report—TW103113721—TIPO—Oct. 3, 2016.

Tu, Y.S., et al., "Proposal for TGac VHT Format", IEEE 802.11-09/1258r0, Nov. 19, 2009.

Cariou L., et al., "High Efficiency WLAN", IEEE 802.11-13/0331r5, Mar. 20, 2013, pp. 1-21.

* cited by examiner

| Field | Number of bits |
|---|---|
| BW | 2-3 |
| Length in symbols | 8 |
| Longer symbols ON | 1 |
| Reserved | 2-3 |
| CRC | 4 |
| Tail | 6 |

FIG. 20

SYSTEMS AND METHODS FOR BACKWARDS-COMPATIBLE PREAMBLE FORMATS FOR MULTIPLE ACCESS WIRELESS COMMUNICATION

CLAIM OF PRIORITY UNDER 35 U.S.C. § 119

The present application for patent claims priority to Provisional Application No. 61/812,136 entitled "SYSTEMS AND METHODS FOR BACKWARDS-COMPATIBLE PREAMBLE FORMATS FOR MULTIPLE ACCESS WIRELESS COMMUNICATION" filed Apr. 15, 2013, and assigned to the assignee hereof and hereby expressly incorporated by reference herein. The present application for patent further claims priority to Provisional Application No. 61/819,028 entitled "SYSTEMS AND METHODS FOR BACKWARDS-COMPATIBLE PREAMBLE FORMATS FOR MULTIPLE ACCESS WIRELESS COMMUNICATION" filed May 3, 2013, and assigned to the assignee hereof and hereby expressly incorporated by reference herein. The present application for patent further claims priority to Provisional Application No. 61/847,525 entitled "SYSTEMS AND METHODS FOR BACKWARDS-COMPATIBLE PREAMBLE FORMATS FOR MULTIPLE ACCESS WIRELESS COMMUNICATION" filed Jul. 17, 2013, and assigned to the assignee hereof and hereby expressly incorporated by reference herein. The present application for patent further claims priority to Provisional Application No. 61/871,267 entitled "SYSTEMS AND METHODS FOR BACKWARDS-COMPATIBLE PREAMBLE FORMATS FOR MULTIPLE ACCESS WIRELESS COMMUNICATION" filed Aug. 28, 2013, and assigned to the assignee hereof and hereby expressly incorporated by reference herein. The present application for patent further claims priority to Provisional Application No. 61/898,809 entitled "SYSTEMS AND METHODS FOR BACKWARDS-COMPATIBLE PREAMBLE FORMATS FOR MULTIPLE ACCESS WIRELESS COMMUNICATION" filed Nov. 1, 2013, and assigned to the assignee hereof and hereby expressly incorporated by reference herein.

BACKGROUND

Field

The present application relates generally to wireless communications, and more specifically to systems, methods, and devices to enable backward-compatible multiple access wireless communication. Certain aspects herein relate to orthogonal frequency-division multiple access (OFDMA) communications, especially in the IEEE 802.11 family of wireless communication standards.

Background

In many telecommunication systems, communications networks are used to exchange messages among several interacting spatially-separated devices. Networks may be classified according to geographic scope, which could be, for example, a metropolitan area, a local area, or a personal area. Such networks may be designated respectively as a wide area network (WAN), metropolitan area network (MAN), local area network (LAN), or personal area network (PAN). Networks also differ according to the switching/routing technique used to interconnect the various network nodes and devices (e.g., circuit switching vs. packet switching), the type of physical media employed for transmission (e.g., wired vs. wireless), and the set of communication protocols used (e.g., Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

SUMMARY

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description" one will understand how the features of this invention provide advantages that include efficient use of the wireless medium.

One aspect of the disclosure provides a method of transmitting to two or more wireless communication devices. The method includes transmitting a first section of a preamble according to a first format, the first section of the preamble containing information informing devices compatible with the first format to defer to the transmission, transmitting a second section of the preamble according to a second format, the second section of the preamble containing tone allocation information, the tone allocation information identifying two or more wireless communication devices; and transmitting data to the two or more wireless communication devices simultaneously, the data contained on two or more sub-bands.

The first section of the preamble may include a one-bit code on a Q-rail which indicates a presence of the second section of the preamble. The second section of the preamble may include a signal field using the second format, the signal field comprised of at least three orthogonal frequency-division multiplexing symbols, and wherein a third symbol of the three symbols is a rotated signal which indicates a presence of the second section of the preamble. Transmitting the second section of the preamble may include transmitting one or more training fields according to the second format to each of the two or more wireless communication devices, the one or more training fields each configured to be used for accurate frequency offset estimation, time synchronization, and channel estimation. The method may further include assigning one or more spatial streams to each of the two or more wireless communication devices, and wherein transmitting one or more training fields includes transmitting one training field according to the second format to each of the two or more wireless communication devices, the number of training fields based on a number of spatial streams assigned to the respective wireless communication device. The method may further include assigning one or more spatial streams to each of the two or more wireless communication devices, and wherein transmitting one or more training fields comprises transmitting a number of training fields to each of the two or more wireless communication devices, the number of training fields based on a number of spatial streams assigned to the wireless communication device which is assigned a highest number of spatial streams. The second section of the preamble may contain information sufficient to inform devices of a tone allocation granularity of the transmission. The information sufficient to inform devices of a tone allocation granularity of the transmission may comprise a bandwidth of the transmission, from which devices compatible with the second format may determine the tone allocation granularity of the transmission. The information sufficient to inform devices of a tone allocation granularity of the transmission may comprise a code of at least one bit in a signal field indicating the tone allocation granularity of the transmission. The tone allocation granularity may comprise an indication of the bandwidth size of each of a number of sub-bands. The second section of the preamble may further include an indication of a number of sub-bands assigned to each of the identified two or more wireless communication devices. The second section of the preamble may include a signal field according to the second format, and wherein a first symbol of the signal field is transmitted in duplicate in each of a plurality of channels and contains information identifying an entire bandwidth, and wherein a subsequent symbol of the signal field is transmitted using the entire bandwidth.

One aspect of the present disclosure provides an apparatus for wireless communication. The apparatus includes a transmitter configured to transmit over a bandwidth, configured to transmit a first section of a preamble according to a first format, the first section of the preamble containing information informing devices compatible with the first format to defer to the transmission; transmit a second section of the preamble according to a second format, the second section of the preamble containing tone allocation information, the tone allocation information identifying two or more wireless communication devices; and transmit data to the two or more wireless communication devices simultaneously, the data contained on two or more sub-bands. The first section of the preamble may include a one-bit code on a Q-rail which indicates a presence of the second section of the preamble to devices compatible with the second format. The second section of the preamble may include a signal field using the second format, the signal field comprising at least three orthogonal frequency-division multiplexing symbols, and wherein a third symbol of the three symbols is a rotated signal which indicates the presence of the second format signal field. The transmitter may be configured to transmit the second section of the preamble, comprising transmitting one or more training fields according to the second format to each of the two or more wireless communication devices, the one or more training fields each configured to be used for accurate frequency offset estimation, time synchronization, and channel estimation. The transmitter may be further configured to transmit to each of the two or more wireless communication devices on one or more spatial streams, and wherein transmitting one or more training fields according to the second format comprises transmitting a training field according to the second format to each of the two or more wireless communication devices, the number of training fields based on a number of spatial streams assigned to the respective wireless communication device. The transmitter may be further configured to transmit to each of the two or more wireless communication devices on one or more spatial streams, and wherein transmitting one or more training fields according to the second format comprises transmitting a number of training fields to each of the two or more wireless communication devices, the number of training fields based on a number of spatial streams assigned to the wireless communication device which is assigned a highest number of spatial streams. The second section of the preamble may contain information sufficient to inform devices of a tone allocation granularity of the transmission. The second section of the preamble may include a second format signal field, and wherein a first symbol of the second format signal field is transmitted in duplicate in each of a plurality of channels and contains information identifying an entire bandwidth, and wherein a subsequent symbol of the second format signal field is transmitted using the entire bandwidth.

BRIEF DESCRIPTION OF THE DRAWINGS

FIG. 20 illustrates example bit allocation for an HE-SIG 1 field.

DETAILED DESCRIPTION

Figure 1:
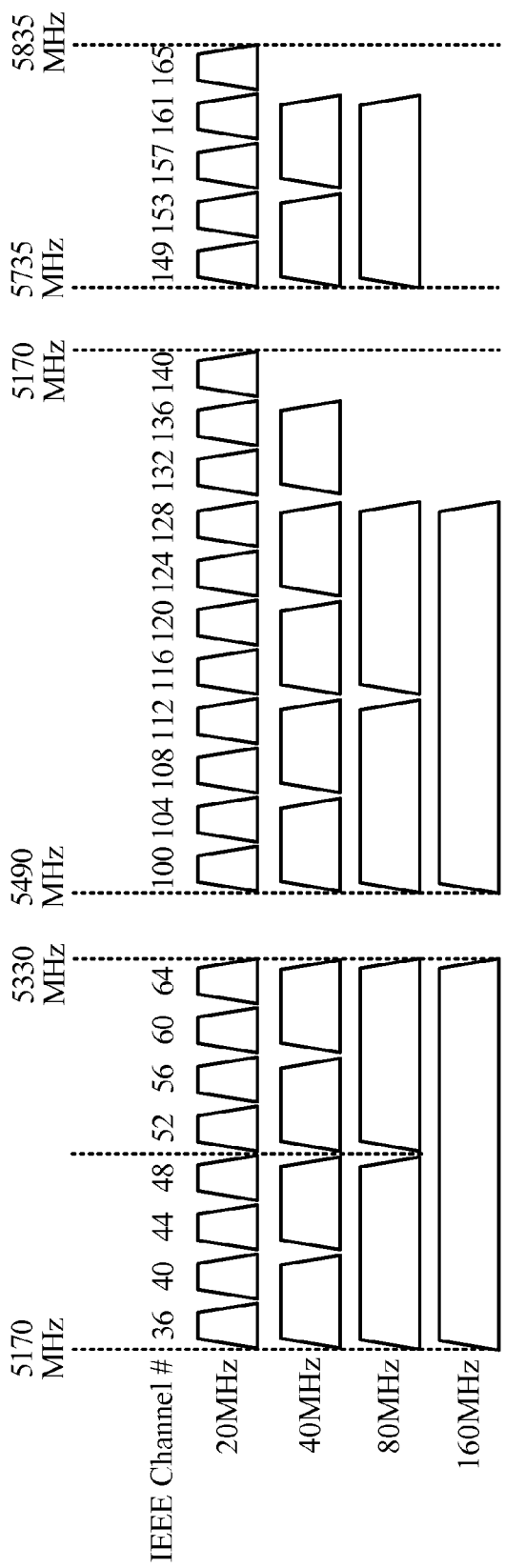
FIG. 1 illustrates a channel allocation for channels available for IEEE 802.11 systems.

Various aspects of the novel systems, apparatuses, and methods are described more fully hereinafter with reference to the accompanying drawings. The teachings disclosed may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Wireless network technologies may include various types of wireless local area networks (WLANs). A WLAN may be used to interconnect nearby devices together, employing widely used networking protocols. The various aspects described herein may apply to any communication standard, such as WiFi or, more generally, any member of the IEEE 802.11 family of wireless protocols. For example, the various aspects described herein may be used as part of a IEEE 802.11 protocol, such as an 802.11 protocol which supports orthogonal frequency-division multiple access (OFDMA) communications.

It may be beneficial to allow multiple devices, such as STAs, to communicate with an AP at the same time. For example, this may allow multiple STAs to receive a response from the AP in less time, and to be able to transmit and receive data from the AP with less delay. This may also allow an AP to communicate with a larger number of devices overall, and may also make bandwidth usage more efficient. By using multiple access communications, the AP may be able to multiplex OFDM symbols to, for example, four devices at once over an 80 MHz bandwidth, where each device utilizes 20 MHz bandwidth. Thus, multiple access may be beneficial in some aspects, as it may allow the AP to make more efficient use of the spectrum available to it.

It has been proposed to implement such multiple access protocols in an OFDM system such as the 802.11 family by assigning different subcarriers (or tones) of symbols transmitted between the AP and the STAs to different STAs. In this way, an AP could communicate with multiple STA's with a single transmitted OFDM symbol, where different tones of the symbol were decoded and processed by different STA's, thus allowing simultaneous data transfer to multiple STA's. These systems are sometimes referred to as OFDMA systems.

Such a tone allocation scheme is referred to herein as a "high-efficiency" (HE) system, and data packets transmitted in such a multiple tone allocation system may referred to as high-efficiency (HE) packets. Various structures of such packets, including backward compatible preamble fields are described in detail below.

Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Popular wireless network technologies may include various types of wireless local area networks (WLANs). A WLAN may be used to interconnect nearby devices together, employing widely used networking protocols. The various aspects described herein may apply to any communication standard, such as a wireless protocol.

In some aspects, wireless signals may be transmitted according to an 802.11 protocol. In some implementations, a WLAN includes various devices which are the components that access the wireless network. For example, there may be two types of devices: access points (APs) and clients (also referred to as stations, or STAB). In general, an AP may serve as a hub or base station for the WLAN and an STA serves as a user of the WLAN. For example, an STA may be a laptop computer, a personal digital assistant (PDA), a mobile phone, etc. In an example, an STA connects to an AP via a WiFi compliant wireless link to obtain general connectivity to the Internet or to other wide area networks. In some implementations an STA may also be used as an AP.

An access point (AP) may also comprise, be implemented as, or known as a base station, wireless access point, access node or similar terminology.

A station "STA" may also comprise, be implemented as, or known as an access terminal (AT), a subscriber station, a subscriber unit, a mobile station, a remote station, a remote terminal, a user terminal, a user agent, a user device, user equipment, or some other terminology. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured for network communication via a wireless medium.

As discussed above, certain of the devices described herein may implement an 802.11 standard, for example. Such devices, whether used as an STA or AP or other device, may be used for smart metering or in a smart grid network. Such devices may provide sensor applications or be used in home automation. The devices may instead or in addition be used in a healthcare context, for example for personal healthcare. They may also be used for surveillance, to enable extended-range Internet connectivity (e.g., for use with hotspots), or to implement machine-to-machine communications.

FIG. 1 illustrates a channel allocation for channels available for 802.11 systems. Various IEEE 802.11 systems support a number of different sizes of channels, such as 5, 10, 20, 40, 80, and 160 MHz channels. For example, and 802.11ac device may support 20, 40, and 80 MHz channel bandwidth reception and transmission. A larger channel may comprise two adjacent smaller channels. For example, an 80 MHz channel may comprise two adjacent 40 MHz channels. In the currently implemented IEEE 802.11 systems, a 20 MHz channel contains 64 subcarriers, separated from each other by 312.5 kHz. Of these subcarriers, a smaller number may be used for carrying data. For example, a 20 MHz channel may contain transmitting subcarriers numbered −1 to −28 and 1 to 28, or 56 subcarriers. Some of these carriers may also be used to transmit pilot signals. Over the years, the IEEE 802.11 standard has evolved through several versions. Older versions include the 11a/g and 11n versions. The most recently released is the 802.11ac version.

Figure 2:
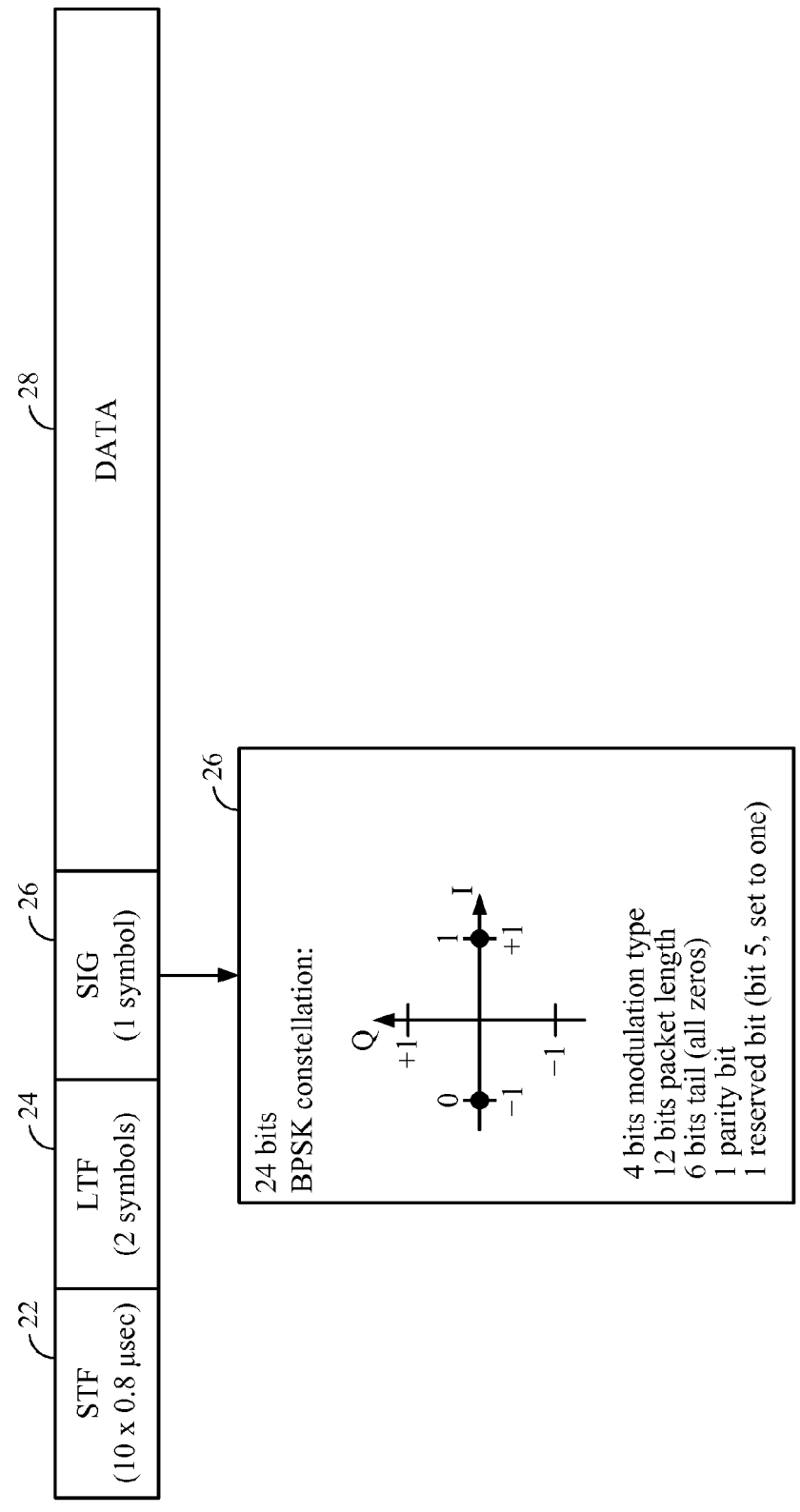
FIG. 2 illustrates a structure of a physical-layer packet (PPDU frame) which may be used in an IEEE 802.11a/b/g/j/p communication.
Figure 3:
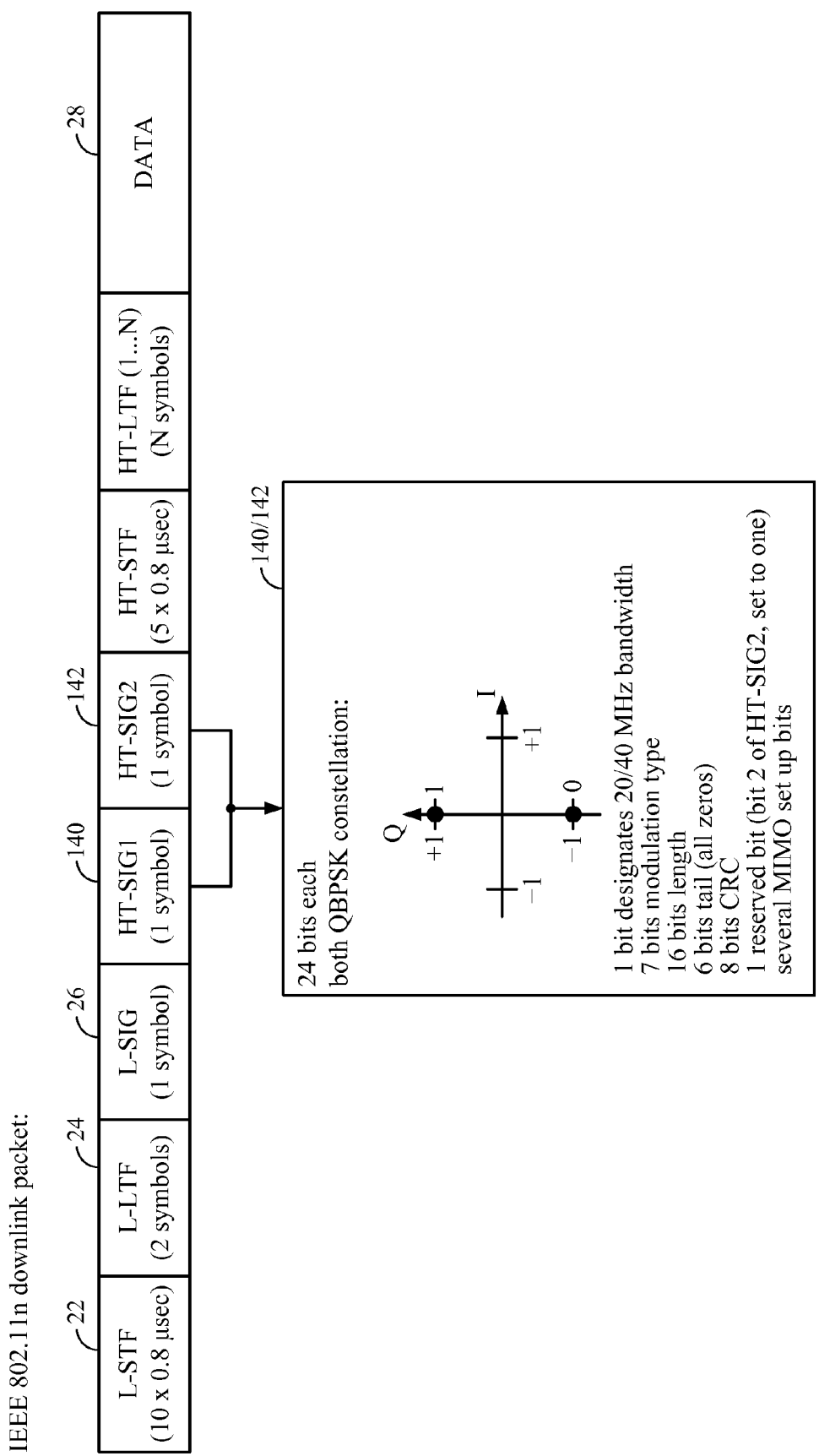
FIG. 3 illustrates a structure of a physical-layer packet (PPDU frame) which may be used in an IEEE 802.11n communication.
Figure 4:
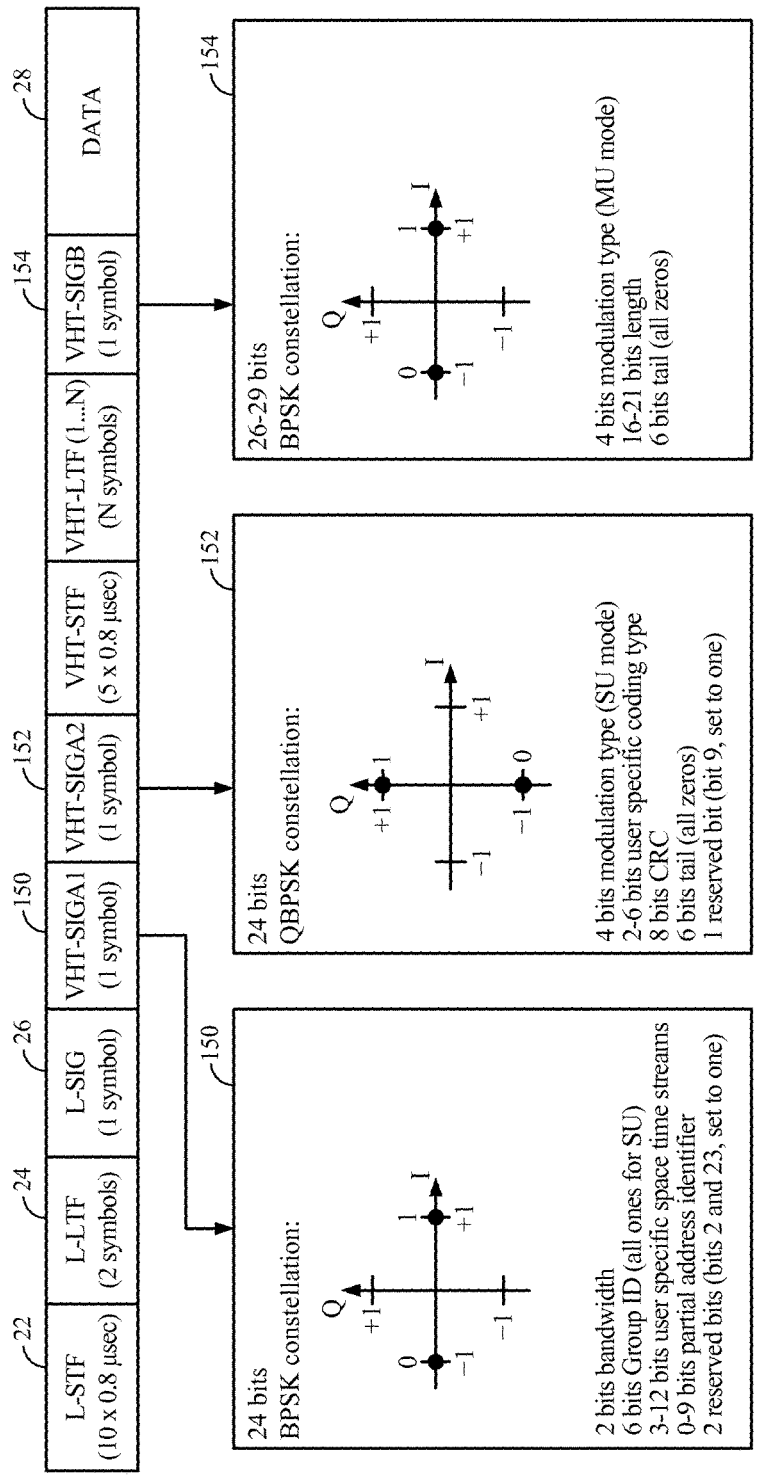
FIG. 4 illustrates a structure of a physical-layer packet (PPDU frame) which may be used in an IEEE 802.11ac communication.

FIGS. 2, 3, and 4 illustrates data packet formats for several currently existing IEEE 802.11 standards. Turning first to FIG. 2, a packet format for IEEE 802.11a, 11b, and 11g is illustrated. This frame includes a short training field 22, a long training field 24, and a signal field 26. The training fields do not transmit data, but they allow synchronization between the AP and the receiving STAs for decoding the data in the data field 28.

The signal field 26 delivers information from the AP to the STA's about the nature of the packet being delivered. In IEEE 802.11a/b/g devices, this signal field has a length of 24 bits, and is transmitted as a single OFDM symbol at a 6 Mb/s rate using BPSK modulation and a code rate of ½. The information in the SIG field 26 includes 4 bits describing the modulation scheme of the data in the packet (e.g. BPSK, 16QAM, 64QAM, etc.), and 12 bits for the packet length. This information is used by a STA to decode the data in the packet when the packet is intended for the STA. When a packet is not intended for a particular STA, the STA will defer any communication attempts during the time period defined in the length field of the SIG symbol 26, and may, to save power, enter a sleep mode during the packet period of up to about 5.5 msec.

As features have been added to IEEE 802.11, changes to the format of the SIG fields in data packets were developed to provide additional information to STAs. FIG. 3 shows the packet structure for the IEEE 802.11n packet. The 11n addition to the IEEE.802.11 standard added MIMO functionality to IEEE.802.11 compatible devices. To provide backward compatibility for systems containing both IEEE 802.11a/b/g devices and IEEE 802.11n devices, the data packet for IEEE 802.11n systems also includes the STF, LTF, and SIG fields of these earlier systems, noted as L-STF 22, L-LTF 24, and L-SIG 26 with a prefix L to denote that they are "legacy" fields. To provide the needed information to STA's in an IEEE 802.11n environment, two additional signal symbols 140 and 142 were added to the IEEE 802.11n data packet. In contrast with the SIG field and L-SIG field 26, however, these signal fields used rotated BPSK modulation (also referred to as QBPSK modulation). When a legacy device configured to operate with IEEE 802.11a/b/g receives such a packet, it will receive and decode the L-SIG field 26 as a normal 11a/b/g packet. However, as the device continued decoding additional bits, they will not be decoded successfully because the format of the data packet after the L-SIG field 26 is different from the format of an 11a/b/g packet, and the CRC check performed by the device during this process will fail. This causes these legacy devices to stop processing the packet, but still defer any further operations until a time period has passed defined by the length field in the initially decoded L-SIG. In contrast, new devices compatible with IEEE 802.11n would sense the rotated modulation in the HT-SIG fields, and process the packet as an 802.11n packet. Furthermore, an 11n device can tell that a packet is intended for an 11a/b/g device because if it senses any modulation other than QBPSK in the symbol following the L-SIG 26, it will ignore it as an 11a/b/g packet. After the HT-SIG1 and SIG2 symbols, additional training fields suitable for MIMO communication are provided, followed by the data 28.

FIG. 4 illustrates a frame format for the currently existing IEEE 802.11ac standard, which added multi-user MIMO functionality to the IEEE 802.11 family. Similar to IEEE 802.11n, an 802.11ac frame contains the same legacy short training field (L-STF) 22 and long training field (L-LTF) 24. An 802.11ac frame also contains a legacy signal field L-SIG 26 as described above.

Next, an 802.11ac frame includes a Very High Throughput Signal (VHT-SIG-A1 150 and A2 152) field two symbols in length. This signal field provides additional configuration information related to 11ac features that are not present in 11a/b/g and 11n devices. The first OFDM symbol 150 of the VHT-SIG-A may be modulated using BPSK, so that any 802.11n device listening to the packet will believe the packet to be an 802.11a packet, and will defer to the packet for the duration of the packet length as defined in the length field of the L-SIG 126. Devices configured according to 11a/g will be expecting a service field and MAC header following the L-SIG 26 field. When they attempt to decode this, a CRC failure will occur in a manner similar to the procedure when an 11n packet is received by an 11a/b/g device, and the 11a/b/g devices will also defer for the period defined in the L-SIG field 26. The second symbol 152 of the VHT-SIG-A is modulated with a 90-degree rotated BPSK. This rotated second symbol allows an 802.11ac device to identify the packet as an 802.11ac packet. The VHT-SIGA1 150 and A2 152 fields contain information on a bandwidth mode, modulation and coding scheme (MCS) for the single user case, number of space time streams (NSTS), and other information. The VHT-SIGA1 150 and A2 152 may also contain a number of reserved bits that are set to "1." The legacy fields and the VHT-SIGA1 and A2 fields may be duplicated over each 20 MHz of the available bandwidth.

After the VHT-SIG-A, an 802.11ac packet may contain a VHT-STF, which is configured to improve automatic gain control estimation in a multiple-input and multiple-output (MIMO) transmission. The next 1 to 8 fields of an 802.11ac packet may be VHT-LTFs. These may be used for estimating the MIMO channel and then equalizing the received signal. The number of VHT-LTFs sent may be greater than or equal to the number of spatial streams per user. Finally, the last field in the preamble before the data field is the VHT-SIG-B 154. This field is BPSK modulated, and provides information on the length of the useful data in the packet and, in the case of a multiple user (MU) MIMO packet, provides the MCS. In a single user (SU) case, this MCS information is instead contained in the VHT-SIGA2. Following the VHT-SIG-B, the data symbols are transmitted. Although 802.11ac introduced a variety of new features to the 802.11 family, and included a data packet with preamble design that was backward compatible with 11a/g/n devices and also provided information necessary for implementing the new features of 11ac, configuration information for OFDMA tone allocation for multiple access is not provided by the 11ac data packet design. New preamble configurations are necessary to implement such features in any future version of IEEE 802.11 or any other wireless network protocol using OFDM subcarriers. Advantageous preamble designs a represented below, especially with reference to FIGS. 3-9.

Figure 5:
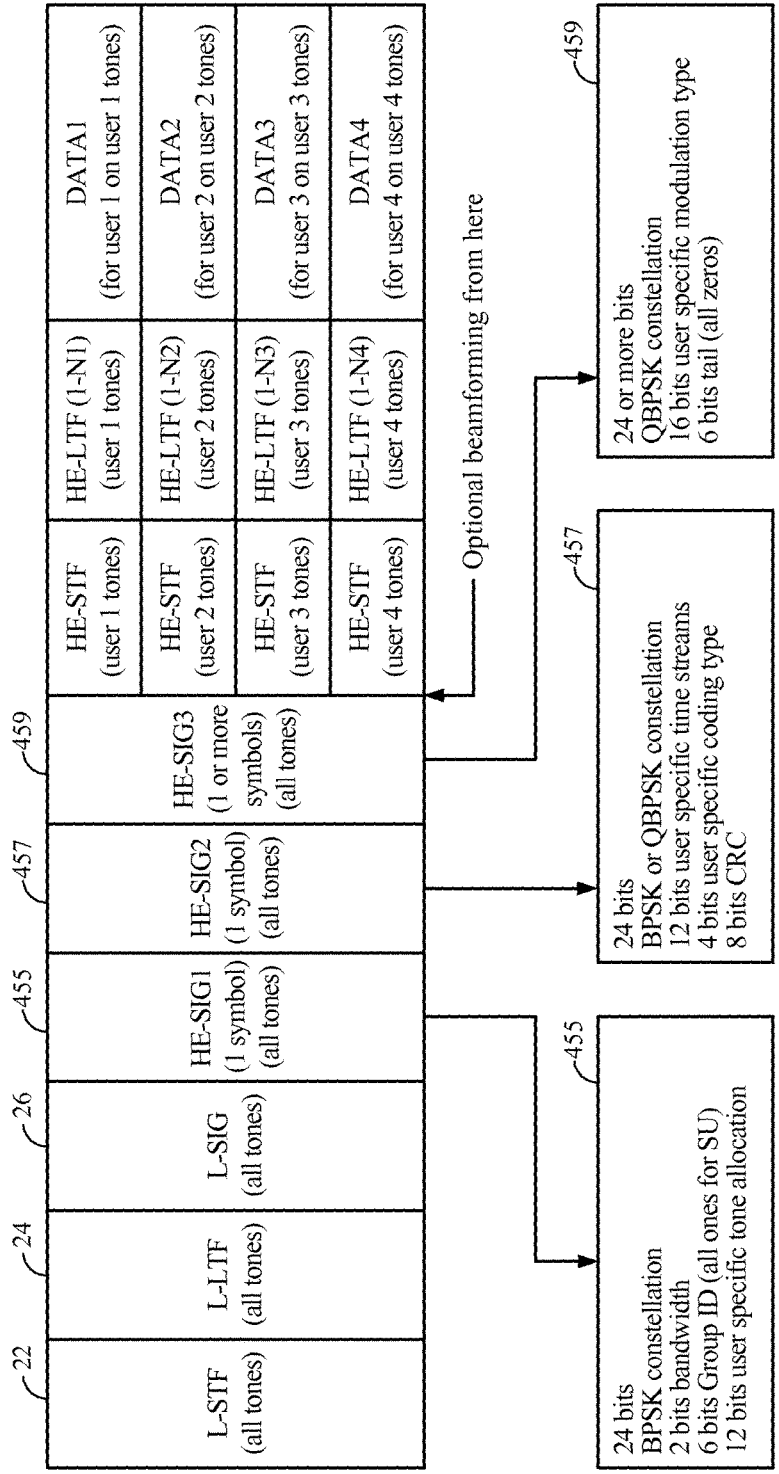
FIG. 5 illustrates an exemplary structure of a downlink physical-layer packet which may be used to enable backward-compatible multiple access wireless communications.

FIG. 5 illustrates an exemplary structure of a physical-layer packet which may be used to enable backward-compatible multiple access wireless communications in this environment.

In this example physical-layer packet, a legacy preamble including L-STF 22, L-LTF 26, and L-SIG 26 are included. Each of these may be transmitted using 20 MHz, and multiple copies may be transmitted for each 20 MHz of spectrum that the AP uses.

This packet also contains an HE-SIG1 symbol 455, an HE-SIG2 symbol 457, and one or more HE-SIG3 symbols 459. The structure of these symbols should be backward compatible with IEEE 802.11a/b/g/n/ac devices, and should also signal OFDMA HE devices that the packet is an HE packet. To be backward compatible with IEEE 802.11a/b/g/n/ac devices, appropriate modulation may be used on each of these symbols. In some implementations, the first symbol, HE-SIG1 455 may be modulated with BPSK modulation. This will cause the same effect on 11a/b/g/n device as is currently the case with 11ac packets that also have their first SIG symbol BPSK modulated. For these devices, it does not matter what the modulation is on the subsequent HE-SIG symbols 457, 459. The second symbol 457 may be BPSK or QPSK modulated. If BPSK modulated, an 11ac device will assume the packet is an 11a/b/g packet, and will stop processing the packet, and will defer for the time defined by the length field of L-SIG 26. If QBPSK modulated, an 11ac device will produce a CRC error during preamble processing, and will also stop processing the packet, and will defer for the time defined by the length field of L-SIG. To signal HE devices that this is an HE packet, at least the first symbol of HE-SIG3 459 may be QBPSK modulated.

The information necessary to establish an OFDMA multiple access communication may be placed in the HE-SIG fields 455, 457, and 459 in a variety of positions. In the example of FIG. 5, HE-SIG1 455 contains the tone allocation information for OFDMA operation. HE-SIG3 459 contains bits defining user specific modulation type for each multiplexed user. In addition, HE-SIG2 457 contains bits defining user specific MIMO spatial streams, such as is provided in the 11ac format of FIG. 4. The example of FIG. 5 may allow four different users to be each assigned a specific sub-band of tones and a specific number of MIMO space time streams. 12 bits of space time stream information allows three bits for each of four users such that 1-8 streams can be assigned to each one. 16 bits of modulation type data allows four bits for each of four users, allowing assignment of any one of 16 different modulation schemes (16QAM, 64QAM, etc.) to each of four users. 12 bits of tone allocation data allows specific sub-bands to be assigned to each of four users.

Figure 6:
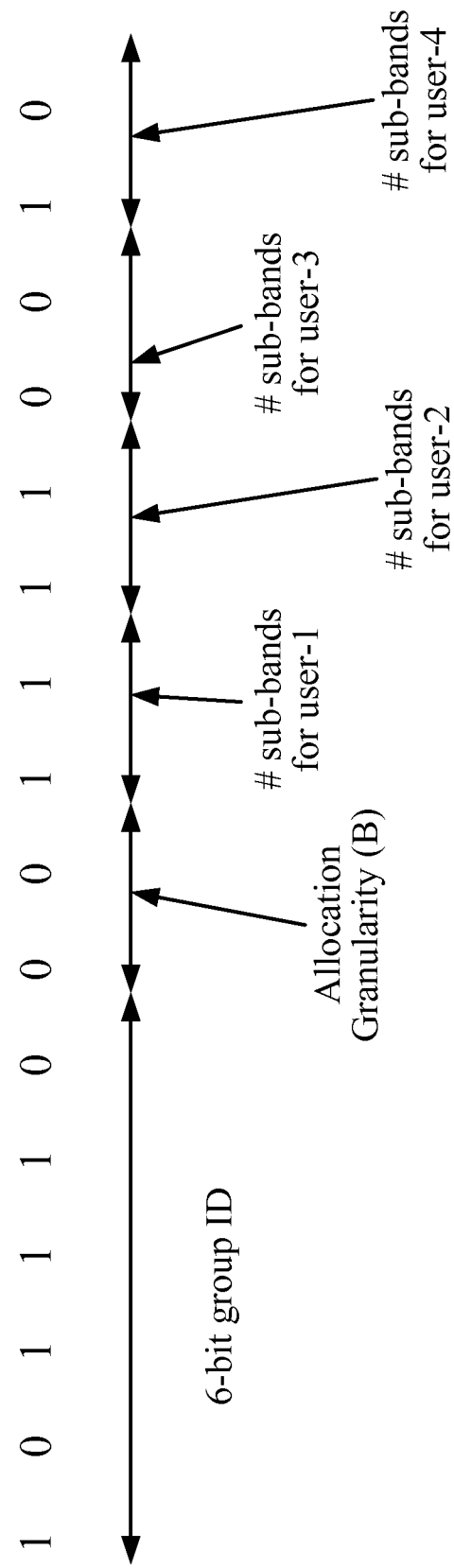
FIG. 6 illustrates an exemplary illustration of a signal which may be used to identify STAs and to allocate sub-bands to those STAs.

One example SIG field scheme for subband allocation is illustrated in FIG. 6. This example includes a 6 bit Group ID field similar to that currently used in IEEE 802.11ac as well as 10 bits of information to allocate sub-band tones to each of four users. The bandwidth used to deliver the packet 130 may be allocated to STAs in multiples of some number of MHz. For example, the bandwidth may be allocated to STAs in multiples of B MHz. The value of B may be a value such as 1, 2, 5, 10, 15, or 20 MHz. The values of B may be provided by the two bit allocation granularity field of FIG. 6. For example, the HE-SIG 155 may contain one two-bit field, which allows for four possible values of B. For example, the values of B may be 5, 10, 15, or 20 MHz, corresponding to values of 0-3 in the allocation granularity field. In some aspects, a field of k bits may be used to signal the value of B, defining a number from 0 to N, where 0 represents the least flexible option (largest granularity), and a high value of N represents the most flexible option (smallest granularity). Each B MHz portion may be referred to as a sub-band.

The HE-SIG1 may further use 2 bits per user to indicate the number of sub-bands allocated to each STA. This may allow 0-3 sub-bands to be allocated to each user. The group-id (G_ID) concept from 802.11ac may be used in order to identify the STAs which will receive data in an OFDMA packet. This 6-bit G_ID may identify up to four STAs, in a particular order, in this example.

In this example, the allocation granularity field is set to "00." In this example, the allocation granularity field is a two-bit field, the values of which may correspond to 5, 10, 15 or 20 MHz, in order. For example, a "00" may correspond to an allocation granularity of 5 MHz.

In this example, the first two bits give the number of sub-bands for the first user identified by the G_ID. Here, user-1 is given "11" sub-bands. This may correspond to user-1 receiving 3 sub-bands. If each sub-band is 5 MHz, this may mean the user-1 is allocated 15 MHz of spectrum. Similarly, user-2 also receives 3 sub-bands, while user-3 receives zero sub-bands, and user-4 receives 2 sub-bands. Thus, this allocation may correspond to a 40 MHz signal, in which 15 MHz is used for both user-1 and user-2, while user-4 receives 10 MHz, and user-3 does not receive any sub-bands.

The training fields and data which is sent after the HE-SIG symbols is delivered by the AP according to the allocated tones to each STA. This information may potentially be beamformed. Beamforming this information may have certain advantages, such as allowing for more accurate decoding and/or providing more range than non-beamformed transmissions.

Depending on the space time streams assigned to each user, different users may require a different number of HE-LTFs 165. Each STA may require a number of HE-LTFs 165 that allows channel estimation for each spatial stream associated with that STA, which is generally equal to or more than the number of spatial streams. LTFs may also be used for frequency offset estimation and time synchronization. Because different STA's may receive a different number of HE-LTFs, symbols may be transmitted from the AP that contain HE-LTF information on some tones and data on other tones.

In some aspects, sending both HE-LTF information and data on the same OFDM symbol may be problematic. For example, this may increase the peak-to-average power ratio (PAPR) to too high a level. Thus, it may be beneficial to instead to transmit HE-LTFs 165 on all tones of the transmitted symbols until each STA has received at least the required number of HE-LTFs 165. For example, each STA may need to receive one HE-LTF 165 per spatial stream associated with the STA. Thus, the AP may be configured to transmit a number of HE-LTFs 165 to each STA equal to the largest number of spatial streams assigned to any STA. For example, if three STAs are assigned a single spatial stream, but the fourth STA is assigned three spatial streams, in this aspect, the AP may be configured to transmit four symbols of HE-LTF information to each of the four STAs before transmitting symbols containing payload data.

It is not necessary that the tones assigned to any given STA be adjacent. For example, in some implementations, the sub-bands of the different receiving STAs may be interleaved. For example, if each of user-1 and user-2 receive three sub-bands, while user-4 receives two sub-bands, these sub-bands may be interleaved across the entire AP bandwidth. For example, these sub-bands may be interleaved in an order such as 1,2,4,1,2,4,1,2. In some aspects, other methods of interleaving the sub-bands may also be used. In some aspects, interleaving the sub-bands may reduce the negative effects of interferences or the effect of poor reception from a particular device on a particular sub-band. In some aspects, the AP may transmit to STAs on the sub-bands that the STA prefers. For example, certain STAs may have better reception in some sub-bands than in others. The AP may thus transmit to the STAs based at least in part on which sub-bands the STA may have better reception. In some aspects, the sub-bands may also not be interleaved. For example, the sub-bands may instead be transmitted as 1,1, 1,2,2,2,4,4. In some aspects, it may be pre-defined whether or not the sub-bands are interleaved.

Figure 7:
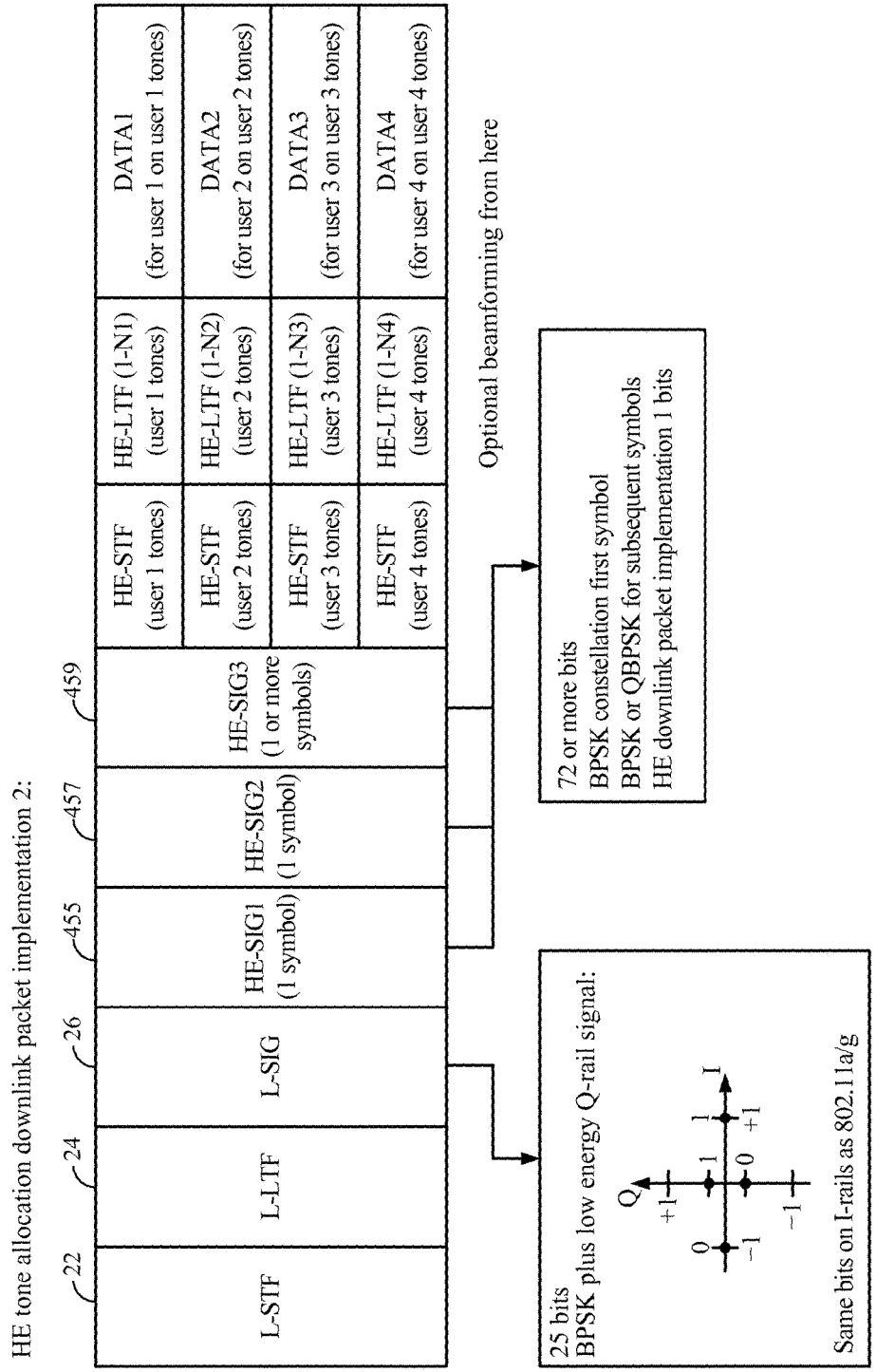
FIG. 7 illustrates a $2^{nd}$ exemplary structure of a downlink physical-layer packet which may be used to enable backward-compatible multiple access wireless communications.

In the example of FIG. 5, HE-SIG3 symbol modulation is used to signal HE devices that the packet is an HE packet. Other methods of signaling HE devices that the packet is an HE packet may also be used. In the example of FIG. 7, the L-SIG 126 may contain information that instructs HE devices that an HE preamble will follow the legacy preamble. For example, the L-SIG 26 may contain a low-energy, 1-bit code on the Q-rail which indicates the presence of a subsequent HE preamble to HE devices sensitive to the Q signal during the L-SIG 26. A very low amplitude Q signal can be used because the single bit signal can be spread across all the tones used by the AP to transmit the packet. This code may be used by high efficiency devices to detect the presence of an HE-preamble/packet. The L-SIG 26 detection sensitivity of legacy devices need not be significantly impacted by this low-energy code on the Q-rail. Thus, these devices will be able to read the L-SIG 26, and not notice the presence of the code, while HE devices will be able to detect the presence of the code. In this implementation, all of the HE-SIG fields can be BPSK modulated if desired, and any of the techniques described herein related to legacy compatibility can be used in conjunction with this L-SIG signaling.

Figure 8:
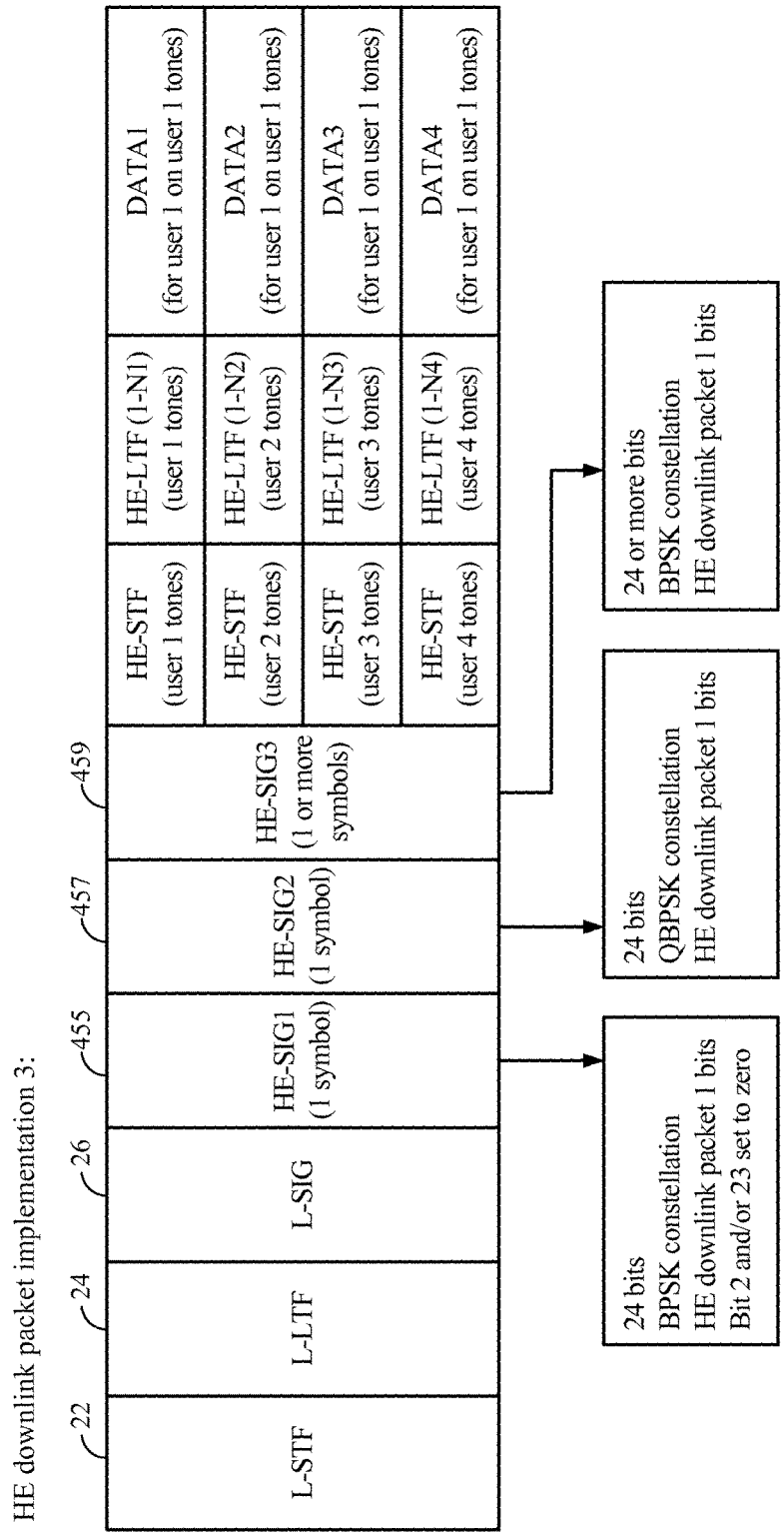
FIG. 8 illustrates a $3^{rd}$ exemplary structure of a downlink physical-layer packet which may be used to enable backward-compatible multiple access wireless communications.

FIG. 8 illustrates another method to implement backward compatibility with 11ac devices as well. In this example, the HE-SIG-A1 455 may contain a bit that is set to a value flipped from the value that an 11ac device requires when decoding a VHT-SIG field. For example, an 802.11ac VHT-SIG-A field contains bits 2 and 23 which are reserved and set to 1 in a correctly assembled VHT-SIG-A field. In the high efficiency preamble HE-SIG-A 455, one or both of these bits may be set to zero. If an 802.11ac device receives a packet which contains a reserved bit with such a flipped value, an 11ac device stop processing the packet, treating it as undecodable, while still defering to the packet for the duration specified in the L-SIG 26. In this implementation, backward compatibility with 11a/b/g/n devices can be achieved by using BPSK modulation on the HE-SIG1 symbol 455, and signaling HE devices can be achieved by using QBPSK modulation on one or more symbols of HE-SIG2 457 or HE-SIG3 459.

Figure 9:
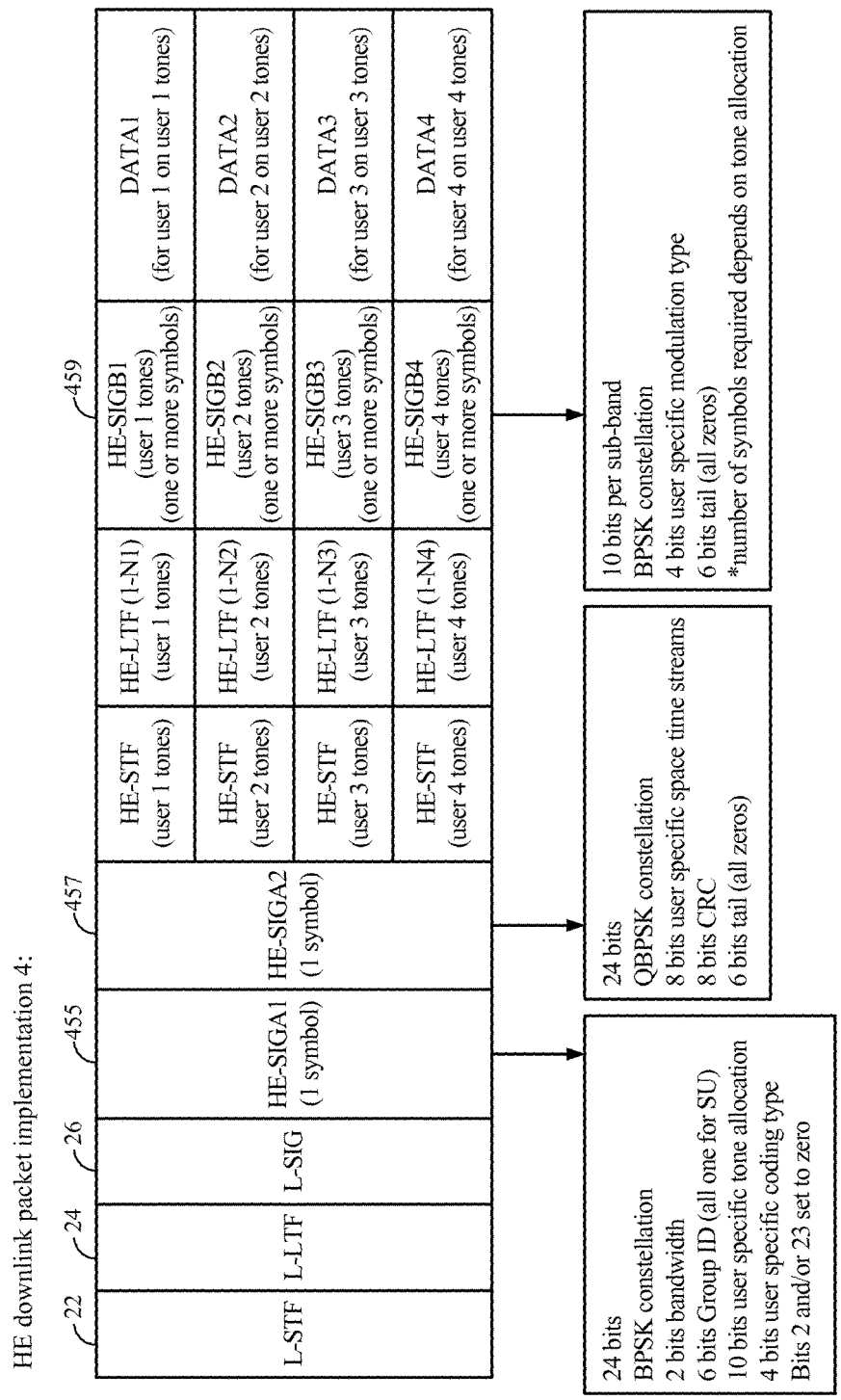
FIG. 9 illustrates a $4^{th}$ exemplary structure of a downlink physical-layer packet which may be used to enable backward-compatible multiple access wireless communications.

As shown by the example illustrated in FIG. 9, the structure of an HE packet may be based upon the packet structure utilized in 802.11ac. In this example, after the legacy preamble 22, 24, 26, two symbols are provided, termed HE-SIGA1 and HE-SIGA2 in FIG. 9. This is the same structure as the VHT-SIGA1 and VHT-SIGA2 of FIG. 4. To fit both space time stream allocation and tone allocation into these two 24 bit symbols, less freedom is provided for space time stream options.

The example of FIG. 9 also places an HE-SIGB symbol 459 after the HE training fields, which is also analogous to the VHT-SIGB field 154 of FIG. 4.

However, one potential problem with this 11ac-based preamble is that this design may run into space limitations in the HE-SIG-B 470. For example, the HE-SIG-B 470 may need to contain at least the MCS (4 bits) and the tail bits (6 bits). Thus, the HE-SIG-B 470 may need to contain be at least 10 bits of information. In the 802.11ac specification, the VHT-SIG-B is one OFDM symbol. However, there may not be a sufficient number of bits in a single OFDM symbol, depending upon the bandwidth of each sub-band. For example, Table 1 below illustrates this potential issue.

TABLE 1

| BW per user (in MHz) | # of bits per user/ OFDM symbol | # of tail bits | # of bits remaining for MCS field |
|---|---|---|---|
| 10 | 13 | 6 | 7 |
| 6 | 8 | 6 | 2 |
| 5 | 6 | 6 | 0 |

Figure 10:
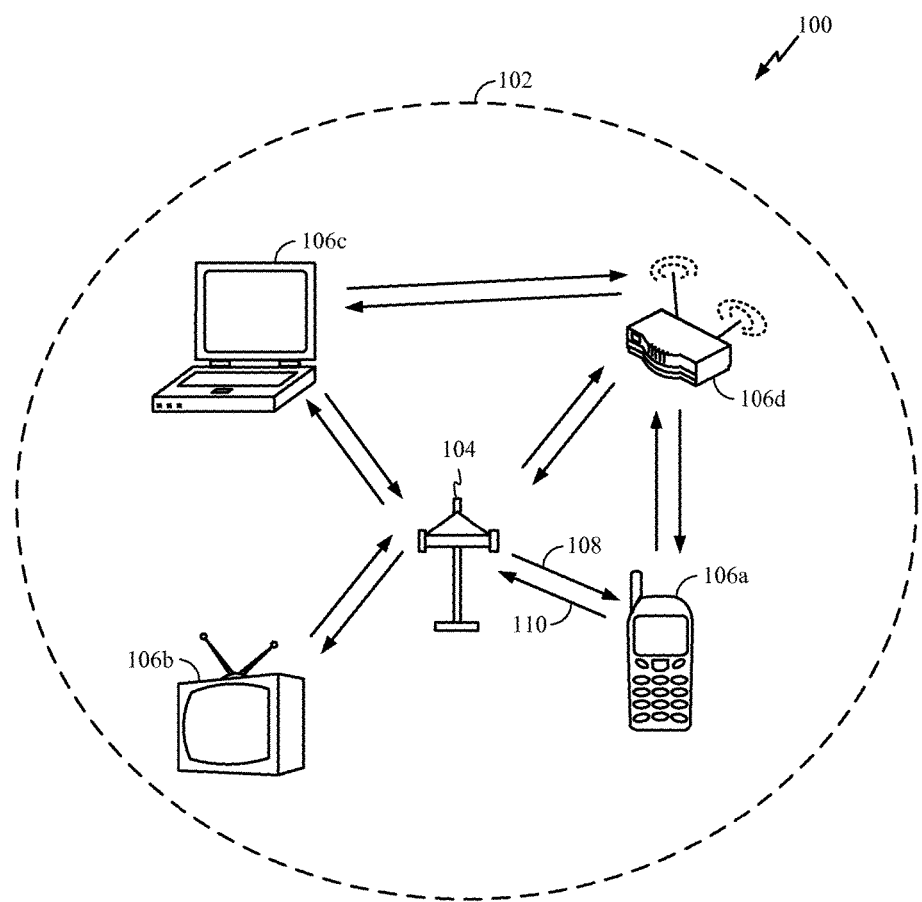
FIG. 10 illustrates an example of a wireless communication system in which aspects of the present disclosure may be employed.

As illustrated in Table 1, if each sub-band is 10 MHz, a single OFDM symbol provides 13 bits. Six of these bits are necessary as tail bits, and thus, 7 bits remain for the MCS field. The MCS field, as noted above, requires four bits. Thus, if each sub-band is at least 10 MHz, a single OFDM symbol may be used for the HE-SIG-B 470, and this may be sufficient to include the 4 bit MCS field. However, if each sub-band is instead 5 or 6 MHz, this may only allow 6 or 8 bits per OFDM symbol. Of these bits, 6 bits are tail bits. Thus, only 0 or 2 bits are available for the MCS field. This is insufficient to provide the MCS field. In those cases where the sub-band granularity is too small to provide the required information in the SIGB fields, more than one OFDM symbol may be used for the HE-SIG-B 470. The number of symbols needed will be related to the smallest sub-band the system will allow. If this is 5 MHz, corresponding to 13 tones in the IEEE 802.11 family OFDM system, two symbols for the HE-SIG-B would allow BPSK modulation and a ½ forward error correction code rate to provide 12 bits, which is a sufficient length for the HE-SIG-B information MCS and tail bits. FIG. 10 illustrates an example of a wireless communication system 100 in which aspects of the present disclosure may be employed. The wireless communication system 100 may operate pursuant to a wireless standard, for example the IEEE 802.11 standards. The wireless communication system 100 may include an AP 104, which communicates with STAs 106a, 106b, 106c, and 106d (collectively STAs 106). The network may include both legacy STAs 106b and high efficiency (HE) STAs 106a, 106c, 106d.

A variety of processes and methods may be used for transmissions in the wireless communication system 100 between the AP 104 and the STAs 106. For example, signals may be sent and received between the AP 104 and the STAs 106 in accordance with OFDM/OFDMA techniques. If this is the case, the wireless communication system 100 may be referred to as an OFDM/OFDMA system.

A communication link that facilitates transmission from the AP 104 to one or more of the STAs 106 may be referred to as a downlink (DL) 108, and a communication link that facilitates transmission from one or more of the STAs 106 to the AP 104 may be referred to as an uplink (UL) 110. Alternatively, a downlink 108 may be referred to as a forward link or a forward channel, and an uplink 110 may be referred to as a reverse link or a reverse channel. In some aspects, some DL 108 communications may be HE packets, such as HE packet 130. Such HE packets may contain legacy preamble information, such as preamble information in according with specifications such as 802.11a and 802.11n, which contains information sufficient to cause legacy STA 106b to recognize the HE packet 130 and to defer to the transmission of the HE packet 130 for the duration of the transmission. Similarly, the DL 108 communications which are HE packets 130 may contain information sufficient to inform HE STAs 160a, 106c, 106d which devices may receive information in the HE packet 130, as discussed above.

The AP 104 may act as a base station and provide wireless communication coverage in a basic service area (BSA) 102. The AP 104 along with the STAs 106 associated with the AP 104 and that use the AP 104 for communication may be referred to as a basic service set (BSS). It should be noted that the wireless communication system 100 may not have a central AP 104, but rather may function as a peer-to-peer network between the STAs 106. Accordingly, the functions of the AP 104 described herein may alternatively be performed by one or more of the STAs 106.

Figure 11:
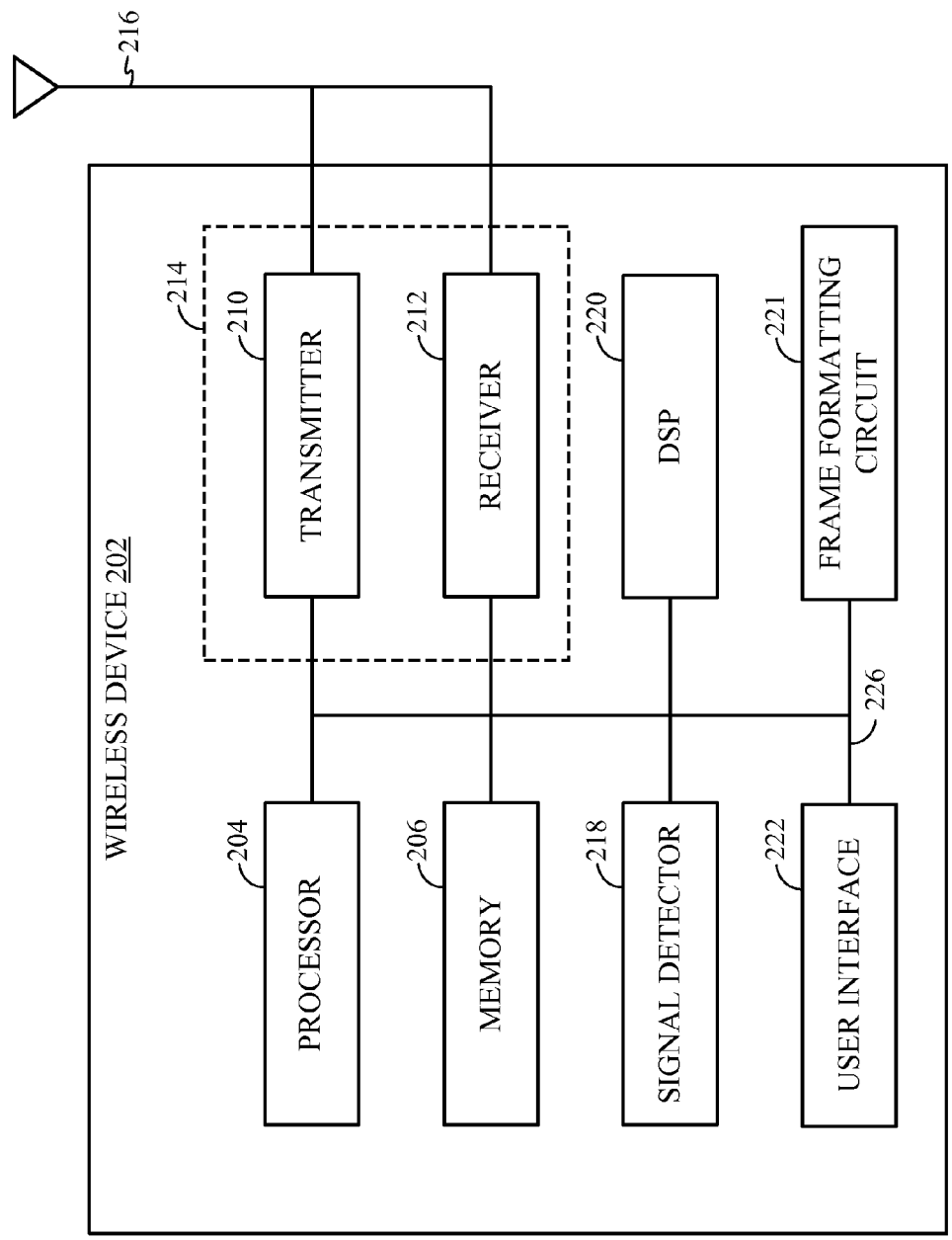
FIG. 11 shows a functional block diagram of an exemplary wireless device that may be employed within the wireless communication system of FIG. 1.

FIG. 11 illustrates various components that may be utilized in a wireless device 202 that may be employed within the wireless communication system 100. The wireless device 202 is an example of a device that may be configured to implement the various methods described herein. For example, the wireless device 202 may comprise the AP 104 or one of the STAs 106 of FIG. 10. In some aspects, the wireless device 202 may comprise an AP that is configured to transmit HE packets, such as HE packet 130.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein. For example if the wireless device 202 is an AP 104, the memory 206 may contain instructions sufficient to allow the wireless device 202 to transmit HE packets, such as HE packet 130. For example, the memory 206 may contain instructions sufficient to allow the wireless device 202 to transmit a legacy preamble, followed by an HE preamble, including an HE-SIG or an HE-SIG-A. In some aspects, the wireless device 202 may include a frame formatting circuit 221, which may contain instructions sufficient to allow the wireless device 202 to transmit a frame according to embodiments disclosed herein. For example, the frame formatting circuit 221 may contain instructions sufficient to allow the wireless device 202 to transmit a packet which includes both a legacy preamble and a high-efficiency preamble.

The processor 204 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 202 may also include a housing 208 that may include a transmitter 210 and a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals. The DSP 220 may be configured to generate a data unit for transmission. In some aspects, the data unit may comprise a physical layer data unit (PPDU). In some aspects, the PPDU is referred to as a packet.

The wireless device 202 may further comprise a user interface 222 in some aspects. The user interface 222 may comprise a keypad, a microphone, a speaker, and/or a display. The user interface 222 may include any element or component that conveys information to a user of the wireless device 202 and/or receives input from the user.

The various components of the wireless device 202 may be coupled together by a bus system 226. The bus system 226 may include a data bus, for example, as well as a power bus, a control signal bus, and a status signal bus in addition to the data bus. Those of skill in the art will appreciate the components of the wireless device 202 may be coupled together or accept or provide inputs to each other using some other mechanism.

Although a number of separate components are illustrated in FIG. 11, one or more of the components may be combined or commonly implemented. For example, the processor 204 may be used to implement not only the functionality described above with respect to the processor 204, but also to implement the functionality described above with respect to the signal detector 218 and/or the DSP 220. Further, each of the components illustrated in FIG. 11 may be implemented using a plurality of separate elements. Furthermore, the processor 204 may be used to implement any of the components, modules, circuits, or the like described below, or each may be implemented using a plurality of separate elements.

Figure 12:
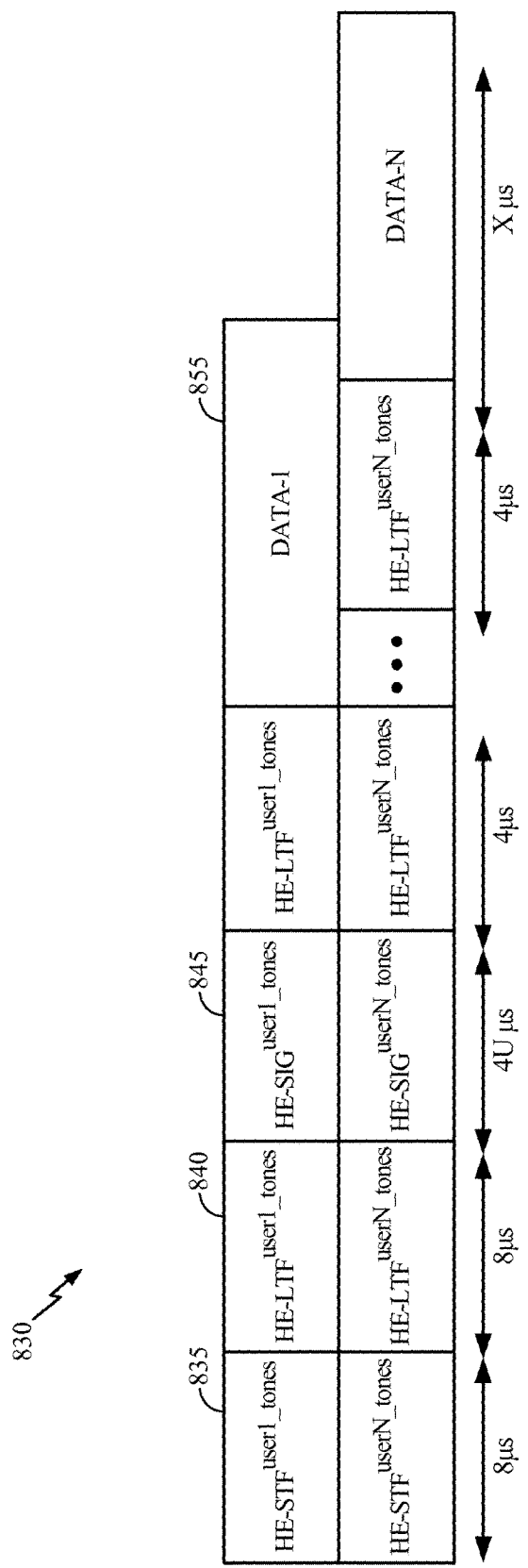
FIG. 12 illustrates an exemplary structure of an uplink physical-layer packet which may be used to enable backward-compatible multiple access wireless communications.

FIG. 12 illustrates an exemplary structure of an uplink physical-layer packet 830 which may be used to enable backward-compatible multiple access wireless communications. In such an uplink message, no legacy preamble is needed, as the NAV is set by the AP's initial downlink message. Thus, the uplink packet 830 does not contain a legacy preamble. The uplink packet 830 may be sent in response to a UL-OFDMA-announce message that is sent by the AP.

The uplink packet 830 may be sent by a number of different STAs. For example, each STA that is identified in the downlink packet may transmit a portion of the uplink packet 830. Each of the STAs may transmit in its assigned bandwidth or bandwidths simultaneously, and the transmissions may be received by the AP as a single packet.

In the packet 830, each STA uses only the channels, or sub-bands, assigned to it during the tone assignment in the initial downlink message, as discussed above. This allows for completely orthogonal receive processing on the AP. In order to receive messages on each of these sub-bands, the AP must receive pilot tones. These pilot tones are used in 802.11 packets for phase tracking, in order to estimate a phase offset per symbol to correct for phase changes across data symbols due to residual frequency offset or due to phase noise. This phase offset may also feed into time and frequency tracking loops.

In order to transmit pilot tones, at least two different options may be used. First, each user may transmit the pilot tones that fall into its assigned sub-bands. However, for low bandwidth OFDMA allocations, this may not allow a sufficient number of pilot tones for some users. For example, there are 4 pilot tones in a 20 MHz transmission in 802.11a/n/ac. However, if a user only has 5 MHz assigned to it, the user may have only one pilot tone in its sub-band. If some problem, such as a deep fade, occurs with that pilot tone, it may be very difficult to obtain a good phase estimate.

Another possible method of transmitting pilot tones may involve each user transmitting on all the pilot tones, not just those which fall in its sub-band. This may result in a larger number of pilot tones being transmitted per user. But, this may result in the AP receiving each pilot tone from multiple users simultaneously, which may be more difficult for the AP to process. The AP would need to estimate channels for all users. In order to accomplish this, more LTFs may be needed, such as one that corresponds to the sum of all users' spatial streams. For example, if each of four users were associated with two spatial streams, in this approach, eight LTFs may be used.

Thus, each STA may transmit an HE-STF 835. As shown in packet 830, the HE-STF 835 may be transmitted in 8 us, and contain two OFDMA symbols. Each STA may also transmit one or more HE-LTF 840. As shown in packet 830, the HE-LTF 840 may be transmitted in 8 us, and contain two OFDMA symbols. For example, as before, each STA may transmit a HE-LTF 840 for each sub-band assigned to the STA. Each STA may also transmit a HE-SIG 845. The length of the HE-SIG 845 may be one ODFMA symbol long (4 us) for each of U, where U is the number of STAs multiplexed in the transmission. For example, if four STAs are sending the uplink packet 830, the HE-SIG 845 may be 16 us. After the HE-SIG 845, additional HE-LTFs 840 may be transmitted. Finally, each STA may transmit data 855.

In order to send a combined uplink packet 830, each of the STAs may be synchronized with each other in time, frequency, and in power with the other STAs. The timing synchronization required for such a packet may be on the order of approximately 100 ns. This timing may be coordinated by responding to the AP's UL-OFDMA-announce message. This timing accuracy may be obtained using several solutions which are known to those of skill in the art. For example, techniques used by 802.11ac and 802.11n devices in order to time short interframe space (SIFS) may be sufficient to provide the timing accuracy needed in order to obtain a combined uplink packet 830. This timing accuracy may also be maintained by using an 800 ns long guard interval only for the uplink OFDMA to get 400 ns guard time, in order to absorb timing errors and round trip delay differences between uplink clients.

Another technical issue that must be addressed by the uplink packet 830 is that the frequencies of the sending devices must be synchronized. There are multiple options to deal with frequency-offset synchronization among STAs in an UL-OFDMA system, such as that of uplink packet 830. First, each STA may calculate and correct for its frequency differences. For example, the STAs may calculate a frequency offset with respect to the AP, based upon the UL-OFDMA-announce message sent to the STAs. Based upon this message, the STAs may apply a phase ramp on the time-domain uplink signal. The AP may also estimate the common phase offset for each STA, using the LTFs. For example, the LTFs which are transmitted by the STAs may be orthogonal in frequency. Hence, the AP can use a windowed inverse fast Fourier transform (IFFT) function to separate the STA impulse responses. The variation of these impulse responses across two identical LTF symbols may give us a frequency offset estimate for every user. For example, frequency offset in a STA may lead to phase ramp, over time. Thus, if two identical LTF symbols are transmitted, the AP may be able to use the differences between the two symbols to calculate a slope of the phase across the two impulse responses in order to get an estimate of the frequency offset. This approach may be similar to the tone-interleaved approach that has been proposed in UL-MU-MIMO message, which may be known to persons of skill in the art.

Figure 13:
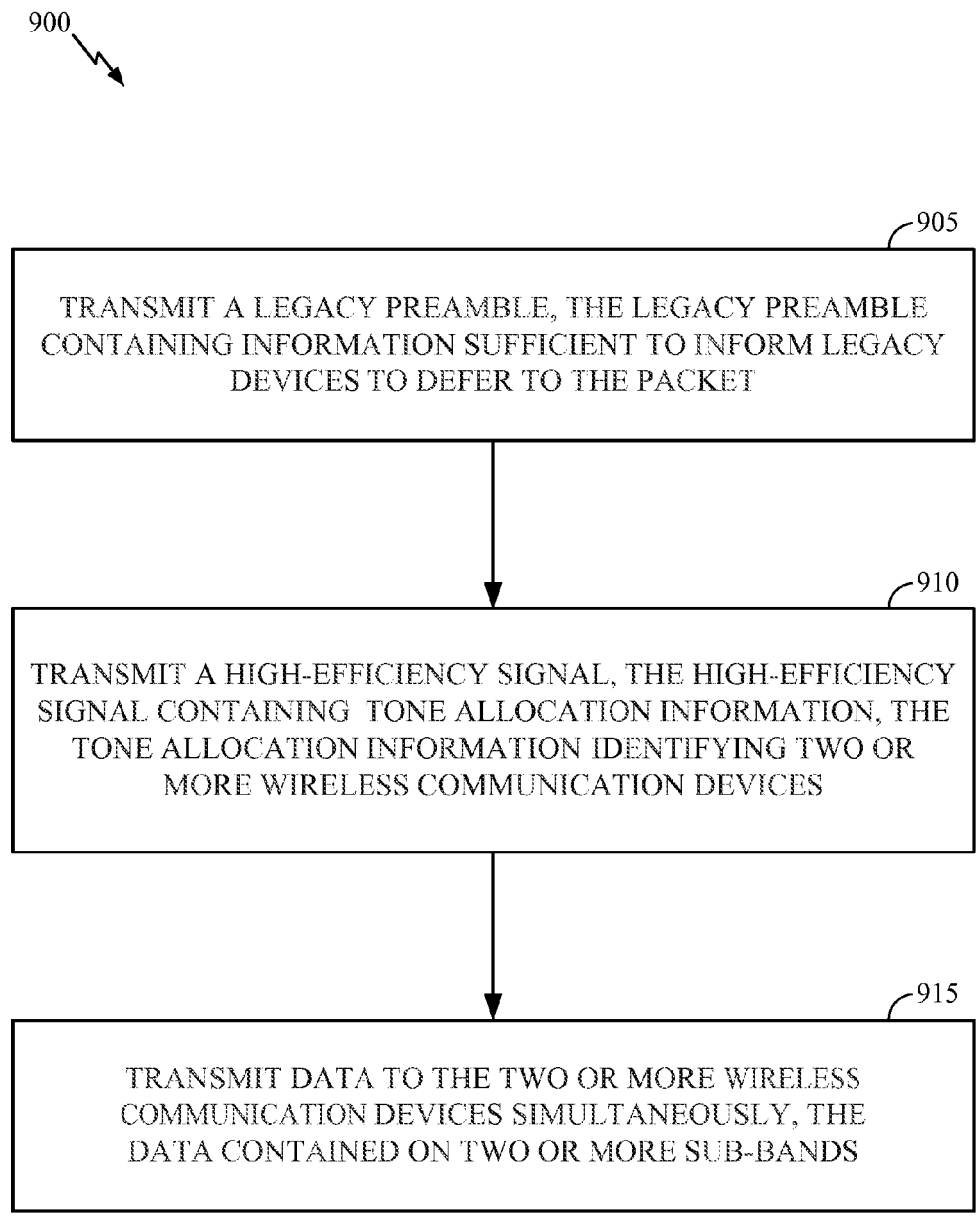
FIG. 13 illustrates a process flow diagram for an example method of a transmitting a high-efficiency packet to two or more wireless communication devices.

FIG. 13 illustrates a process flow diagram for an example method of a transmitting a high-efficiency packet to two or more wireless communication devices. This method may be done by a device, such as an AP.

At block 905, the AP transmits a legacy preamble, the legacy preamble containing information sufficient to inform legacy devices to defer to the packet. For example, the legacy preamble may be used to alert legacy devices to defer to the packet. The legacy packet may contain a reserved bit or a combination of reserved bits. These reserved bits may alert high-efficiency devices to continue listening to the packet for a high-efficient preamble, while also causing legacy devices to defer to the packet. In some aspects, the means for transmitting a legacy preamble, the legacy preamble containing information sufficient to inform legacy devices to defer to the packet, may comprise a transmitter.

At block 910, the AP transmits a high-efficiency signal, the high-efficiency signal containing tone allocation information, the tone allocation information identifying two or more wireless communication devices. In some aspects, the high-efficiency signal may contain tone allocation information, which may include information that identifies the STAs that will receive information in the packet, and may alert those STAs which sub-bands are intended for them. In some aspects, the high-efficiency packet may also include information sufficient to cause 802.11ac devices to defer to the packet. In some aspects, the means for transmitting a high-efficiency signal, the high-efficiency signal containing tone allocation information, the tone allocation information identifying two or more wireless communication devices may comprise a transmitter. In some aspects, the high-efficiency signal may further comprise an indication of a number of spatial streams may be assigned to each of the two or more wireless communications devices. For example, each of the two or more wireless communications devices may be assigned one or more spatial streams. In some aspects, the means for assigning one or more spatial streams to each of the two or more wireless communications devices may comprise a transmitter or a processor.

At block 915, the AP transmits data to the two or more wireless communication devices simultaneously, the data contained on two or more sub-bands. For example, the AP may transmit data to up to four STAs. In some aspects, the means for transmitting data to the two or more wireless communication devices simultaneously, the data contained on two or more sub-bands may comprise a transmitter.

In some aspects, an AP may transmit a hybrid packet, which includes data for both for a legacy device, such as an IEEE 802.11a/n/ac device, and data for one or more high-efficiency devices. Such a hybrid packet may allow more efficient uses of bandwidth in mixed environments containing both legacy and high-efficiency devices. For example, in a legacy system if an AP is configured to use 80 MHz, a portion of the bandwidth assigned to the AP may go unused if the AP is transmitting a packet to a device that is not capable of using the full 80 MHz. This is one problem that is addressed by the use of high-efficiency packets. However, in an environment in which some of the STAs are high-efficiency and some of the STAs are legacy devices, bandwidth may still go unused when transmitting to legacy devices that are not capable of using the full bandwidth that the AP is configured to use. For example, while the high-efficiency packets in such a system may use the full bandwidth, as discussed above, legacy packets may not. Thus, it may be beneficial to provide a hybrid packet, in which a legacy device may receive information in one portion of the bandwidth of a packet, while high-efficiency devices may receive information in another portion of the packet. Such a packet may be referred to as a hybrid packet, as a portion of the packet may transmit data in a legacy-compatible format, such as IEEE 802.11a/n/ac, and a portion of the packet may transmit data to high-efficiency devices.

Figure 14:
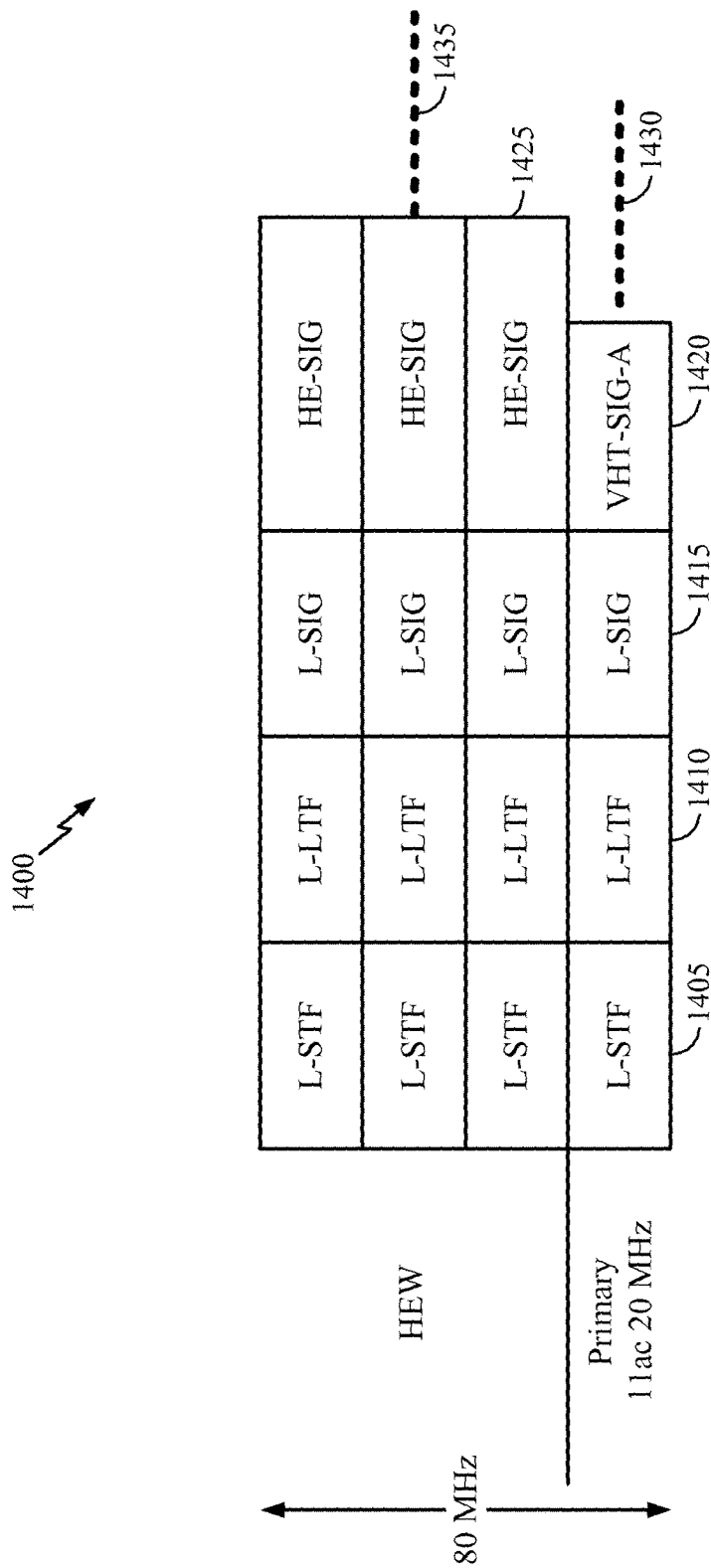
FIG. 14 illustrates an exemplary structure of a hybrid downlink physical-layer packet which may be used to enable backward-compatible multiple access wireless communications.

An exemplary hybrid packet 1400 is illustrated in FIG. 14. Such a hybrid packet may be transmitted by a wireless device, such as an AP. A hybrid packet may include a legacy portion, in which data is transmitted to a legacy device, and a high-efficiency portion, in which data is transmitted to a high-efficiency device.

A hybrid packet 1400 may include a number of legacy preambles, each duplicated over some portion of the bandwidth of the packet. For example, the exemplary hybrid packet 1400 is illustrated as an 80 MHz packet, which contains four 20 MHz legacy preambles duplicated over the 80 MHz of bandwidth of the packet 1400. Such duplication may be used in legacy formats, in order to ensure that other devices, which may operate on only a portion of the 80 MHz bandwidth, defer to the packet. In some aspects each of the devices in the network may, by default, monitor only the primary channel.

A hybrid packet 1400 may include an L-STF 1405 and an L-LTF 1410 which are the same as those specified in legacy formats, such as IEEE 802.11a/n/ac. These fields may be the same as those discussed above. However, the L-SIG 1415 of a hybrid packet 1400 may differ from that of a legacy packet. The L-SIG 1415 may contain information which is used to signal to high-efficiency devices that the packet is a hybrid packet. In order for legacy devices to be able to also receive information in the packet, this information must be hidden from the legacy devices, such that it does not disrupt their reception of the L-SIG 1415.

The L-SIG 1415 may signal to high-efficiency devices that the packet is a hybrid packet by placing a one-bit code orthogonal to the information in the L-SIG 1415. For example, as discussed above, a one-bit code may be placed on the Q-rail of the L-SIG 1415. Legacy devices may not notice the one-bit code, and may be able to read the L-SIG 1415 as normal, while high-efficiency devices may look specifically for this one-bit code, and be able to determine whether or not it is present. This one-bit code may be used to signal to high-efficiency devices that a hybrid packet is being sent. In some aspects, the one-bit code may be hidden from or invisible to legacy devices, which may not be configured to look for the code. In some aspects, legacy devices may be able to understand the L-SIG 1415 without observing any irregularities due to the presence of the one-bit code. In some aspects, only the L-SIG 1415 in the primary channel may contain the one-bit code to instruct high-efficiency devices to look at other channels for an HE-SIG 1425. In some aspects, a number of L-SIGs 1415 may have this one-bit indicator, where the number of L-SIGs 1415 with the indicator is equal to the number of channels which are to be used for the legacy packet. For example, if the legacy packet will include both the first and second channels, but not a third channel, then the L-SIG in the first and second channels may contain the one-bit indicator, while the L-SIG in the third channel may not contain this indicator. High-efficiency devices may be configured to look for the first channel with an L-SIG that does not contain a one-bit code, and to monitor that channel for the presence of an HE-SIG 1425. In some aspects, the bandwidth information in a VHT-SIG-A 1420 may contain information regarding how much bandwidth the legacy packet 1430 will use, and thus, at which bandwidth the HE packet 1435 may begin. In some aspects, the one-bit code may only be included in L-SIGs 1415 which are being transmitted in channels which will be used for transmitting data to HE devices. For example, if the first channel is used to transmit to a legacy device, and three other channels are used to transmit to HE devices in a particular packet, each of the L-SIGs 1415 transmitted in the three other channels may include the one-bit code. In some aspects, in an HE packet, each L-SIG 1415 may include the one-bit code to indicate that each channel may be used to transmit data to HE devices. In some aspects, this may allow the bandwidth used for the HE portion of an HE packet or a hybrid packet to be signaled using the L-SIG 1415 of the packet. If the bandwidth used for the HE portion of the packet is signaled in the L-SIG 1415, this may allow the HE-SIG 1425 in a HE packet or a hybrid packet to span a larger portion of the bandwidth assigned to the HE portion of the packet. For example, the HE-SIG 1425 may be configured to span the bandwidth assigned to the HE packet. In some aspects, using more bandwidth for the HE-SIG 1425, rather than only using 20 MHz for the HE-SIG 1425, may allow more information to be transmitted in the HE-SIG 1425. In some aspects, the first symbol of the HE-SIG 1425 may be transmitted in duplicate on each 20 MHz of the bandwidth assigned to the HE portion of the packet, while the remaining symbols of the HE-SIG 1425 may be transmitted using the full bandwidth assigned to the HE portion of the packet. For example, the first symbol of the HE-SIG 1425 may be used to transmit the bandwidth allocated to the HE portion of the HE or hybrid packet, and thus, subsequent symbols may be transmitted on the entire bandwidth assigned to the HE portion of the packet.

Upon receiving the one-bit code in the L-SIG 1415, high-efficiency devices may be configured to look in higher-bandwidth portions of the bandwidth allocated to the AP, such as higher-bandwidth channels, to find an HE-SIG 1425.

For example, in the hybrid packet 1400, upon receiving the L-SIG 1415 with the one-bit code in an orthogonal direction, high-efficiency devices may be configured to look in the 20 MHz channels apart from the channel carrying data to legacy devices for HE-SIGs, such as HE-SIG 1425, which may be transmitted in other frequency bands, alongside a legacy packet. For example, in exemplary hybrid packet 1400, HE-SIG 1425 is illustrated as being transmitted simultaneously with VHT-SIG-A 1420. In this example, the hybrid packet 1400 may include an IEEE 802.11ac-compatible packet on the lower portion of the bandwidth, and a high-efficiency packet on the higher portion of the bandwidth. The hybrid packet 1400 may also contain an IEEE 802.11a or IEEE 802.11n-compatible packet in the lower portion. Importantly, regardless of which type of packet the lower portion is, the L-SIG 1415 may be configured to contain signaling information, sufficient to signal to high-efficiency devices that the packet is a hybrid packet, and thus, to look for an HE-SIG 1425 in another frequency.

In some aspects, the HE-SIG 1425 may be similar to any of the previous high-efficiency signal fields previously discussed. In some aspects, an AP which transmits both high-efficiency packets and hybrid packets may use a symbol with a rotated BPSK constellation (QBPSK) symbol in an HE-SIG 1425 to indicate that a packet is a high-efficiency packet, rather than using a one-bit signal in the Q-rail, as using a one-bit signal on the Q-rail may instead be used to signal that a packet is a hybrid packet, such as hybrid packet 1400. For example, the HE-SIG 1425 may be used to indicate to high-efficiency devices which device or devices may receiving information in the packet, such as by using a group ID, as discussed earlier. Thus, high-efficiency devices may be configured to receive and decode the L-STF 1405, L-LTF 1410, and L-SIG 1415. If the L-SIG 1415 includes a one-bit code, high-efficiency devices may be configured to locate and decode the HE-SIG 1425 which is at a higher frequency band, in order to determine whether the high-efficiency portion of the hybrid packet contains information for that particular device.

In some aspects, the legacy packet may, as illustrated, take up only 20 MHz of bandwidth. However, the legacy portion of the packet 1400 may also take up a different amount of bandwidth as well. For example, the legacy portion of the hybrid packet may comprise a 40 MHz, 60 MHz, 80 MHz or other size legacy packet, while the high-efficiency portion of the hybrid packet 1400 may use the remainder of the available bandwidth. In some aspects, channels of sizes other than 20 MHz may also be used. For example, channels may be 5, 10, 15, 40 MHz, or other sizes. In some aspects, following the legacy VHT-SIG-A 1420, a legacy packet 1430 may be transmitted in a primary channel to a legacy device. In some aspects, the legacy packet 1430 may include at least the primary channel, and may also include additional channels. For example, this legacy packet 1430 may be compatible with IEEE 802.11a, 802.11n, or 802.11ac devices. In some aspects, following the one or more HE-SIGs 1425, a high-efficiency packet 1435 may be transmitted to one or more high-efficiency devices, using at least a portion of the bandwidth available to the AP. In some aspects, the legacy packet may be sent to multiple legacy devices. For example, the hybrid packet may comprise a MU-MIMO 802.11ac packet, which is sent to two or more 802.11ac-compatible STAs.

Figure 15:
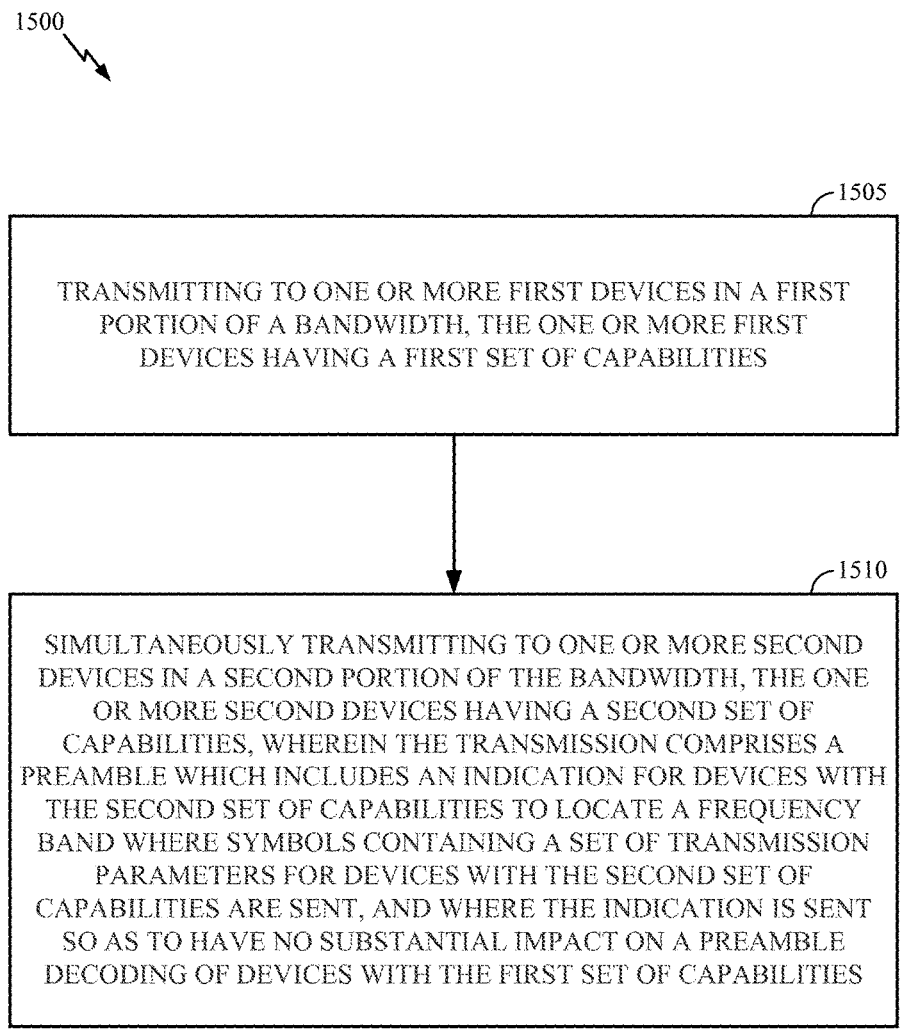
FIG. 15 illustrates an exemplary method of transmitting a hybrid packet.

FIG. 15 illustrates an exemplary method 1500 of transmitting a hybrid packet. This method may be done by a wireless device, such as an AP.

At block 1505, the AP transmits to one or more first devices in a first portion of a bandwidth, the one or more first devices having a first set of capabilities. In some aspects, the one or more first devices may be legacy devices. In some aspects, the first portion of the bandwidth may be a primary channel. In some aspects, the means for transmitting to a first device may be a transmitter.

At block 1510, the AP simultaneously transmits to one or more second devices in a second portion of the bandwidth, the one or more second devices having a second set of capabilities wherein the transmission comprises a preamble which includes an indication for devices with the second set of capabilities to locate a frequency band where symbols containing a set of transmission parameters for devices with the second set of capabilities are sent, and where the indication is sent so as to have no substantial impact on a preamble decoding of devices with the first set of capabilities. In some aspects, the means for transmitting to one or more second devices may be a transmitter. In some aspects, the preamble may be a legacy preamble, and the indication may be a one-bit code in an L-SIG in the legacy preamble. In some aspects, the indication may be contained in the L-SIG in the primary channel, in the primary channel and one or more other channels, or in other channels.

Figure 16:
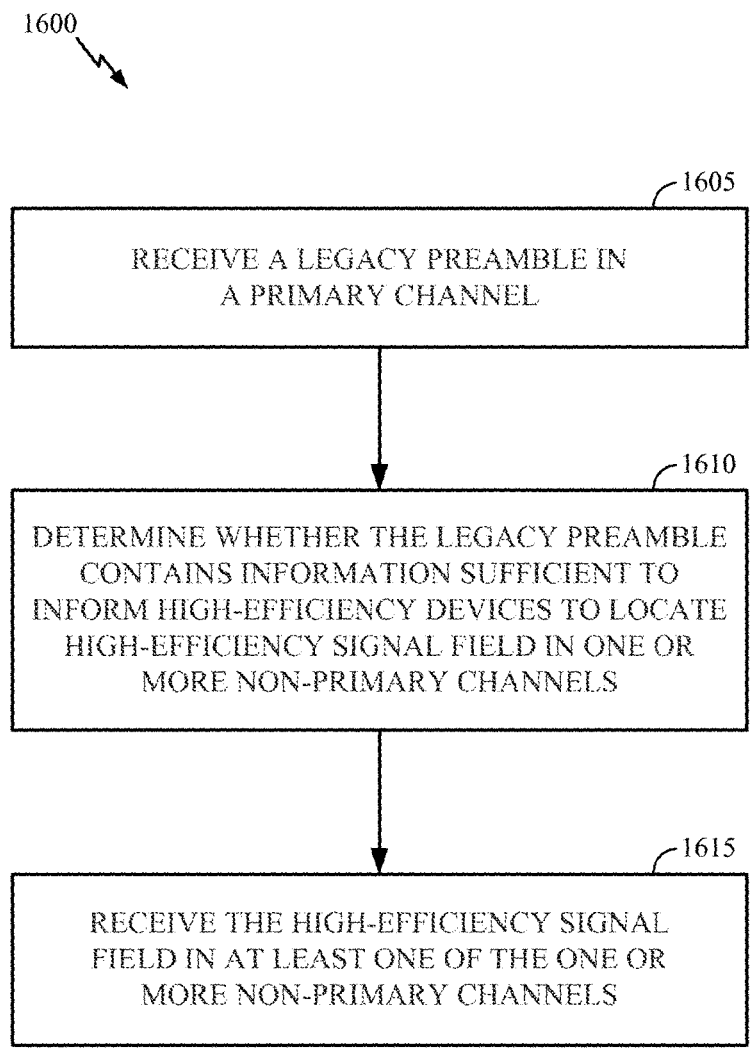
FIG. 16 illustrates an exemplary method of receiving a hybrid packet.

FIG. 16 illustrates an exemplary method of receiving a hybrid packet. In some aspects, this method may be used by a STA, such as a high-efficiency wireless communication device.

At block 1605, the STA receives a legacy preamble in a primary channel. In some aspects, the means for receiving a legacy preamble may be a receiver.

At block 1610, the STA determines whether the legacy preamble contains information sufficient to inform high-efficiency devices to locate a high-efficiency signal field in one or more non-primary channels. In some aspects, the means for determining may be a processor or a receiver.

At block 1615, the STA receives the high-efficiency signal field in at least one of the one or more non-primary channels. In some aspects, the means for receiving the high-efficiency signal field may be a receiver. In some aspects, the STA may further receive data on at least one of the one or more non-primary channels. In some aspects, the means for receiving data may be a receiver.

Delay Spread Protection and Potential Structures of a High-Efficiency Signal Field In some aspects, outdoor or other wireless networks may have channels with relatively high delay spreads, such as those in excess of 1 us. For example, an access point at a high elevation, such as a pico/macro cell tower access point, may have high delay spreads. Various wireless systems, such as those in accordance with 802.11a/g/n/ac, use a Cyclic Prefix (CP) length of only 800 ns. Nearly half of this length may be consumed by transmit and receive filters. Because of this relatively short CP length and the overhead from the transmit and receive filters, such 802.11a/g/n/ac networks may be unsuitable for an outdoor deployment with a high delay spread.

According to aspects of the present disclosure, a packet format (PHY waveform) that is backwards compatible with such legacy systems and supports cyclic prefixes longer than 800 ns is provided that may allow the use of 2.4 and 5 GHz WiFi systems in outdoor deployments.

For example, one or more bits of information may be embedded in one or more of an L-STF, an L-LTF, an L-SIG, or in another portion of a packet preamble, such as an HE-SIG. These one or more bits of information may be included for devices configured to decode them, as above, but may not impact decoding by legacy (e.g., 802.11a/g/n/ac) receivers. These bits may include an indication of a packet which includes delay spread protection, in order to allow the use of such a packet in an outdoor setting, or another setting with potentially high delay spread.

In some aspects, a number of methods may be used to provide delay spread protection or tolerance. For example, different transmission parameters may be used to increase symbol duration (e.g., downclocking to decrease sample rate or increasing FFT length while maintaining the same sample rate). Increasing the symbol duration, such as by 2× or 4×, may increase tolerance to higher delay spreads.

In some aspects, an increased symbol duration may be signaled in a field of an L-SIG or an HE-SIG. In some aspects, other packets on the network may not contain the signaling for increased symbol duration, but rather be packets with a conventional or "normal" symbol duration. Preserving a "normal" symbol duration may be desirable in some instances because increased symbol duration typically means increased FFT size and thus increased sensitivity to frequency error and increased PAPR. Further, not every device in a network will need this increased delay spread tolerance. Thus, in some cases, an increased FFT size may hurt performance, and so it may be desirable for some packets to use conventional symbol duration.

Thus, in some aspects, all packets may contain an increased symbol duration after an L-SIG or HE-SIG field. In other aspects, only packets which include information signaling an increased symbol duration in an L-SIG or an HE-SIG may include an increased symbol duration. In some aspects, the signaling for an increased symbol duration may be contained within an HE-SIG, and L-SIG, a VHT-SIG-A, or another field in a packet. In some aspects, this signaling may be conveyed by, for example, a Q-BPSK rotation in a symbol of a SIG field, such as an L-SIG or an HE-SIG. In some aspects, this signaling may be conveyed by hiding information in an orthogonal rail, such as an imaginary axis, of a field of a packet.

In some aspects, increase symbol duration may be used for either or both of uplink or downlink packets. For an uplink packet, an AP may signal in preceding downlink packet that the uplink packet may be transmitted using an increased symbol duration. For example, in an uplink OFDMA packet, the AP may send a tone allocation message which tells users to use longer symbol durations. In that case, the uplink packet itself may not need to carry an indication indicating a particular symbol duration. In some aspects, a signal from the AP to a STA may inform the STA to use a particular symbol duration in all future uplink packets, unless told otherwise.

In some aspects, such delay spread protection may be incorporated into high-efficiency packets such as those described above. The preamble formats presented herein provide a scheme in which delay spread protection may be included in packets, while allowing legacy devices to detect whether a packet is an 802.11n, 802.11a or 802.ac packet.

The preamble formats presented herein may preserve the L-SIG-based deferral as in an IEEE 802.11 ac (mixed mode preamble) packet. Having a legacy section of a preamble decodable by 802.11a/an/ac stations may facilitate mixing legacy and HE devices in the same transmission. Preamble formats provided herein may help provide protection on the HE SIG, which may help achieve robust performance. For example, these preamble formats may help to reduce a SIG error rate to 1% or less in relatively stringent standard test scenarios.

Figure 17:
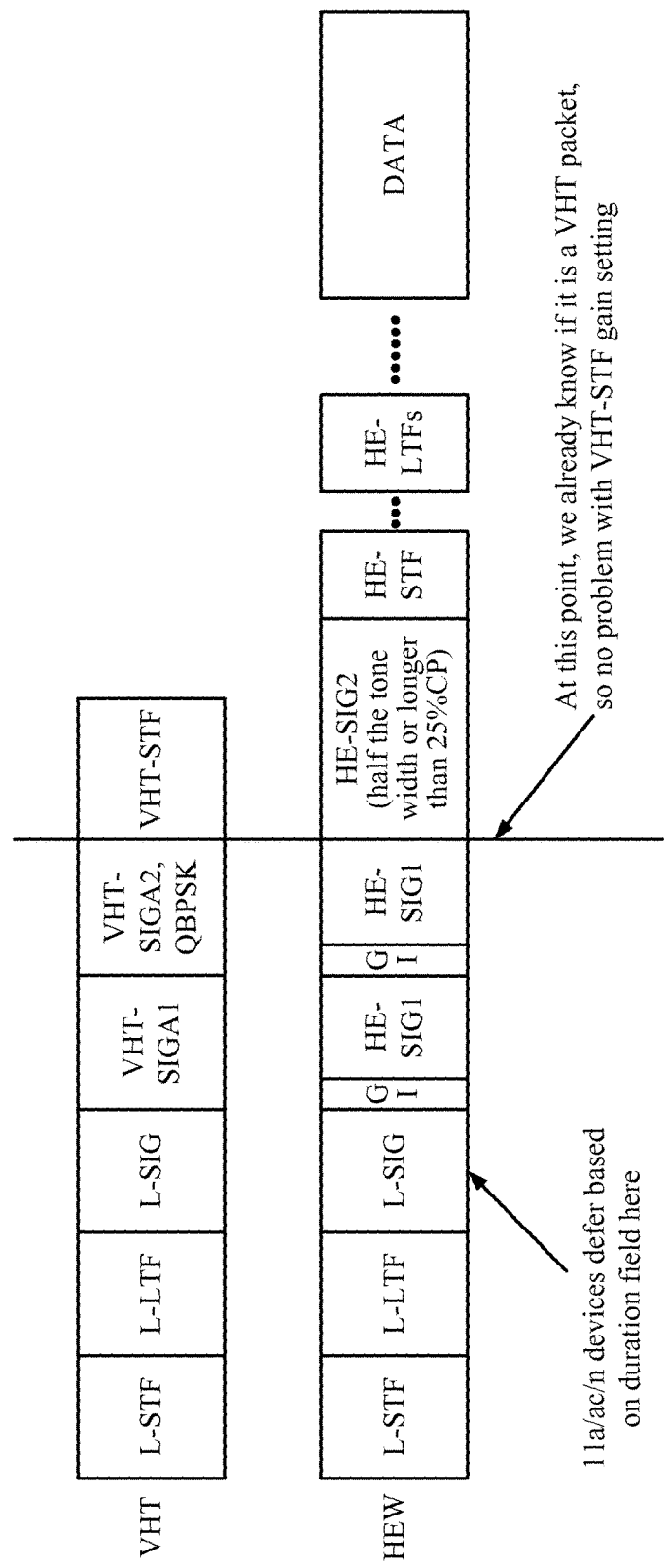
FIG. 17 illustrates a packet with one example HE preamble format.

FIG. 17 illustrates a packet with one example HE preamble format, in accordance with aspects of the present disclosure. The example HE preamble format is compared with a VHT preamble format. As illustrated, the HE preamble format may include one or more signal (SIG) fields decodable by a first type of device (e.g., 802.11a/ac/n devices) and one or more SIG fields (HE-SIG1) decodable by a second type of devices (e.g., HE devices). As illustrated, 802.11l/ac/n devices may defer based on a duration field in the L-SIG. The L-SIG may be followed by a repeated high efficiency SIG (HE-SIG) field. As illustrated, after the repeated HE-SIG field, a device may already know if the packet it is a VHT packet, so there may be no problem with VHT-STF gain setting.

In the example format shown in FIG. 17, HE-SIG1 fields may be repeated and preceded with a normal guard interval (GI), which gives protection to HE-SIG1 for HE devices. Because of the repeated HE-SIG1, this packet may have a lower signal-to-noise ratio operating point, and thus provide more robust protections from inter-symbol-interference (ISI). In some aspects, the L-SIG may transmit at 6 Mbps, as packet type detection based on Q-BPSK checks on 2 symbols after L-SIG may not be impacted.

Various techniques may be used to signal the HE packet to HE devices, as discussed above. For example, the HE packet may be signaled by placing an orthogonal rail indication in L-SIG, based on a CRC check in HE-SIG1, or based on the repetition of the HE-SIG1.

The delay spread protection on HE-SIG2 may take various forms. For example, HE-SIG2 may be transmitted over 128 tones (in 20 MHz) to provide additional delay spread protection. This may result in a guard interval of 1.6 us, but may require interpolation of channel estimates calculated based on L-LTF, which would contain the traditional number of tones. As another example, HE-SIG2 may have the same symbol duration, but may be sent with a 1.6 us cyclic prefix. This may lead to more cyclic prefix overhead than the traditional value of 25%, but may not require interpolation. In one aspect, HE-SIG2 may also be sent over the full bandwidth, rather than repeating every 20 MHz. This may require that bandwidth bits be placed in HE-SIG1, in order to indicate the full bandwidth.

Figure 18:
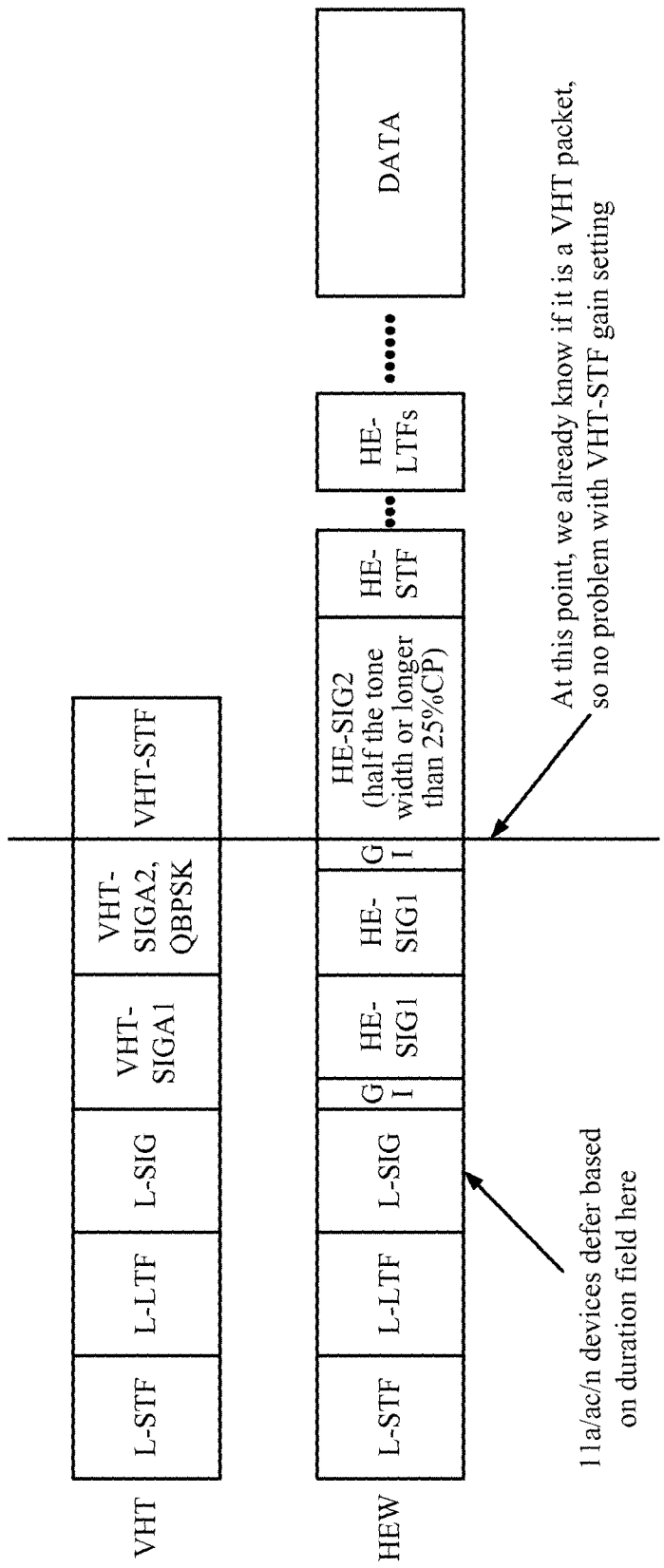
FIG. 18 illustrates a packet with another example HE preamble format.

FIG. 18 illustrates a packet with another example HE preamble format, in accordance with aspects of the present disclosure. As with FIG. 17, the example HE preamble format is compared with a VHT preamble format. As before, IEEE 802.11 a/ac/n devices may defer to the packet based on the duration field in the L-SIG. The L-SIG may be followed by a repeated high efficiency SIG (HE-SIG) field. In the example format shown in FIG. 18, the HE-SIG1 fields may be repeated but with the first HE-SIG1 field preceded with a normal guard interval, while the second HE-SIG1 precedes a normal guard interval.

This repetition of HE-SIG1, with a guard interval placed before the first HE-SIG1 and after the second HE-SIG1 may provide protection for HE devices. It may be noted that the middle portion of HE-SIG1 section may appear as an HE-SIG1 symbol with a relatively large CP. In this aspect, a Q-BPSK check on the first symbol after L-SIG may be unaffected. However, a Q-BPSK check on the second symbol may give random results due to the guard interval after the second HE-SIG1. However, these random results may not have an adverse impact on VHT devices. For example, VHT devices may classify the packet as an 802.11ac packet, but at this point the devices may attempt to perform a VHT-SIG CRC check, and this will fail. Accordingly, VHT devices will still defer to this packet, despite the random results of the Q-BPSK check on the second symbol after the L-SIG.

Because the auto-detection process for legacy devices, such as VHT devices (those compatible with IEEE 802.11ac), will cause those devices to defer to the packet in FIG. 18, these packets may still carry 6 Mbps. As with the packet in FIG. 17, a number of techniques discussed above may be used to signal to HE devices that the packet is an HE packet. Similarly, HE devices may be provided information about the delay spread protection of the packet in a number of ways, such as a field contained in HE-SIG2.

Figure 19:
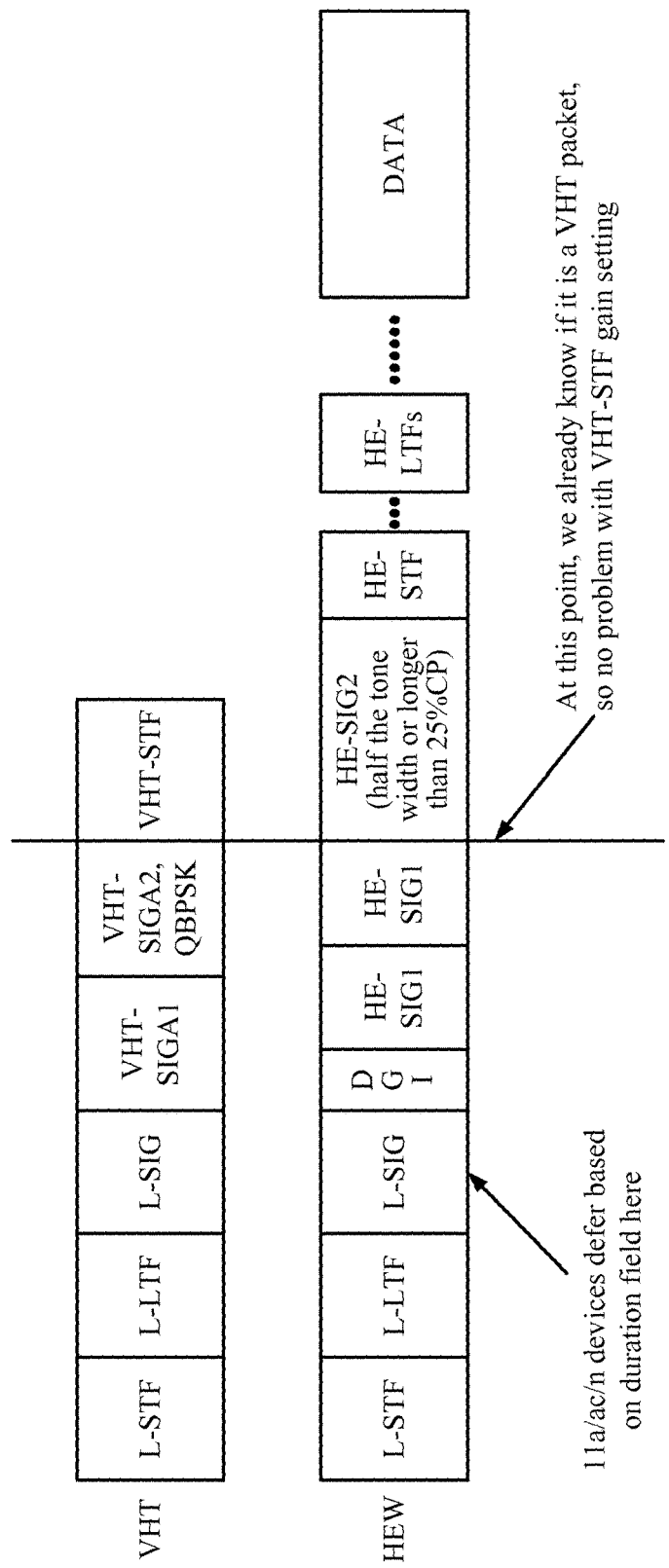
FIG. 19 illustrates a packet with another example HE preamble format.

FIG. 19 illustrates a packet with another example HE preamble format, in accordance with aspects of the present disclosure. As before, the example HE preamble format is similar to an 802.11ac VHT preamble format. As illustrated, 802.11a/ac/n devices may defer to the packet based on the duration field in the L-SIG. The L-SIG may be followed by a repeated high efficiency SIG (HE-SIG) field.

In the example format shown in FIG. 19, repeated HE-SIG1 fields may be preceded by a double guard interval (DGI). The use of such a double guard interval may result in a random result of a Q-BPSK check on the first symbol after the L-SIG. Thus, some legacy devices may not defer to this packet if the L-SIG signals a rate of 6 Mbps. Accordingly, the L-SIG in such a packet may need to signal a rate other than 6 Mbps, in order to ensure that all IEEE 802.11a/ac/n devices defer to the packet. For example, the L-SIG may signal a rate of 9 Mbps. Techniques similar to those discussed above may be used to signal that the packet is an HE packet, and may be used to signal whether the packet contains delay spread protection.

Various optimization may be provided for preamble formats, such as those shown in FIGS. 17-19. For example, for the example formats shown in FIGS. 18 and 19, it may be possible to truncate the second HE-SIG1 symbol and start the next symbol earlier, to save overhead. In addition, there may be some benefit to having a SIG-B after the HE-LTFs, which may provide per-user bits for MU-MIMO.

FIG. 20 illustrates example bit allocation for an HE-SIG1 field. As illustrated, there may be 2-3 bits for BW indication, an 8-bit Length indication, a bit to indicate longer symbols are used, 2-3 reserved bits, 4 bits for a CRC, and 6 tail bits. If a Longer Symbols ON bit is provided in HE-SIG1, this may be used to signal either of the following: that HE-SIG2 has delay spread protection or everything after HE-SIG2 uses an increased FFT size. The above HE-SIG formats, where HE-SIG is made up of HE-SIG1 and HE-SIG2 may allow for delay spread protection, and may be used in packets which allow multiple access, such as OFDMA packets.

Uplink Packet with Legacy Preamble

Figure 21:
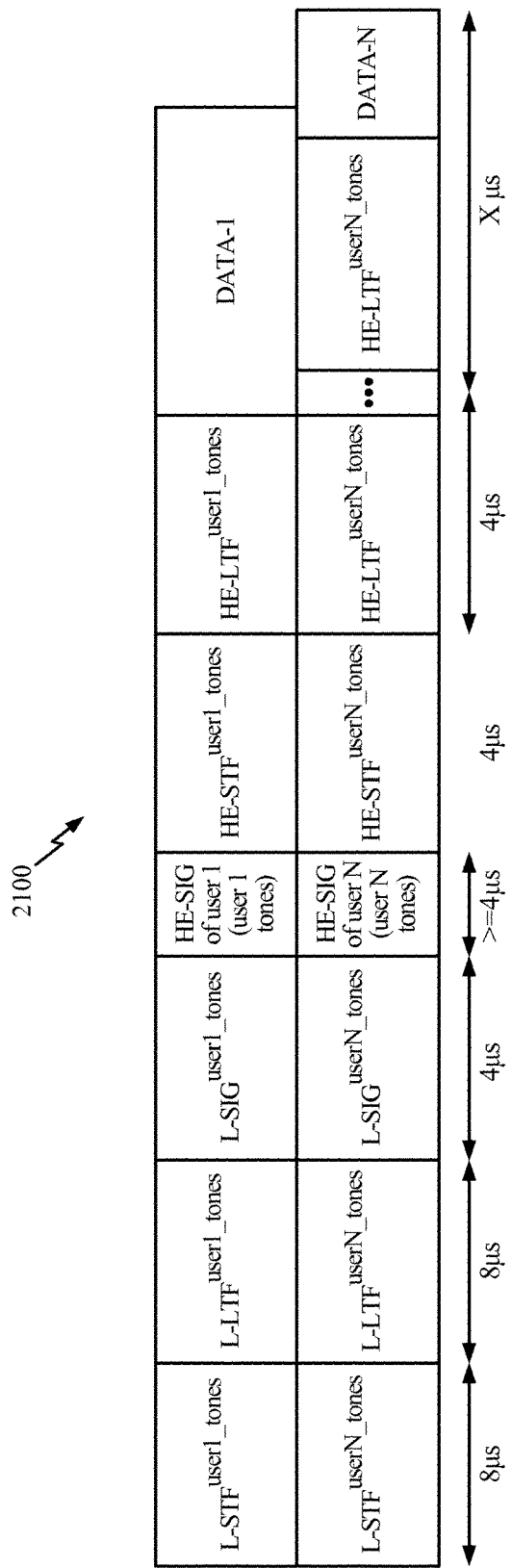
FIG. 21 illustrates an exemplary structure of an uplink physical-layer packet which may be used to enable backward-compatible multiple access wireless communications.

FIG. 21 illustrates an exemplary structure of an uplink physical-layer packet 2100 which may be used to enable backward-compatible multiple access wireless communications. Typically, in an uplink packet, a legacy preamble may not be needed, as the NAV is set by the AP's initial downlink message. The AP's initial downlink message may cause legacy devices on the network to defer to the uplink packet. However, some wireless devices may be outside the range of the AP, but within the range of STAs that are transmitting to the AP. Accordingly, these devices, if they are legacy devices, may not defer to the AP as they did not receive the AP's initial downlink message. These devices may also not defer to an uplink packet like those in FIG. 12, because those packets do not have a legacy preamble that legacy devices can recognize. Accordingly, the transmission of such a device may interfere with an uplink packet, and so it may be desirable to transmit an uplink packet which contains a legacy preamble sufficient to cause legacy devices to defer to the packet. These uplink packets may take a number of possible forms. Uplink packet 2100 is an exemplary uplink packet which contains a legacy preamble. Note that while packet 2100 includes times for each portion of the packet, these times are merely exemplary. Each portion of the packet 2100 may be longer or shorter than indicated. In some aspects, it may be beneficial for the legacy portions of the preamble, such as L-STF, L-LTF, and L-SIG to be the listed times, in order to allow legacy devices to decode the legacy portion of the preamble and defer to the packet 2100.

Accordingly, the packet 2100 may be used to inform such legacy devices to defer to the uplink packet, by providing a legacy preamble which such legacy devices may recognize. This legacy preamble may include an L-STF, an L-LTF, and an L-SIG. Each of the transmitting devices, as in the packet 830, may be configured to transmit their own preamble on their assigned bandwidth. These legacy preambles may protect the uplink communications from nodes which did not hear the AP's initial downlink message.

As in packet 830, each of a number of devices, here N devices, may transmit in their assigned bandwidth simultaneously. Following the legacy preamble, each device may transmit a high-efficiency preamble on its assigned tones. For example, each device may transmit an HE-SIG on its own assigned tones. Following this HE-SIG, each device may then transmit an HE-STF, and may transmit one or more HE-LTFs. For example, each device may transmit a single HE-STF, but may transmit a number of HE-LTFs which correspond to the number of spatial streams assigned to that device. In some aspects, each device may transmit a number of HE-LTFs corresponding to the number of spatial streams assigned to the device with the highest number of spatial streams. This assignment of spatial streams may be done, for example, in the AP's initial downlink message. If each device sends the same number of HE-LTFs, this may reduce a peak-to-average-power ratio (PAPR). Such a reduction of PAPR may be desirable. Further, if each device transmits the same number of HE-LTFs, this may make processing the received uplink packet easier for the AP. For example, if a different number of HE-LTFs are sent by each device, the AP may receive the preamble for one device while receiving data from another device. This may make decoding the packet more complex for the AP. Accordingly, it may be preferable to use the same number of HE-LTFs for each devices. For example, each of the transmitting devices may be configured to determine the maximum number of spatial streams any device is receiving, and to transmit a number of HE-LTFs corresponding to that number.

In some aspects, the L-STF in such a packet may include small cyclic shifts, on the order of approximately up to 200 ns. Large cyclic shifts may cause issues in such L-STFs with legacy devices which might use a detection algorithm based upon cross-correlation. The HE-STF in such a packet 2100 may include larger cyclic shifts, on the order of approximately 800 ns. This may allow for more accurate gain settings in the AP which is receiving the uplink packet 2100.

Figure 22:
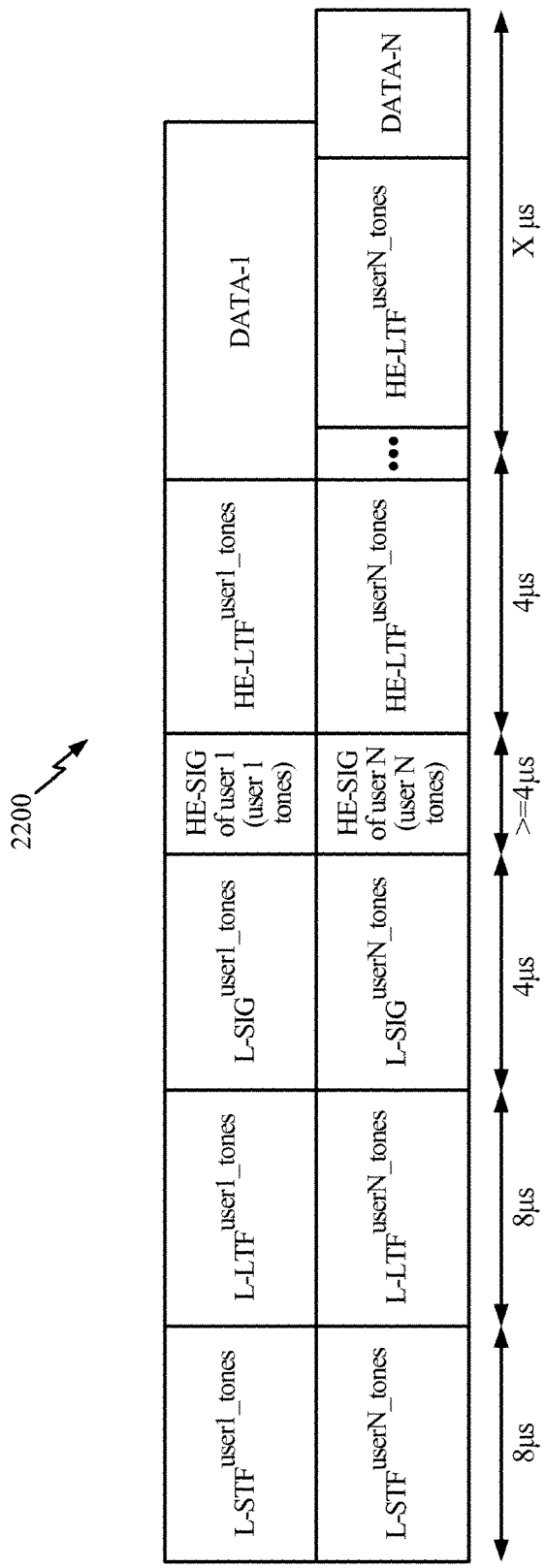
FIG. 22 illustrates another exemplary structure of an uplink physical-layer packet which may be used to enable backward-compatible multiple access wireless communications.

FIG. 22 illustrates another exemplary structure of an uplink physical-layer packet 2200 which may be used to enable backward-compatible multiple access wireless communications. This packet 2200 may be similar to the packet 2100, however, in this packet 2200, each of the transmitting devices may not transmit an HE-STF. Instead, each of the transmitting devices may transmit an L-STF with larger cyclic shifts, such as on the order of approximately 800 ns. While this may impact legacy devices with cross-correlation packet detectors, this may allow a packet to be shorter, as this may allow the transmitting devices to not transmit an HE-STF. While packet 2200 includes times for each portion of the packet, these times are merely exemplary, and each portion of the packet may be longer or shorter than indicated. In some aspects, it may be beneficial for the legacy portions of the preamble, such as L-STF, L-LTF, and L-SIG to be the listed times, in order to allow legacy devices to decode the legacy portion of the preamble and defer to the packet 2200.

In packet 2200, each device may transmit a number of HE-LTFs corresponding to the number of spatial streams assigned to that device. In some aspects, each device may instead transmit a number of HE-LTFs corresponding to the number of spatial streams assigned to the device which is assigned the highest number of spatial streams. As discussed above, such an approach may reduce PAPR.

In some aspects, longer symbol duration can provide delay spread protection and protection from timing offsets. For example, the devices transmitting an uplink packet may not begin to transmit the packet at the same time, but instead begin at slightly different times. A longer symbol duration may also aid the AP in interpreting the packet in such instances. In some aspects, devices may be configured to transmit with a longer symbol duration based on a signal in the AP's downlink trigger message. In some aspects, for a green-field packet such as packet 830, the entire waveform may be transmitted at a longer symbol duration, as there is no need for legacy compatibility. In an uplink packet which includes a legacy preamble, such as packet 2100 or 2200, the legacy preamble may be transmitted with a conventional symbol duration. In some aspects, the portion after the legacy preamble may be transmitted with a longer symbol duration. In some aspects, longer symbol duration may be achieved by using an existing IEEE 802.11 tone plan in a smaller bandwidth. For example, smaller subcarrier spacing may be used, which may be referred to as down-clocking. For example, a 5 MHz portion of bandwidth may use a 64-bit FFT 802.11a/n/ac tone plan, whereas 20 MHz may be conventionally used. Thus, each tone may be 4× longer in such a configuration than in a typical IEEE 802.11a/n/ac packet. Other durations may also be used. For example, it may be desirable to use tones which are twice as long as in a typical IEEE 802.11a/n/ac packet.

Figure 23:
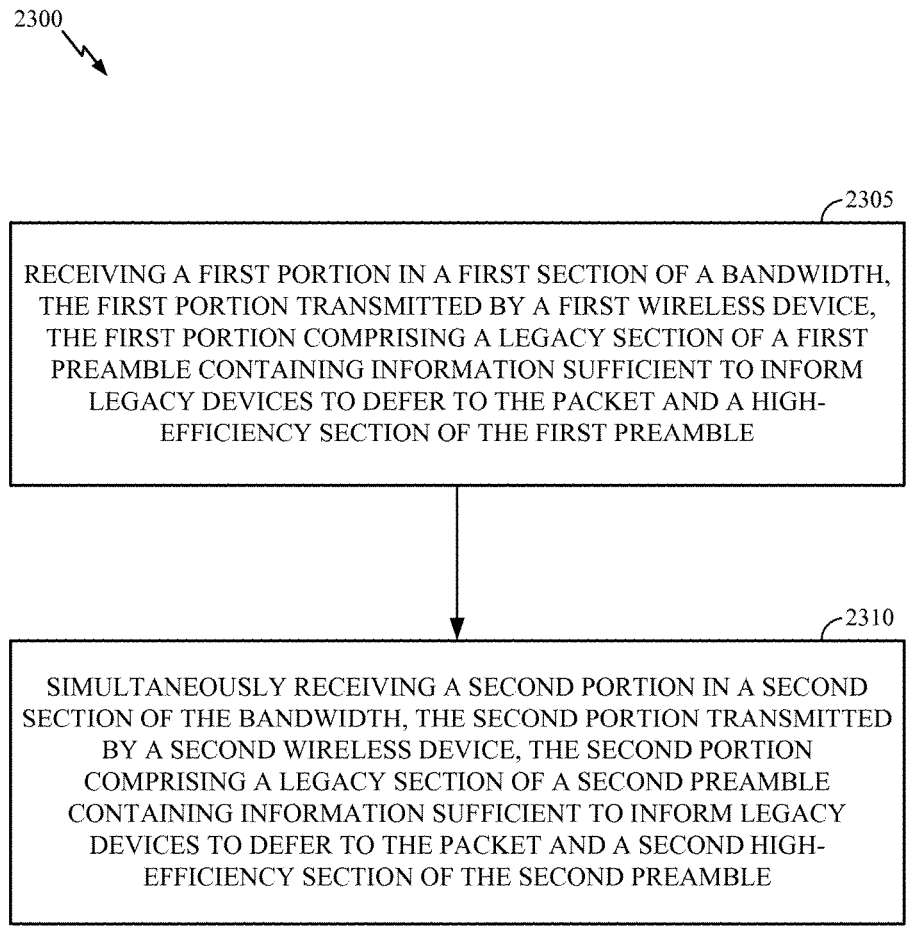
FIG. 23 illustrates an exemplary method of receiving a packet.

FIG. 23 illustrates an exemplary method 2300 of receiving a packet. This method may be done by a wireless device, such as an AP.

At block 2305, the AP receives a first portion in a first section of a bandwidth, the first portion transmitted by a first wireless device, the first portion comprising a legacy section of a first preamble containing information sufficient to inform legacy devices to defer to the packet and a high-efficiency section of the first preamble. In some aspects, the means for receiving may be a receiver.

At block 2310, the AP simultaneously receives a second portion in a second section of the bandwidth, the second portion transmitted by a second wireless device, the second portion comprising a legacy section of a second preamble containing information sufficient to inform legacy devices to defer to the packet and a second high-efficiency section of the second preamble. In some aspects, the means for simultaneously receiving may be a receiver. In some aspects, the first wireless device and/or the second wireless device may transmit on a number of spatial streams. In some aspects, the high-efficiency portion of the preamble transmitted by the first and second wireless devices may contain a number of long training fields. In some aspects, the number of long training fields can be based on the number of spatial streams assigned to that particular device or the highest number of spatial streams assigned to any wireless device.

In some aspects, it may be desirable for an uplink OFDMA packet to have a structure which more closely mimics that of an uplink multi-user multiple input and multiple-output (MU-MIMO) packet. For example, a number of the preceding packets, such as packet 2100 in FIG. 21, may include an HE-SIG prior to one or more HE-LTFs. Similarly, in packet 830 in FIG. 12, each of the transmitting devices transmits a single HE-LTF, followed by an HE-SIG, followed by the remaining number of HE-LTFs. However, in order to have an uplink packet with a structure more similar to the of an uplink MU-MIMO packet, it may be desirable to have a packet in which the HE-SIG follows after all of the HE-LTFs in the packet.

Accordingly, in any of the packets described, it may be possible to transmit the HE-SIG following all of the HE-LTFs. In some aspects, it may be desirable to find another method of signaling the number of spatial streams being used by each transmitting device in the uplink packet when the HE-SIG follows after all of the HE-LTFs. For example, in some of the previously-described packets, the first HE-LTF from a transmitting device may include information sufficient to allow the AP to decode the HE-SIG from that transmitting device. In some of the previously-described packets, the HE-SIG from a transmitting device may include information regarding the number of spatial streams which are being used by that device in the packet, and thus, in some aspects, the HE-SIG may indicate the number of HE-LTFs which will be transmitted by that transmitting device. However, if an HE-SIG is transmitted following each HE-LTF, it may be desirable to indicate the number of spatial streams used by a transmitting device in a different manner than this. For example, the number of spatial streams used by a transmitting device may be indicated in a downlink message from the AP. For example, the uplink OFDMA packet may be sent in response to a downlink packet from the AP, which indicates which devices may transmit on the uplink OFDMA packet. Accordingly, this downlink packet may also assign a number of spatial streams to each device.

Figure 24:
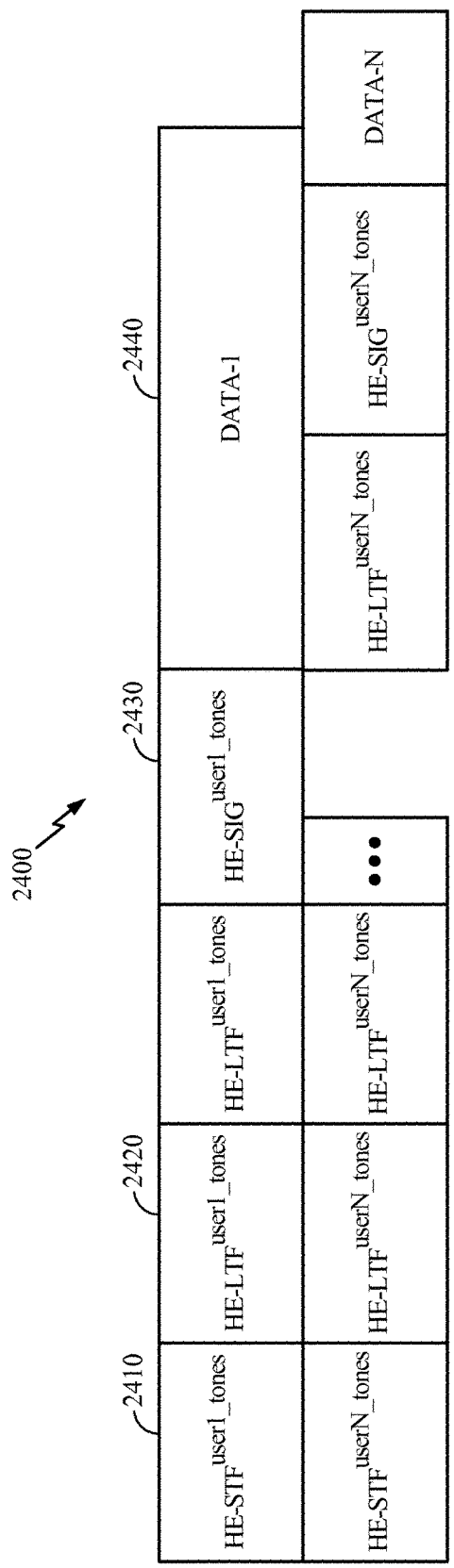
FIG. 24 is an exemplary uplink packet structure for an uplink HE packet.

FIG. 24 is an exemplary uplink packet structure in which the HE-SIG is transmitted after each HE-LTF. In uplink OFDMA packet 2400, each of the transmitting devices may transmit an HE-STF 2410, as in other packets described above. Following the HE-STF 2410, each of the transmitting devices may transmit a number of HE-LTFs 2420. Each of the transmitting devices may transmit a number of HE-LTFs 2420 which corresponds to the number of spatial streams which are being used by that transmitting device. For example, if a transmitting device is transmitting using two spatial streams, that device may transmit two HE-LTFs 2420. Following transmitting all of its HE-LTFs 2420, each transmitting device then transmit an HE-SIG 2430. This HE-SIG 2430 may contain information similar to that described above.

Figure 26:
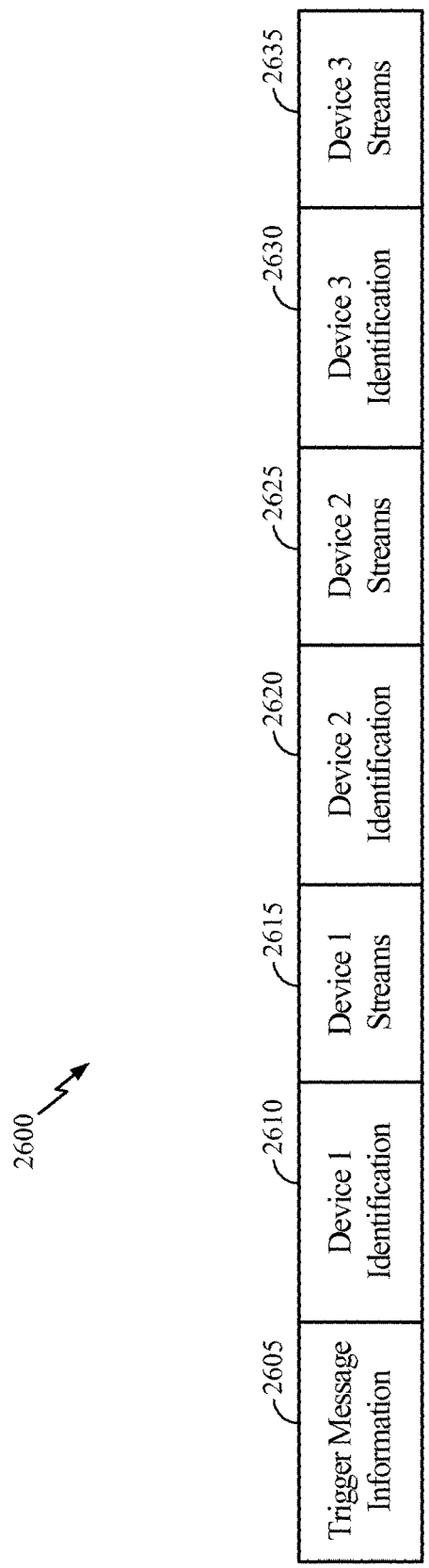
FIG. 26 is an exemplary downlink message from the AP which includes information on how many spatial streams each transmitting device may use.

As illustrated, in packet 2400, each transmitting device transmits a number of HE-LTFs 2420 which corresponds to the number of spatial streams being used by that device. As discussed above, in some other aspects, the number of spatial streams being used by a device may be indicated in the HE-SIG sent by that device. However, in packet 2400, the number of spatial streams may not be included in the HE-SIG 2430, as this indication may arrive too late for an AP to anticipate the number of HE-LTFs 2420 that the transmitting device may transmit. Accordingly, other methods for the AP to determine the number of spatial streams from a given event may be used. For example, a downlink message from the AP, such as the message triggering the uplink OFDMA packet 2400, may assign a number of spatial streams to each transmitting device. An exemplary downlink message from the AP is illustrated in FIG. 26 which includes information on how many spatial streams each transmitting device may use. In some aspects, the number of spatial streams used by each transmitting device may be determined in other ways as well. For example, the number of spatial streams to each transmitting device may be conveyed in a pediodic downlink message, such as in a beacon. In some aspects, the AP may be configured to determine the number of spatial streams based upon the received packet 2400. For example, the AP may be configured to determine the number of HE-LTFs 2420 being transmitted by each transmitting device without prior knowledge of how many spatial streams may be transmitted such as by analyzing the incoming packet 2400 and detecting the end of the HE-LTFs 2420 and the beginning of the HE-SIG 2430. Other methods may also be used to enable the AP to determine the number of spatial streams, and thus the number of HE-LTFs 2420 being transmitted by each device in packet 2400. Following the HE-SIG 2430 from each transmitting device, that device may transmit the data 2440 which it wishes to transmit in packet 2400. In some aspects, each device may transmit the same number of HE-LTFs 2420 in packet 2400. For example, each transmitting device may transmit a number of HE-LTFs 2420 which corresponds to the number of spatial streams assigned to the device which is assigned the highest number of spatial streams.

Figure 25:
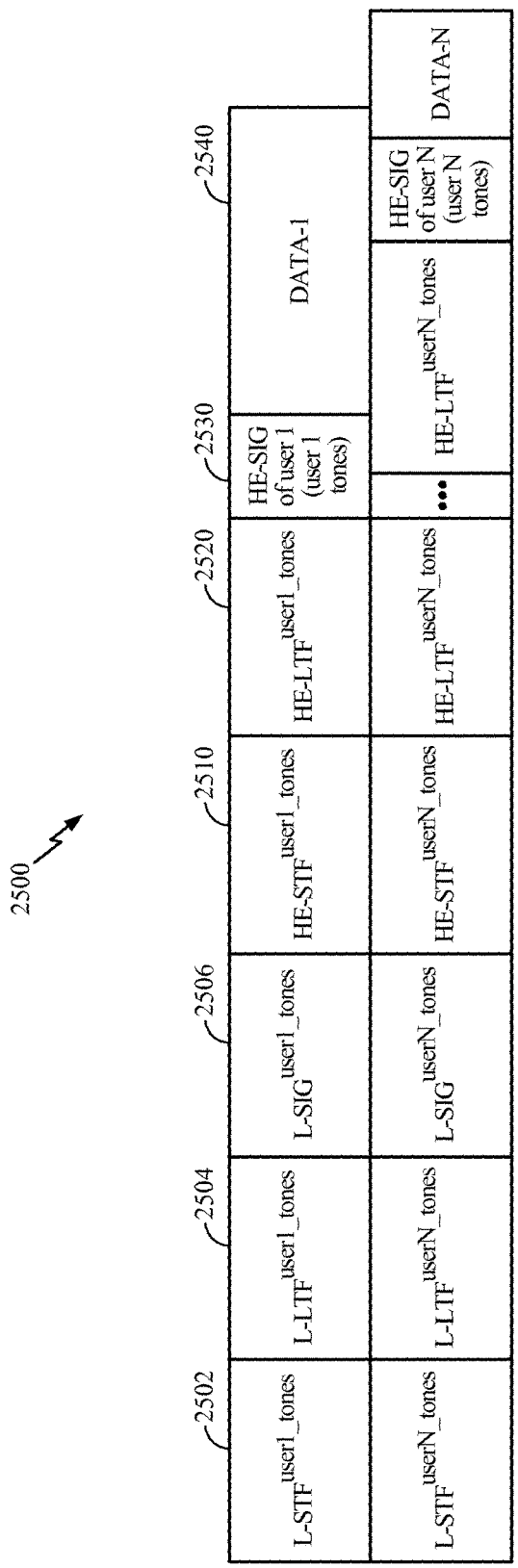
FIG. 25 is exemplary uplink packet structure for an uplink HE packet.

FIG. 25 is another exemplary uplink packet structure in which the HE-SIG is transmitted after each HE-LTF. Packet 2500 may correspond to a mixed-mode packet, in which each transmitting device transmits a legacy preamble prior to transmitting a high-efficiency portion of the packet. In packet 2500, each device first transmits a legacy preamble, which includes an L-STF 2502, and L-LTF 2504, and an L-SIG 2506. These portions of the packet 2500 may be transmitted as described above.

Following the legacy preamble, packet 2500 is similar to packet 2400. Each of the transmitting devices may transmit an HE-STF 2510, followed by a number of HE-LTFs 2520, followed by an HE-SIG 2530, followed by the data 2540 which the transmitting device wishes to transmit to the AP. Each of these portions of the packet may be transmitted in methods similar to those disclosed above. The number of HE-LTFs 2520 transmitted by each device may be based, at least in part, on the number of spatial streams that each device is transmitting on. For example, a device which is transmitting on two spatial streams may transmit two HE-LTFs 2520.

In some aspects, each device in packet 2500 may transmit an equal number of HE-LTFs 2520. For example, each of the transmitting devices may transmit a number of HE-LTFs 2520 which corresponds to the highest number of spatial streams being transmitted by any of the transmitting devices. Accordingly, in packet 2500, each of the transmitting devices must have knowledge of how many HE-LTFs 2520 to transmit in the packet. As before, having each of the transmitting devices transmit the same number of HE-LTFs 2520 may be beneficial, as this may reduce the PAPR of the packet. Such a reduction in PAPR may result in benefits for the AP receiving the packet 2500, as described above. If each transmitting device in packet 2500 transmits the same number of HE-LTFs 2520, each of these devices should be aware of how many HE-LTFs 2520 to transmit. This may be accomplished in a number of ways. For example, the AP may send a downlink trigger message to the transmitting devices. This trigger message may include information such as which devices may transmit in the uplink packet, the bandwidth assigned to each device, and the number of spatial streams assigned to each device. This trigger message may also indicate to the transmitting devices how many HE-LTFs 2520 to include in the uplink packet 2500. For example, the downlink message may indicate to the transmitting devices how many spatial streams each device may use. An exemplary downlink trigger message from the AP is illustrated in FIG. 26 which includes information on how many spatial streams each transmitting device may use. Similarly, the number of spatial streams assigned to each device may be fixed. For example, a network may be constructed in which each device may use only two spatial streams. Similarly, the number of spatial streams assigned to each device may be conveyed in a message such as in a beacon message which is periodically transmitted from the AP. Accordingly, the transmitting devices may transmit a number of HE-LTFs 2520 which corresponds to the number of spatial streams assigned to the device which is assigned the most spatial streams. In some aspects, other methods may also be used to coordinate the number of HE-LTFs 2520 transmitted by each transmitting device.

An exemplary downlink message 2600 from the AP is illustrated in FIG. 26 which includes information on how many spatial streams each transmitting device may use. This message 2600 may include trigger message information 2605. For example, this information 2605 may include timing information on when an uplink message may be sent. This information 2605 may further include information regarding whether the transmitting devices should confirm receipt of the trigger message. Following this information 2605, the downlink message 2600 may include an identification 2610 of device 1. This identification 2610 may be, for example, a unique number or value which is assigned to device 1, and which identifies device 1. The downlink message 2600 may also include a number of streams 2615 which are assigned to device 1. For example, device 1 may be assigned two spatial streams. The downlink message may also include an identification 2620 of device 2, a number of spatial streams 2625 for device 2, an identification 2630 of device 3, and a number of spatial streams 2635 for device 3. In some aspects, other numbers of devices may also be identified in a downlink message 2600. For example, two, three, four, five, six or more devices may be identified in the downlink message 2600. Note that this downlink message 2600 is merely exemplary. Other information may also be contained in a downlink trigger message, and may be contained in a different order or number than illustrated in downlink message 2600.

In some aspects, it may be beneficial to harmonize the LTFs which are transmitted in an uplink OFDMA packet with those transmitted in an UL MU-MIMO packet. For example, in an UL MU-MIMO packet, each transmitting device may transmit messages across all tones. Accordingly, the LTFs in an UL MU-MIMO packet may need to contain sufficient information to allow a receiving STA, such as an AP, to recognize the transmissions from each transmitting STA on each tone. Such LTF formats may be used both in an UL MU-MIMO packet, and in an UL OFDMA packet.

For example, one format that may be used for LTFs, in either an UL MU-MIMO packet or an UL OFDMA packet, is to transmit P-matrix based LTFs. In this approach, LTFs may be transmitted by each of the transmitting STAs on each tone. The LTFs from each device may be transmitted in such a way that they are orthogonal to each other. The number of LTFs transmitted may correspond to the number of spatial streams assigned to all devices. For example, if two devices transmit on one stream each, two LTFs may be sent. In some aspects, in the first LTF, the value at a given tone may be equal to H1+H2, where H1 is the signal from the first device and H2 is the signal from the second device. In a next LTF, the value at a given tone may be equal to H1−H2. Accordingly, because of this orthogonality, the receiving device may be able to identify the transmission of each of the two transmitting devices on each tone. Such a format for LTFs has been used, for example, in previous IEEE 802.11 formats. However, one potential problem with P matrix based LTFs is that they may not be as effective if two or more of the transmitting devices have a high frequency offset with respect to one another. In that circumstance, the orthogonally of the LTFs may be lost, and accordingly, the ability of the receiving device to properly decode the packet may be impaired. Accordingly, in some aspects, it may be desirable to use a different LTF format for UL MU-MIMO and UL OFDMA packets.

Another possible different LTF format for UL MU-MIMO and UL OFDMA packets is to use a tone-interleaved or sub-band interleaved LTF. As before, the number of LTFs which is transmitted may correspond to the total number of spatial streams sent by all transmitting devices. Such LTF formats may be especially useful when there is a big frequency offset among the various devices transmitting the uplink packet. These LTF formats could be used in an UL MU-MIMO packet. In order to harmonize an UL OFDMA packet with an UL MU-MIMO packet, these LTF formats may also be used in an UL OFDMA packet.

Figure 27:
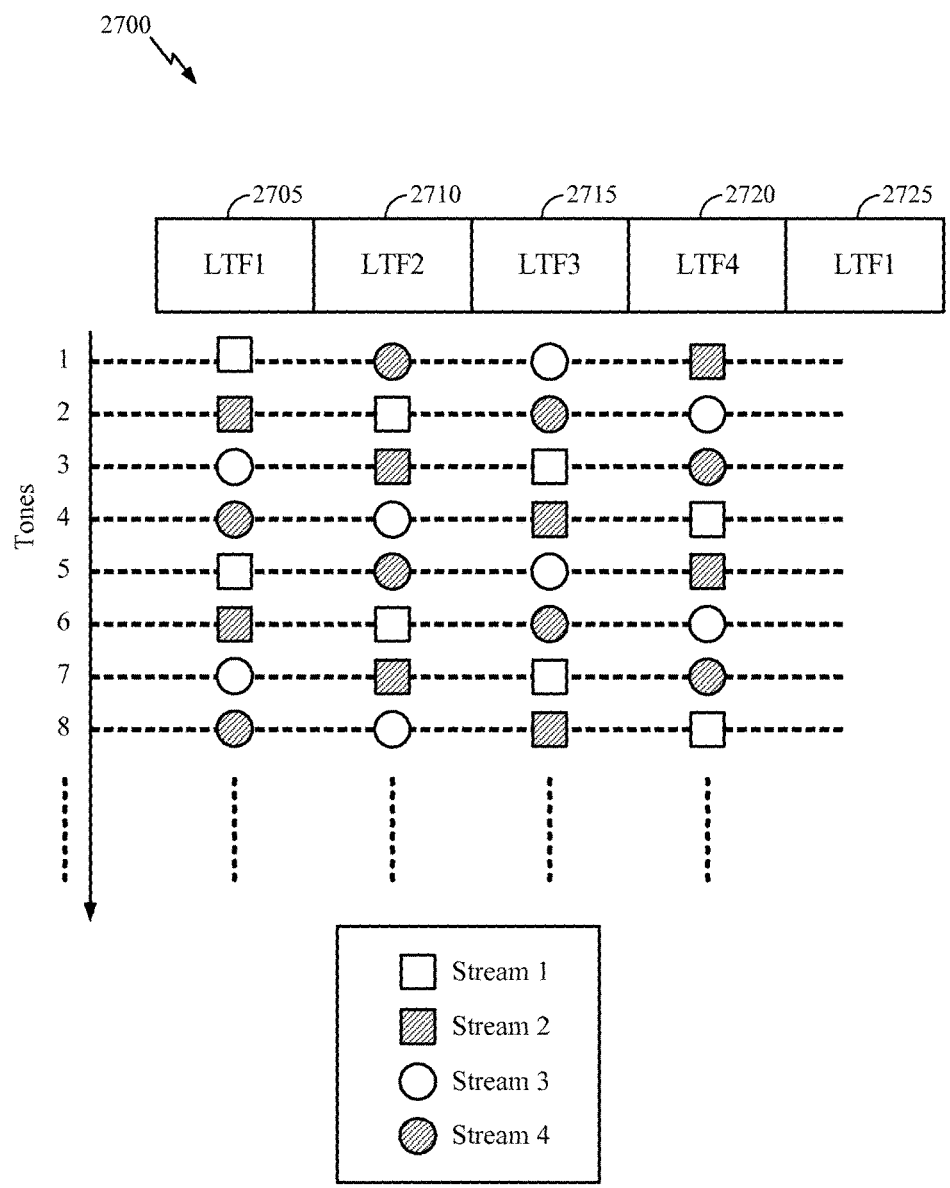
FIG. 27 is an illustration of a tone-interleaved LTF which may be used in an UL OFDMA packet.
Figure 28:
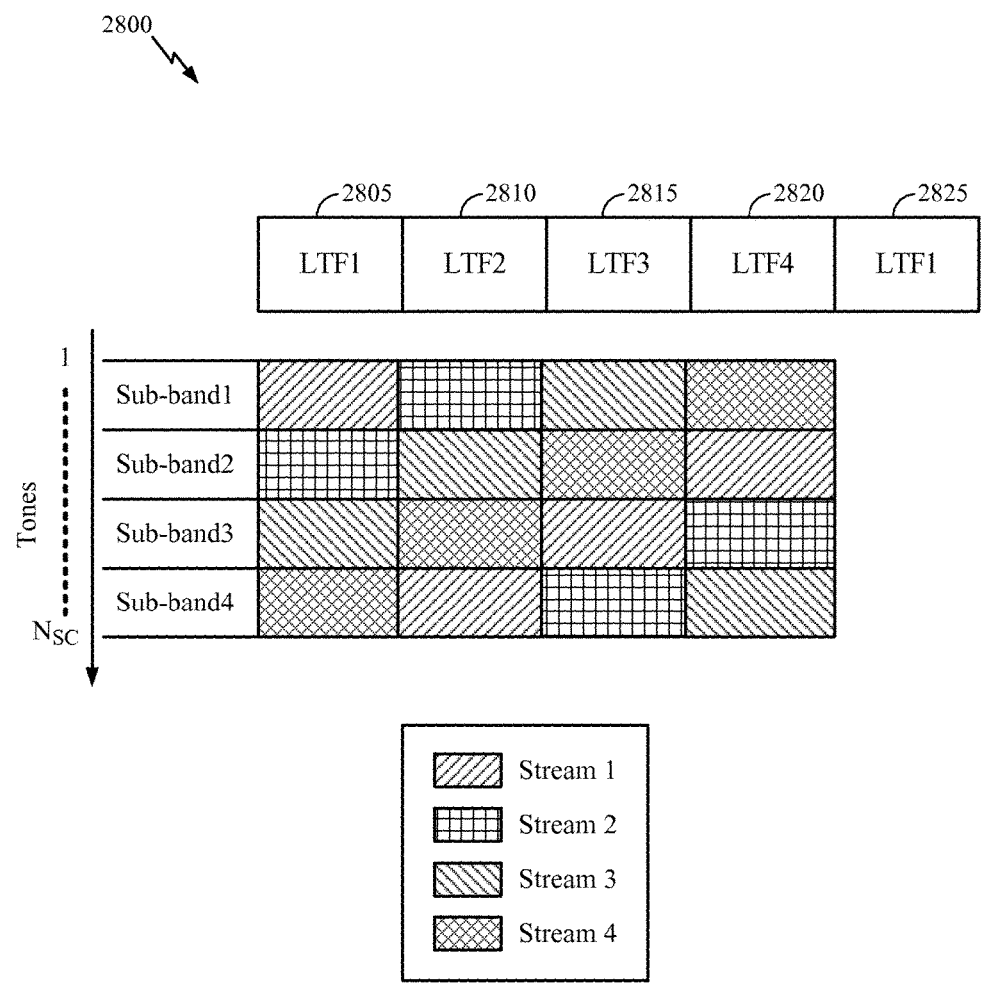
FIG. 28 is an illustration of a sub-band interleaved LTF which may be used in an UL OFDMA packet.

FIG. 27 is an illustration 2700 of a tone-interleaved LTF which may be used in an UL OFDMA packet. For example, these LTFs may be used in any of the previously described UL OFDMA packets. For example, in this packet, there are four spatial streams. These spatial streams may be numbered, for example, as spatial stream 1-4. Each spatial stream may be transmitted by a separate device, or one device may transmit two or more of the spatial streams. Accordingly, four spatial streams may correspond to an UL OFDMA packet which is being transmitted by two, three, or four devices. Because four spatial streams are present, four LTFs may be sent, labeled LTF1 2705, LTF2 2710, LTF3 2715, and LTF4 2720. Each LTF may include a number of tones, here numbered from 1 to 8. Any number of tones may be included in the LTF, corresponding to the number of tones which are included in the data portion of the UL OFDMA packet. In this tone-interleaved LTF, during LTF1 2705, the first stream may transmit on tones 1, 5, 9, and so on. In some aspects, the spacing between these tones (that is, the spacing between 1 and 5) is based on the number of spatial streams. For example, in the illustration 2700 there are four spatial streams and so the spacing between tones which each stream transmits on is also four. During LTF1 2705, the second stream may transmit on tones 2, 6, 10, and so on, while the third spatial stream may transmit on tones 3, 7, 11 and so one, and the fourth spatial stream may transmit on tones 4, 8, 12, and so on. In a next LTF, LTF2 2710, each spatial stream may transmit on tones which are 1 tone higher than the previous LTF. For example, in LTF1 2705, stream 1 transmitted on tones 1 and 5, while in LTF2 2710, stream 1 transmits on tones 2 and 5. Accordingly, after a number of LTFs equal to the number of spatial streams, each spatial stream may have transmitted on each tone. Using this tone-interleaved LTF, since spatial streams do not transmit at the same frequency at the same time, cross-stream leakage may not be an issue because of the offset. For example, the offset may be a few kHz. In some aspects, it may be advantageous to repeat LTF1 2725 again after the last LTF, in order to estimate per-stream frequency offset. For example, LTF1 2705 may be identical to LTF1 2725. However, these two LTFs may be compared to FIG. 28 is an illustration 2800 of a sub-band interleaved LTF which may be used in an UL OFDMA packet. For example, these LTFs may be used in any of the previously described UL OFDMA packets. The UL OFDMA packet may include a number of spatial streams, and may be transmitted on a number of tones. For example, illustration 2800 includes four spatial streams. Because there are four spatial streams, the tones, from 1 to $N_{SC}$, where $N_{SC}$ is the total number of subcarriers excluding guard tones and DC tones, are divided into four sub-bands. For example, if there were 64 tones, tones 1-16 could be sub-band 1, tones 17-32 could be sub-band 2, tones 33-48 could be sub-band 3 and tones 49-64 could be sub-band 4. In some aspects, the number of tones in each sub-band may be equal or may be approximately equal. In each of the four LTFs, each of the four spatial streams may transmit on the tones of its assigned sub-band. For example, in LTF1 2805, sub-band 1 may be assigned to spatial stream 1, sub-band 2 may be assigned to spatial stream 2, and so one. In the subsequent LTF2 2810, each of the sub-bands may be assigned to a different one of the spatial streams. Accordingly, after four LTFs, each of the four spatial streams may have transmitted once on each of the four sub-bands.

Figure 29:
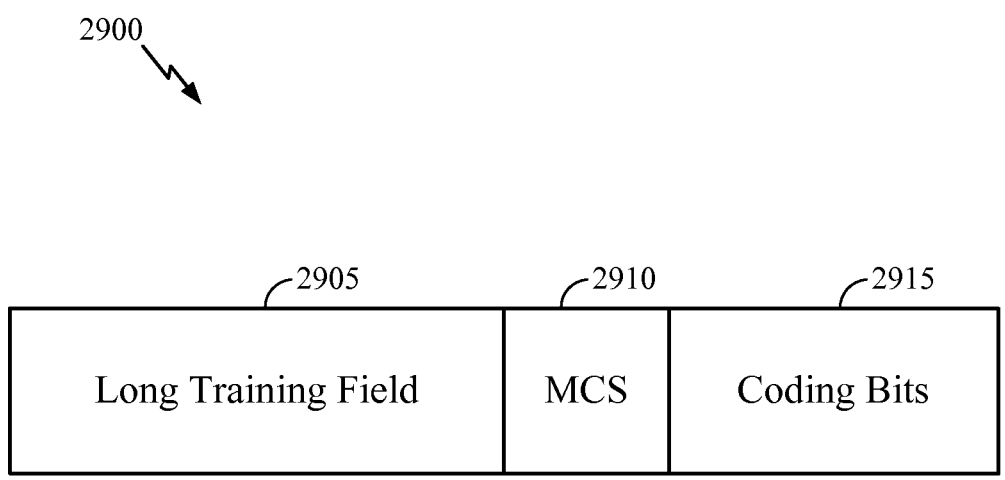
FIG. 29 is an exemplary LTF portion of a packet which may be transmitted in an UL OFDMA packet.

The LTF structures illustrated in illustration 2700 and illustration 2800 may have a number of advantages. For example, this structure may offer better performance when there is a large frequency offset between uplink clients. Further, these LTF structures will allow the AP to receive transmissions in each of the spatial streams on each of the tones. This may allow, for example, a spatial stream to switch from certain tones to certain other tones if such a switch was desired. Further, this may allow the AP to determine the signal strength of a given spatial stream of a given device on each tone. This may allow the AP, in a future packet, to assign tones to a device based on which tones that device has the best signal. For example, if the AP assigns tones to various devices, the AP may observe that a certain device has a lower signal-to-noise ratio and a stronger signal on some tones over other tones. Accordingly, the AP may assign that device those stronger tones in a future packet. FIG. 29 is an exemplary LTF portion 2900 of a packet which may be transmitted in an UL OFDMA packet. For example, as described above, in certain UL OFDMA packets, rather than allocating tones in a SIG portion of the packet, tones may be allocated elsewhere. For example, as described above, certain UL OFDMA packets may allocate tones in a signaling message from the AP to the transmitting devices, which may allocate certain tones to certain devices. Thus, while in previous UL packets, the SIG may include MCS, coding bits, and tone allocation information, in some aspects, the tone allocation information need not be included in a SIG field. Thus, it may be that a SIG field could include only MCS and coding bits, which together comprise 6-7 bits of information, and binary convolutional coding (BCC) tail bits, which may be six bits. Accordingly, it may be inefficient to transmit a SIG field which includes only 6-7 bits of information, when transmitting such a SIG field also includes 6 bits of CRC information as overhead. Further, it is not clear whether including such CRC information has sufficient benefits in this case at all. Thus, it may be desired to send an LTF portion 2900 of a packet which includes the MCS information 2910 and coding bits 2915. By including this information in an LTF portion of the packet, the packet may not need to include a SIG field at all.

This information may be included in the LTF portion 2900 of the packet in a number of ways. For example, signaling mechanisms which can use non-cohenerent demodulation may be used. In some aspects, the MCS information 2910 and coding bits 2915 may be includes in a low-strength code across some or all of the tones of the LTF. In some aspects, the MCS information 2910 and coding bits 2915 may be transmitted in a single LTF, such as in LTF1 2825 or another LTF. In some aspects, the MCS information 2910 and coding bits 2915 may be split across each of the multiple LTFs. For example, one or more bits of the MCS information 2910 and coding bits 2915 may be includes in two or more of the LTFs. Accordingly, in some aspects, an explicit SIG field may be needed in an UL OFDMA packet, as this information may be contained within the LTFs of the packet.

Typically, in an UL MU-MIMO packet, a per-user SIG field may be included after each of the LTFs for that packet have been transmitted. For example, this format may be similar to that of packet 2400. However, in an UL OFDMA packet, the HE-SIG may be included prior to the STFs or LTFs of a packet, as illustrated in packet 2100. In some aspects, in order to harmonize an UL MU-MIMO packet with an UL OFDMA packet, it may be desirable to transmit a packet with a SIG field in both locations. For example, a packet may be transmitted which includes a common SIG field, prior to the HE-STF, and also includes a per-user SIG field after all of the HE-LTFs.

Figure 30:
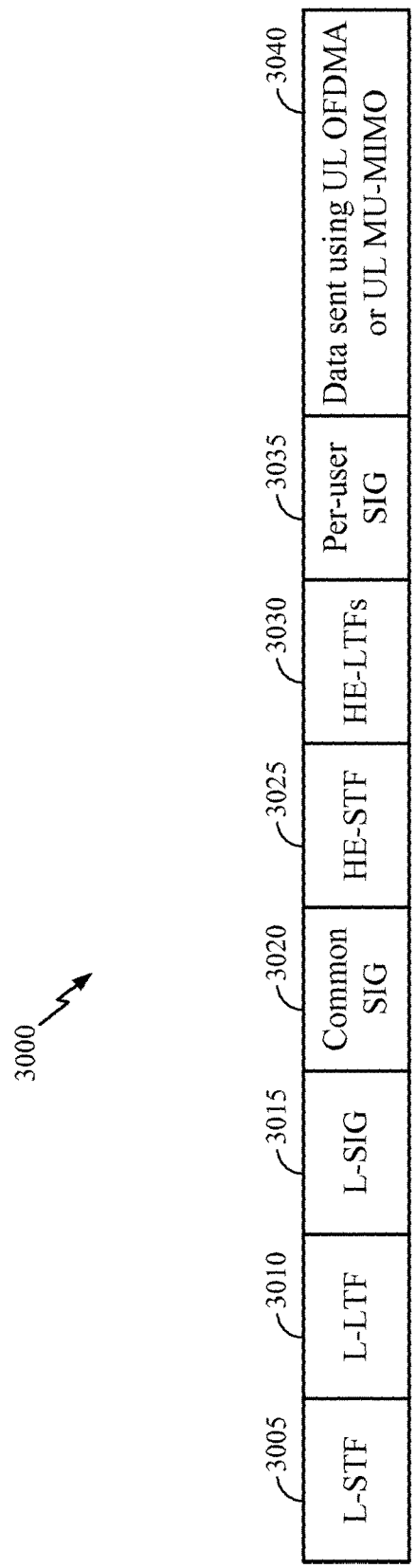
FIG. 30 is an illustration of a packet with a common SIG field prior to the HE-STF and per-user SIG field after all of the HE-LTFs.

FIG. 30 is an illustration of a packet 3000 with a common SIG field prior to the HE-STF and per-user SIG field after all of the HE-LTFs. In packet 3000, the packet is shown to include a legacy preamble, include a legacy short training field 3005, a legacy long training field 3010, and a legacy SIG field 3015. However, this packet may also be transmitted without such a legacy preamble. Following the legacy preamble, if such a preamble is include, the packet 3000 includes a common SIG 3020. In some aspects, this common SIG 3020 may include information similar to that included in such a SIG field in previous UL OFDMA packets. For example, the common SIG may carry the number of spatial streams included in the OFDMA packet. For example, each transmitting device in an UL OFDMA packet may popular a portion of the tones of the Common SIG 3020. Following the Common SIG 3020, an HE-STF 3025 and HE-LTFs 3030 are transmitted. These fields may be transmitted according to the above disclosures. For example, the HE-LTFs 3030 may be based upon the LFT formats illustrated in FIGS. 27 and 28. Any number of HE-LTFs 3030 may be transmitted. For example, the number of HE-LTFs 303 which are transmitted may be based, at least in part, on the sum of the number of spatial streams which are a part of the packet 3000. Following the HE-LTFs 303, a second SIG field may be transmitted. This per-user SIG 3035 may be transmitted by each of the devices transmitting the UL OFDMA packet. The format of the per-user SIG field 3035 may be based upon the format of the SIG field in a UL MU-MIMO packet. Following the per-user SIG field 3035, data 3040 may be transmitted. Accordingly, packet 3000 may include both the Common SIG 3020, as in other UL OFDMA packets, and a per-user SIG field 3035, as in other UL MU-MIMO packets. Because both SIG fields are included in packet 3000, this packet format may be reused in both UL OFDMA and UL MU-MIMO.

Figure 31:
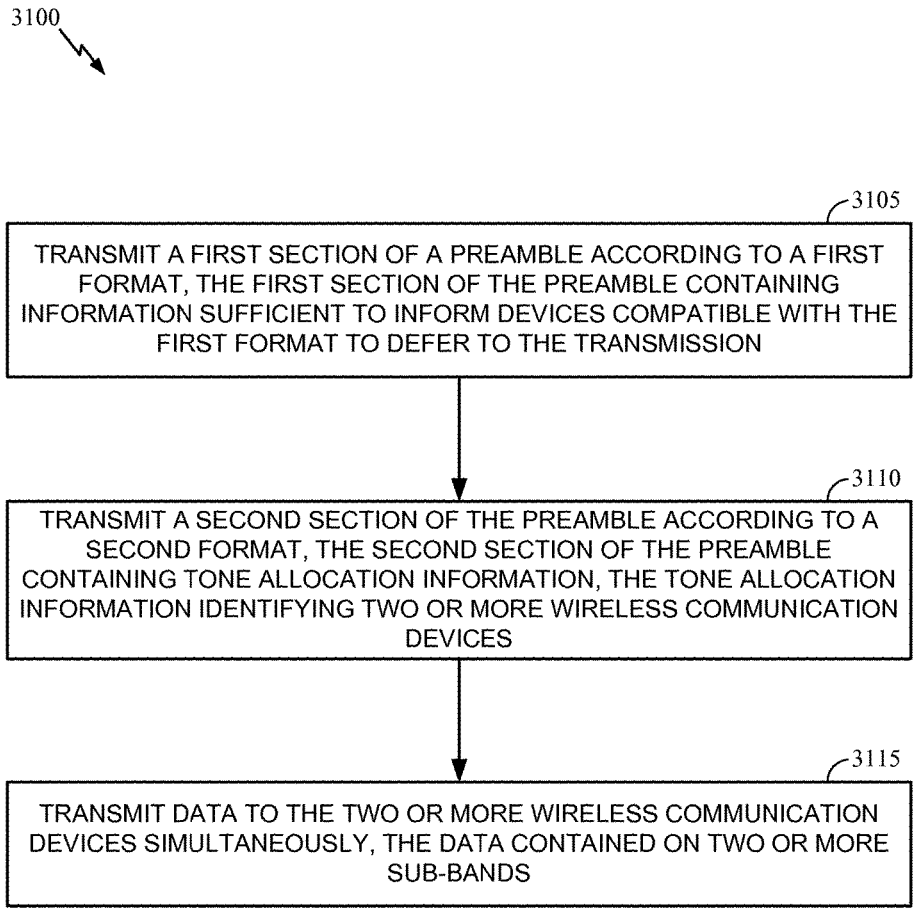
FIG. 31 illustrates an exemplary method of transmitting to one or more devices in a single transmission.

FIG. 31 illustrates an exemplary method 3100 of transmitting to one or more devices in a single transmission. This method may be done by a wireless device, such as an AP.

At block 3105, the AP transmits a first section of a preamble according to a first format, the first section of the preamble containing information sufficient to inform devices compatible with the first format to defer to the transmission. For example, the first format may be a pre-existing format, such as a format defined by one or more of the existing IEEE 802.11 standards. In some aspects, the first format may be referred to as a legacy format. In some aspects, the first section of the preamble may contain information sufficient to alert devices with a second set of capabilities and/or compatible with a second format that another section of the preamble may be transmitted to those devices. In some aspects, the means for transmitting the first section may include a transmitter.

At block 3110, the AP transmits a second section of the preamble according to a second format, the second section of the preamble containing tone allocation information, the tone allocation information identifying two or more wireless communication devices. For example, the second section of the preamble may comprise a high-efficiency preamble, and the second format may include an IEEE 802.11 format which is newer than the first format. In some aspects, the second section of the AP may identify two or more wireless communication devices and may assign each of those devices one or more sub-bands of the bandwidth of the transmission. In some aspects, the means for transmitting the second section may include a transmitter.

At block 3115, the AP transmits data to the two or more wireless communication devices simultaneously, the data contained on two or more sub-bands. In some aspects, each of the sub-bands may be transmitted on separate and distinct non-overlapping portions of the bandwidth of the transmission. For example, each sub-band may correspond to a certain portion of the bandwidth of the transmission, and each wireless communication device may be assigned to receive data on one or more of the sub-bands. Accordingly, the AP may transmit different data to two or more different wireless communication devices at the same time, in different sub-bands of the bandwidth of the transmission. In some aspects, the means for transmitting data may include a transmitter.

Figure 32:
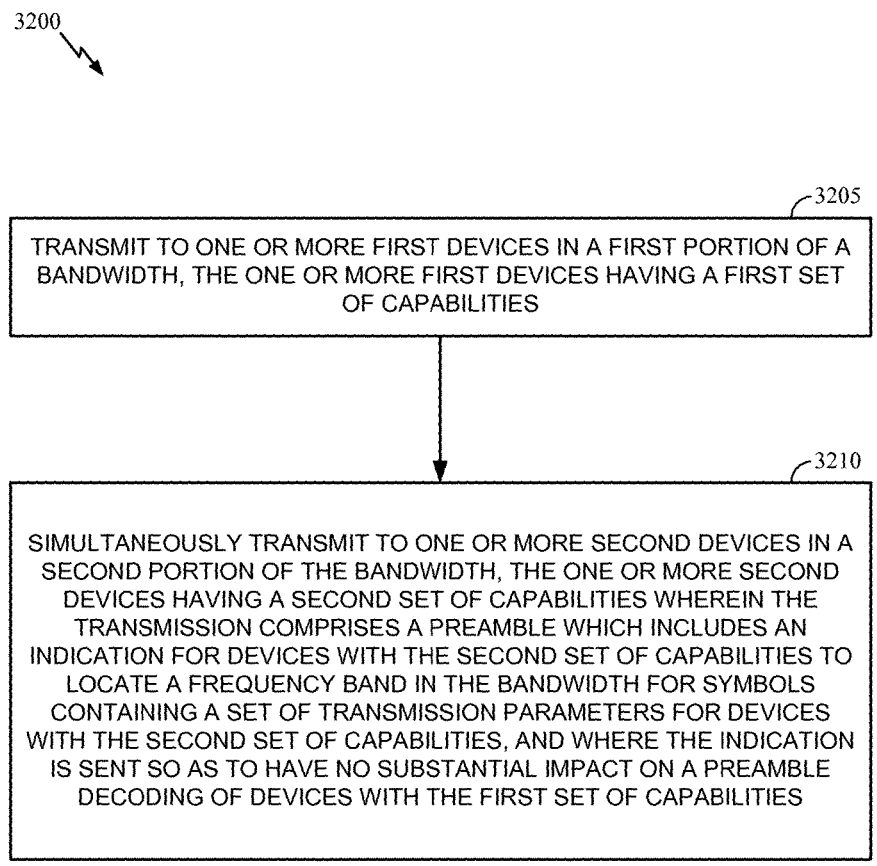
FIG. 32 illustrates an exemplary method of transmitting to one or more first devices with a first set of capabilities and simultaneously transmitting to one or more second devices with a second set of capabilities.

FIG. 32 illustrates an exemplary method 3200 of transmitting to one or more first devices with a first set of capabilities and simultaneously transmitting to one or more second devices with a second set of capabilities. This method may be done by a wireless device, such as an AP.

At block 3205, the AP transmits to one or more first devices in a first portion of a bandwidth, the one or more first devices having a first set of capabilities. In some aspects, this transmission may occur on a primary channel and may also occur on one or more secondary channels of a given bandwidth. In some aspects, the devices with the first set of capabilities may include devices which are compatible with certain IEEE 802.11 standards.

A block 3210, the AP simultaneously transmits to one or more second devices in a second portion of the bandwidth, the one or more second devices having a second set of capabilities wherein the transmission comprises a preamble which includes an indication for devices with the second set of capabilities to locate a frequency band in the bandwidth for symbols containing a set of transmission parameters for devices with the second set of capabilities, and where the indication is sent so as to have no substantial impact on a preamble decoding of devices with the first set of capabilities. For example, the indication may be a one-bit code which is on an imaginary axis of a portion of the preamble. This indication may be sent with low power, such that it may not interfere with the reception of the preamble by devices with the first set of capabilities. In some aspects, the second set of capabilities may be newer and more advanced than the first set of capabilities. For example, the first set of capabilities may correspond to a "legacy" format, while the second set of capabilities may correspond to a "high-efficiency" format. In some aspects, the devices with the second set of capabilities may be configured to look for the indication in a transmission, and if the indication is found, may be configured to locate and receive the portion of the transmission contained in the second portion of the bandwidth. In some aspects, the transmission in the second portion of the bandwidth may correspond to various types of high-efficiency packets described above.

In some aspects, the indication may be included as a one-bit code in the preamble. In some aspects, the preamble may be transmitted, in duplicate, across a bandwidth of the transmission. In some aspects, the indication may be included in certain portions of this preamble. For example, the indication may be included in the copies of the preamble which are transmitted in portions of the bandwidth which will contain transmissions to devices having the second set of capabilities. In some aspects, the means for transmitting to one or more first devices and the means for simultaneously transmitting to one or more second devices may include a transmitter.

Figure 33:
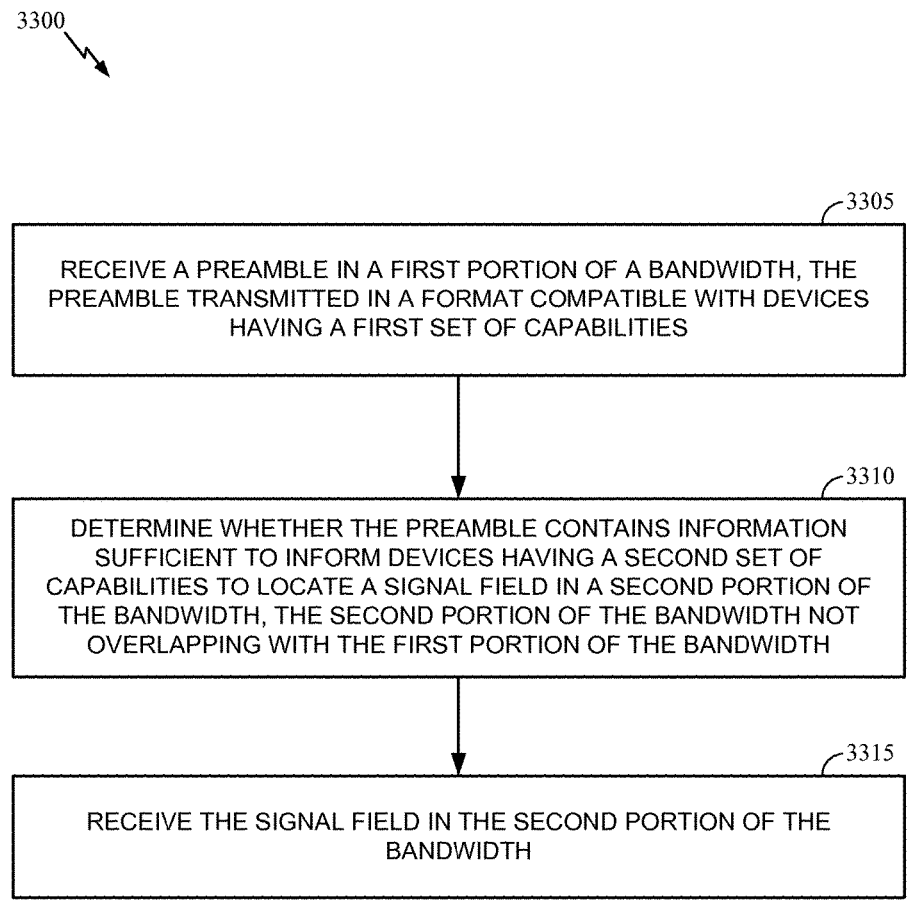
FIG. 33 illustrates an exemplary method of receiving a transmission compatible with both devices with a first set of capabilities and devices with a second set of capabilities.

FIG. 33 illustrates an exemplary method 3300 of receiving a transmission compatible with both devices with a first set of capabilities and devices with a second set of capabilities. This method may be done by a wireless device, such as a STA with the second set of capabilities.

At block 3305, the STA receives a preamble in a first portion of a bandwidth, the preamble transmitted in a format compatible with devices having a first set of capabilities. In some aspects, the first portion of the bandwidth may include a primary channel and may optionally include one or more secondary channels. In some aspects, the first set of capabilities may include an IEEE 802.11 standard, such as IEEE 802.11a or 802.11ac. In some aspects, the means for receiving the preamble may include a receiver.

At block 3310, the STA determines whether the preamble contains information sufficient to inform devices having a second set of capabilities to locate a signal field in a second portion of the bandwidth, the second portion of the bandwidth not overlapping with the first portion of the bandwidth. For example, as indicated above, the preamble may contain an indication such as a one-bit code on an imaginary axis in at least a portion of the preamble. Accordingly, the STA may be configured to determine whether or not this information is present in a given preamble. In some aspects, the second portion of the bandwidth may include one or more secondary channels. In some aspects, the means for determining whether the preamble contains the information may include a processor or a receiver.

At block 3315, the STA receives the signal field in the second portion of the bandwidth. For example, the indication may provide the STA with enough information to locate the second portion of the bandwidth, and to be aware that a signal field will be transmitted in the second portion of the bandwidth. Thus, the STA may be configured to receive the signal field in this portion of the bandwidth. In some aspects, the signal field may be all or part of a preamble, such as a "high-efficiency" preamble which is transmitted to devices with the second set of capabilities in the second portion of the bandwidth. In some aspects, this may allow devices with the second set of capabilities to receive information from an AP or another device on portions of the bandwidth without interrupting the reception of devices with the first set of capabilities on the first portion of the bandwidth. Accordingly, as discussed above, this may allow for more efficient use of the bandwidth that is available to an AP or another device, as this may allow for fuller use of the bandwidth more of the time. In some aspects, the means for receiving the signal field may include a receiver.

Figure 34:
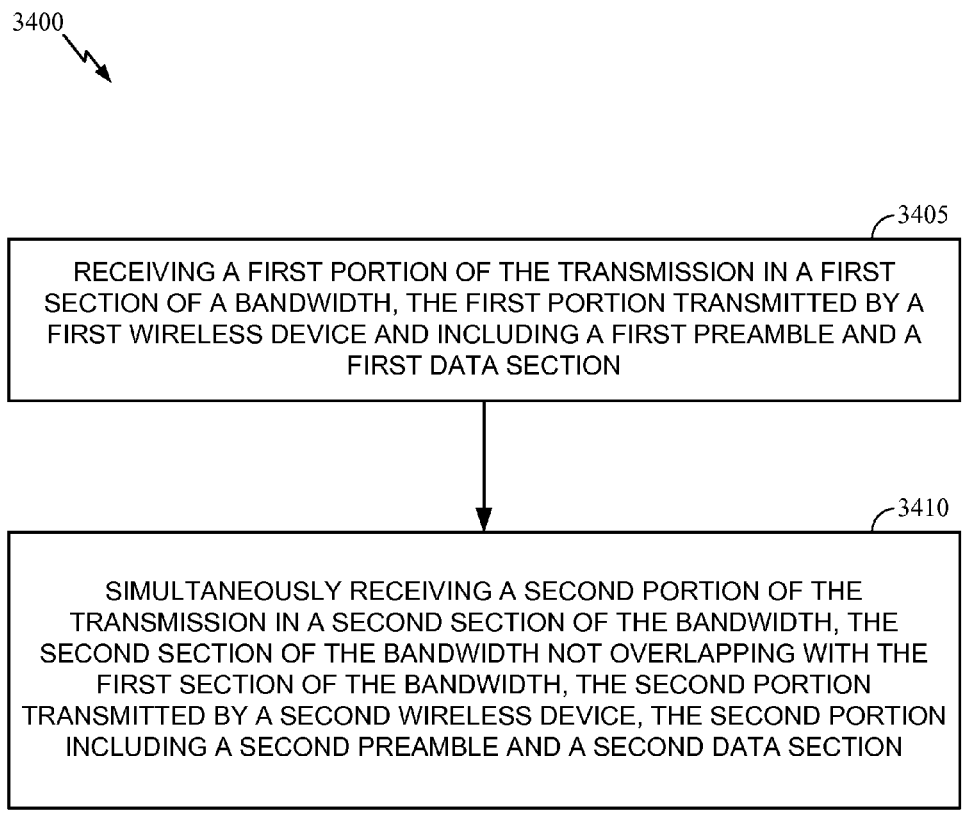
FIG. 34 illustrates an exemplary method of receiving a transmission, where portions of the transmission are transmitted by different wireless devices.

FIG. 34 illustrates an exemplary method 3300 of receiving a transmission, where portions of the transmission are transmitted by different wireless devices. The method may be done by a wireless device, such as an AP.

At block 3405, the AP receives a first portion of the transmission in a first section of a bandwidth, the first portion transmitted by a first wireless device and including a first preamble and a first data section. In some aspects, the AP may have previously sent a message to the first wireless device, informing the first wireless device of a time and a bandwidth that it may transmit to the AP.

At block 3410, the AP simultaneously receives a second portion of the transmission in a second section of the bandwidth, the second section of the bandwidth not overlapping with the first section of the bandwidth, the second portion transmitted by a second wireless device, the second portion including a second preamble and a second data section. In some aspects, the first preamble and the second preamble may each contain training fields. In some aspects, the number of training fields that each preamble contains may be based on the number of spatial streams assigned to a particular device. For example, a device that is assigned three spatial streams may transmit one short training field, and transmit three long-training fields. Similarly, a device assigned one spatial stream may transmit one short training field and one long training field. In some aspects, each device may transmit a number of training fields based on how many spatial streams were assigned to that particular device. In some aspects, it may be advantageous for each device to transmit the same number of spatial streams. For example, if each device transmits the same number of spatial streams, this may reduce peak-to-average power ratio of the combined transmission, which may be advantageous. In some aspects, the transmissions from the first and second wireless devices may be triggered by a message from the AP. This message may also indicate to each device how many spatial streams that device may transmit on, and may indicate the number of training fields that each device should transmit.

Figure 35:
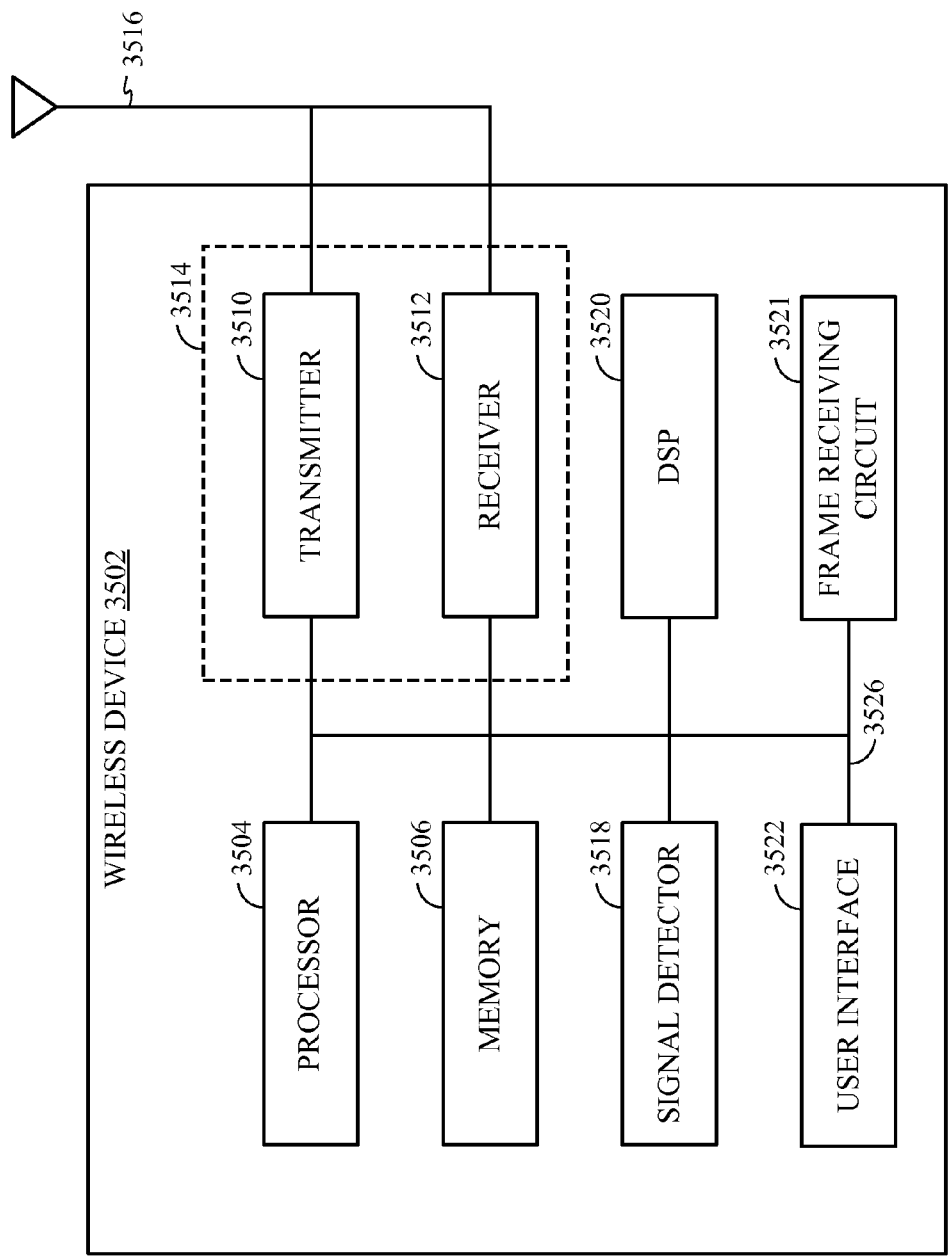
FIG. 35 illustrates various components that may be utilized in a wireless device that may be employed within the wireless communication system.

FIG. 35 illustrates various components that may be utilized in a wireless device 3502 that may be employed within the wireless communication system 100. The wireless device 3502 is an example of a device that may be configured to implement the various methods described herein. For example, the wireless device 3502 may comprise the AP 104 or one of the STAs 106 of FIG. 10. In some aspects, the wireless device 3502 may comprise a wireless device that is configured to receive the packets described above.

The wireless device 3502 may include a processor 3504 which controls operation of the wireless device 3502. The processor 3504 may also be referred to as a central processing unit (CPU). Memory 3506, which may include both read-only memory (ROM) and random access memory (RAM), provides instructions and data to the processor 3504. A portion of the memory 3506 may also include non-volatile random access memory (NVRAM). The processor 3504 typically performs logical and arithmetic operations based on program instructions stored within the memory 3506. The instructions in the memory 3506 may be executable to implement the methods described herein. For example, the memory 3506 may contain instructions sufficient to allow the wireless device 3502 to receive transmissions from high-efficiency devices. For example, the memory 3506 may contain instructions sufficient to allow the wireless device 3502 to receive packets which include a preamble for device with a first set of capabilities, and a second preamble for devices with a second set of capabilities. In some aspects, the wireless device 3502 may include a frame receiving circuit 3521, which may contain instructions sufficient to allow the wireless device 3502 to receive packets as described in method 3300 and/or method 3400. This frame receiving circuit 3521 may contain instructions sufficient to allow a device to receive a preamble in a first portion of the bandwidth, determine if an indication is present, and receive a signal field in a second portion of the bandwidth, as describe in method 3300. In some aspects, the frame receiving circuit 3521 may contain instructions sufficient to allow a device to receive a first portion of the transmission in a first second of a bandwidth, and to simultaneously receive a second portion of the transmission in a second section of the bandwidth, as described in method 3400.

The processor 3504 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 3502 may also include a housing 3508 that may include a transmitter 3510 and a receiver 3512 to allow transmission and reception of data between the wireless device 3502 and a remote location. The transmitter 3510 and receiver 3512 may be combined into a transceiver 3514. An antenna 3516 may be attached to the housing 3508 and electrically coupled to the transceiver 3514. The wireless device 3502 may also include (not shown) multiple transmitters, multiple receivers, multiple transceivers, and/or multiple antennas.

The wireless device 3502 may also include a signal detector 3518 that may be used in an effort to detect and quantify the level of signals received by the transceiver 3514. The signal detector 3518 may detect such signals as total energy, energy per subcarrier per symbol, power spectral density and other signals. The wireless device 3502 may also include a digital signal processor (DSP) 3520 for use in processing signals. The DSP 3520 may be configured to generate a data unit for transmission. In some aspects, the data unit may comprise a physical layer data unit (PPDU). In some aspects, the PPDU is referred to as a packet.

The wireless device 3502 may further comprise a user interface 3522 in some aspects. The user interface 3522 may comprise a keypad, a microphone, a speaker, and/or a display. The user interface 3522 may include any element or component that conveys information to a user of the wireless device 3502 and/or receives input from the user.

The various components of the wireless device 3502 may be coupled together by a bus system 3526. The bus system 3526 may include a data bus, for example, as well as a power bus, a control signal bus, and a status signal bus in addition to the data bus. Those of skill in the art will appreciate the components of the wireless device 3502 may be coupled together or accept or provide inputs to each other using some other mechanism.

Although a number of separate components are illustrated in FIG. 35, one or more of the components may be combined or commonly implemented. For example, the processor 3504 may be used to implement not only the functionality described above with respect to the processor 3504, but also to implement the functionality described above with respect to the signal detector 3518 and/or the DSP 3520. Further, each of the components illustrated in FIG. 35 may be implemented using a plurality of separate elements. Furthermore, the processor 3504 may be used to implement any of the components, modules, circuits, or the like described below, or each may be implemented using a plurality of separate elements. As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Further, a "channel width" as used herein may encompass or may also be referred to as a bandwidth in certain aspects.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-Ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A method of transmitting to two or more wireless communication devices, the method comprising:
    transmitting a first section of a preamble according to a first preamble format and a second section of the preamble according to a second preamble format, wherein the first section includes a first symbol and the second section includes a second symbol, wherein the first section is transmitted using a first phase shift keying format on the first symbol, wherein the second section is transmitted using a second phase shift keying format on the second symbol, and wherein the first phase shift keying format is different from the second phase shift keying format, wherein the first section informs devices compatible with the first preamble format to defer communicating, and wherein the second section includes tone allocation information, the tone allocation information identifying two or more wireless communication devices, a bandwidth for each member of a set of sub-bands spanning a communication bandwidth, and an assignment of a number of the sub-bands to each one of the identified two or more wireless communication devices; and
    transmitting data to the two or more wireless communication devices simultaneously, the data contained on two or more sub-bands.

2. The method of claim 1, wherein the first section of the preamble includes a one-bit code on a Q-rail which indicates a presence of the second section of the preamble.

3. The method of claim 1, wherein the second section of the preamble comprises a signal field using the second preamble format, the signal field comprised of at least three orthogonal frequency-division multiplexing symbols, and wherein a third symbol of the three symbols is a rotated signal which indicates a presence of the second section of the preamble.

4. The method of claim 1, wherein the transmitting the second section of the preamble comprises transmitting one or more training fields according to the second preamble format to each of the two or more wireless communication devices, the one or more training fields each configured to be used for accurate frequency offset estimation, time synchronization, and channel estimation.

5. The method of claim 4, further comprising assigning one or more spatial streams to each of the two or more wireless communication devices, and wherein transmitting one or more training fields comprises transmitting one training field according to the second preamble format to each of the two or more wireless communication devices, the training fields based on a number of spatial streams assigned to the respective wireless communication device.

6. The method of claim 4, further comprising assigning one or more spatial streams to each of the two or more wireless communication devices, and wherein transmitting one or more training fields comprises transmitting a number of training fields to each of the two or more wireless communication devices, the number of training fields based on a number of spatial streams assigned to the wireless communication device which is assigned a highest number of spatial streams.

7. The method of claim 1, wherein the bandwidth for each member of the set of sub-bands defines a tone allocation granularity of the transmission.

8. The method of claim 7, wherein the tone allocation granularity of the transmission is indicated by a field of at least one bit in the second section of the preamble.

9. The method of claim 1, wherein the second section of the preamble comprises a signal field according to the second preamble format, and wherein a symbol of the signal field is transmitted in duplicate in each of a plurality of channels and contains information identifying an entire bandwidth, and wherein a subsequent symbol of the signal field is transmitted using the entire bandwidth.

10. The method of claim 1, wherein the first preamble format is defined by a first standard, and the second preamble format is defined by a second standard.

11. An apparatus for wireless communication, comprising:
    a transmitter configured to transmit over a bandwidth, the transmitter further configured to:
        transmit a first section of a preamble according to a first preamble format and a second section of the preamble according to a second preamble format, wherein the first section includes a first symbol and the second section includes a second symbol, wherein the first section is transmitted using a first phase shift keying format on the first symbol, wherein the second section is transmitted using a second phase shift keying format on the second symbol, and wherein the first phase shift keying format is different from the second phase shift keying format, wherein the first section informs devices compatible with the first preamble format to defer communication, and wherein the second section includes tone allocation information, the tone allocation information identifying two or more wireless communication devices, a bandwidth for each member of a set of sub-bands spanning a communication bandwidth, and an assignment of a number of the sub-bands to each one of the identified two or more wireless communication devices; and transmit data to the two or more wireless communication devices simultaneously, the data contained on two or more sub-bands.

12. The apparatus of claim 11, wherein the first section of the preamble includes a one-bit code on a Q-rail which indicates a presence of the second section of the preamble to devices compatible with the second preamble format.

13. The apparatus of claim 11, wherein the second section of the preamble comprises a signal field using the second preamble format, the signal field comprising at least three orthogonal frequency-division multiplexing symbols, and wherein a third symbol of the three symbols is a rotated signal which indicates the presence of the second format signal field.

14. The apparatus of claim 11, the transmitter configured to transmit the second section of the preamble, comprising transmitting one or more training fields according to the second preamble format to each of the two or more wireless communication devices, the one or more training fields each configured to be used for accurate frequency offset estimation, time synchronization, and channel estimation.

15. The apparatus of claim 14, wherein the transmitter is further configured to transmit to each of the two or more wireless communication devices on one or more spatial streams, and wherein transmitting one or more training fields according to the second preamble format comprises transmitting a training field according to the second preamble format to each of the two or more wireless communication devices, the training fields based on a number of spatial streams assigned to the respective wireless communication device.

16. The apparatus of claim 14, wherein the transmitter is further configured to transmit to each of the two or more wireless communication devices on one or more spatial streams, and wherein transmitting one or more training fields according to the second preamble format comprises transmitting a number of training fields to each of the two or more wireless communication devices, the number of training fields based on a number of spatial streams assigned to the wireless communication device which is assigned a highest number of spatial streams.

17. The apparatus of claim 14, wherein the bandwidth for each member of the set of sub-bands defines a tone allocation granularity of the transmission.

18. The apparatus of claim 11, wherein the second section of the preamble comprises a signal field according to the second preamble format, and wherein a symbol of the signal field is transmitted in duplicate in each of a plurality of channels and contains information identifying an entire bandwidth, and wherein a subsequent symbol of the signal field is transmitted using the entire bandwidth.

19. A method of receiving by a wireless communication device, the method comprising:
receiving a first section of a preamble according to a first preamble format and a second section of the preamble according to a second preamble format, wherein the first section includes a first symbol and the second section includes a second symbol, wherein the first section is transmitted using a first phase shift keying format on the first symbol, wherein the second section is transmitted using a second phase shift keying format on the second symbol, and wherein the first phase shift keying format is different from the second phase shift keying format, wherein the first section informs devices compatible with the first preamble format to defer communicating, and wherein the second section includes tone allocation information, the tone allocation information identifying the wireless communication device, a bandwidth for each member of a set of sub-bands spanning a communication bandwidth, and an assignment of a number of the sub-bands to the wireless communication device and to at least one other wireless communication device; and
receiving data at the wireless communication device, the data contained on a sub-band.

20. The method of claim 19, wherein the first section of the preamble includes a one-bit code on a Q-rail which indicates a presence of the second section of the preamble.

21. The method of claim 19, wherein the second section of the preamble comprises a signal field using the second preamble format, the signal field comprised of at least three orthogonal frequency-division multiplexing symbols, and wherein a third symbol of the three symbols is a rotated signal which indicates a presence of the second section of the preamble.

22. The method of claim 19, wherein receiving the second section of the preamble comprises receiving one or more training fields according to the second preamble format of the wireless communication device, the one or more training fields each configured to be used for accurate frequency offset estimation, time synchronization, and channel estimation.

* * * * *